(12) United States Patent
Rudnick et al.

(10) Patent No.: US 12,356,062 B2
(45) Date of Patent: *Jul. 8, 2025

(54) SLIM POP-OUT WIDE CAMERA LENSES

(71) Applicant: Corephotonics Ltd., Tel Aviv (IL)

(72) Inventors: Roy Rudnick, Tel Aviv (IL); Nadav Goulinski, Tel Aviv (IL); Gal Shabtay, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/926,347

(22) Filed: Oct. 25, 2024

(65) Prior Publication Data
US 2025/0047965 A1    Feb. 6, 2025

Related U.S. Application Data

(63) Continuation of application No. 18/436,137, filed on Feb. 8, 2024, which is a continuation of application
(Continued)

(51) Int. Cl.
*H04N 23/57* (2023.01)
*G02B 13/00* (2006.01)
(Continued)

(52) U.S. Cl.
CPC ......... *H04N 23/57* (2023.01); *G02B 13/0045* (2013.01); *G02B 13/009* (2013.01);
(Continued)

(58) Field of Classification Search
CPC .............. G02B 15/1421; G02B 15/143; G02B 15/1425; G02B 15/142; G02B 15/14;
(Continued)

(56) References Cited

U.S. PATENT DOCUMENTS 2,106,752 A   2/1938   Land
2,354,503 A   7/1944   Arthur
(Continued)

FOREIGN PATENT DOCUMENTS

CN   101025470 A   8/2007
CN   101634738 A   1/2010
(Continued)

OTHER PUBLICATIONS

Office Action in related KR patent application 2022-7042147, dated Sep. 2, 2024.
(Continued)

*Primary Examiner* — Travis S Fissel
(74) *Attorney, Agent, or Firm* — Nathan & Associates; Menachem Nathan

(57) ABSTRACT

Pop-out lens systems for compact digital cameras, comprising an image sensor and a lens with a field of view FOV>60 deg and having i lens elements L1-Li starting with L1 from an object side toward an image side, each lens element Li having a respective focal length $f_i$, the lens elements divided into two lens groups G1 and G2 separated by a big gap (BG), the lens having a pop-out total track length TTL<20 mm in a pop-out state and a collapsed total track length c-TTL in a collapsed state, wherein BG>0.25×TTL, wherein either G1 can move relative to G2 and to the image sensor for focusing or G1 and G2 can move together relative to the image sensor for focusing, and wherein a ratio c-TTL/TTL<0.7.

24 Claims, 19 Drawing Sheets

Related U.S. Application Data

No. 17/794,972, filed as application No. PCT/IB2022/050594 on Jan. 24, 2022, now Pat. No. 11,930,263.

(60) Provisional application No. 63/141,128, filed on Jan. 25, 2021.

(51) Int. Cl.
*G02B 15/14* (2006.01)
*H04N 23/55* (2023.01)

(52) U.S. Cl.
CPC ....... *G02B 15/1421* (2019.08); *G02B 15/146* (2019.08); *H04N 23/55* (2023.01)

(58) Field of Classification Search
CPC .. G02B 13/009; G02B 13/0045; G02B 13/02; G02B 13/04; G02B 13/0065; H04N 23/57; H04N 23/55
USPC ....... 359/691–694, 676, 713, 745, 754, 756, 359/684; 348/340
See application file for complete search history.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,327,291 A | 7/1994 | Baker et al. |
| 5,331,465 A | 7/1994 | Miyano |
| 5,600,488 A | 2/1997 | Minefuji et al. |
| 5,969,869 A | 10/1999 | Hirai et al. |
| 6,014,266 A | 1/2000 | Obama et al. |
| 6,035,136 A | 3/2000 | Hayashi et al. |
| 6,147,702 A | 11/2000 | Smith |
| 6,169,636 B1 | 1/2001 | Kreitzer |
| 6,654,180 B2 | 11/2003 | Ori |
| 6,853,499 B2 | 2/2005 | Iwasaki |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay et al. |
| 9,201,223 B2 | 12/2015 | Ohashi |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 9,835,834 B2 | 12/2017 | Li et al. |
| 9,869,846 B1 | 1/2018 | Bone et al. |
| 11,340,425 B2 | 5/2022 | Yamazaki et al. |
| 12,069,371 B2 | 8/2024 | Shabtay et al. |
| 2002/0118471 A1 | 8/2002 | Imoto |
| 2003/0048542 A1 | 3/2003 | Enomoto |
| 2004/0095503 A1 | 5/2004 | Iwasawa et al. |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0092524 A1 | 5/2006 | Konno |
| 2006/0238902 A1 | 10/2006 | Nakashima et al. |
| 2006/0262420 A1 | 11/2006 | Matsumoto et al. |
| 2006/0275025 A1 | 12/2006 | Labaziewicz et al. |
| 2007/0114990 A1 | 5/2007 | Godkin |
| 2007/0183058 A1 | 8/2007 | Bito et al. |
| 2007/0188884 A1 | 8/2007 | Yoshitsugu et al. |
| 2007/0229983 A1 | 10/2007 | Saori |
| 2007/0247726 A1 | 10/2007 | Sudoh |
| 2007/0253689 A1 | 11/2007 | Nagai et al. |
| 2008/0056698 A1 | 3/2008 | Lee et al. |
| 2008/0094730 A1 | 4/2008 | Toma et al. |
| 2008/0094738 A1 | 4/2008 | Lee |
| 2008/0117527 A1 | 5/2008 | Nuno et al. |
| 2008/0273250 A1 | 11/2008 | Nishio |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0161228 A1 | 6/2009 | Lee |
| 2009/0225438 A1 | 9/2009 | Kubota |
| 2009/0279191 A1 | 11/2009 | Yu |
| 2009/0303620 A1 | 12/2009 | Abe et al. |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |

(56) References Cited

U.S. PATENT DOCUMENTS

| | | |
|---|---|---|
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2012/0314299 A1 | 12/2012 | Tashiro et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0036112 A1 | 2/2014 | Scarff |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0195691 A1 | 7/2016 | Bito et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Hun-Kim et al. |
| 2016/0353008 A1 | 12/2016 | Osborne |
| 2017/0023778 A1 | 1/2017 | Inoue |
| 2017/0052350 A1 | 2/2017 | Chen |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0276914 A1 | 9/2017 | Yao et al. |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay et al. |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0026117 A1 | 1/2021 | Yao |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0263276 A1 | 8/2021 | Huang et al. |
| 2021/0364746 A1 | 11/2021 | Chen |
| 2021/0396974 A1 | 12/2021 | Kuo |
| 2022/0004085 A1 | 1/2022 | Shabtay et al. |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |
| 2023/0080199 A1 | 3/2023 | Eromaki et al. |

FOREIGN PATENT DOCUMENTS

| | | |
|---|---|---|
| CN | 102147519 A | 8/2011 |
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 A | 12/1979 |
| JP | S59121015 A | 7/1984 |
| JP | 6165212 A | 4/1986 |
| JP | S6370211 A | 3/1988 |

(56) References Cited

FOREIGN PATENT DOCUMENTS

| | | |
|---|---|---|
| JP | H0233117 A | 2/1990 |
| JP | 406059195 A | 3/1994 |
| JP | H06258702 A | 9/1994 |
| JP | H06347687 A | 12/1994 |
| JP | H07120673 A | 5/1995 |
| JP | H07325246 A | 12/1995 |
| JP | H07333505 A | 12/1995 |
| JP | H08179215 A | 7/1996 |
| JP | H09211326 A | 8/1997 |
| JP | H11223771 A | 8/1999 |
| JP | 2000131610 A | 5/2000 |
| JP | 2000292848 A | 10/2000 |
| JP | 3210242 B2 | 9/2001 |
| JP | 2002365549 A | 12/2002 |
| JP | 2003329932 A | 11/2003 |
| JP | 2004226563 A | 8/2004 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2011151448 A | 8/2011 |
| JP | 2012203234 A | 10/2012 |
| JP | 2012230323 A | 11/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019028249 A | 2/2019 |
| JP | 2019113878 A | 7/2019 |
| KR | 20080088477 A | 10/2008 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |
| WO | 2013058111 A1 | 4/2013 |
| WO | 2013063097 A1 | 5/2013 |
| WO | 2018130898 A1 | 7/2018 |

OTHER PUBLICATIONS

Office Action in related KR patent application 2022-7042150, dated Sep. 2, 2024.
Office Action in related JP patent application 2023-144491, dated Aug. 28, 2024.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.

SLIM POP-OUT WIDE CAMERA LENSES

CROSS REFERENCE TO RELATED APPLICATIONS

This is a continuation from U.S. patent application Ser. No. 18/436,137 filed Feb. 8, 2024 (now allowed), which was a continuation from U.S. patent application Ser. No. 17/794,972 filed Jul. 28, 2022 (now U.S. Pat. No. 11,930,263), which was a 371 application from international patent application PCT/IB2022/050594 filed Jan. 24, 2022, and is related to and claims priority from U.S. Provisional Patent Application No. 63/141,128 filed Jan. 25, 2021, which is expressly incorporated herein by reference in its entirety.

FIELD

The present disclosure relates in general to digital cameras, and more particularly to digital cameras with pop-out mechanisms and lenses.

DEFINITIONS

In this application and for optical and other properties mentioned throughout the description and figures, the following symbols and abbreviations are used, all for terms known in the art:

Total track length (TTL): the maximal distance, measured along an axis parallel to the optical axis of a lens, between a point of the front surface S1 of a first lens element L1 and an image sensor, when the system is focused to an infinity object distance.

Back focal length (BFL): the minimal distance, measured along an axis parallel to the optical axis of a lens, between a point of the rear surface S2N of the last lens element LN and an image sensor, when the system is focused to an infinity object distance.

Effective focal length (EFL): in a lens (assembly of lens elements L1 to LN), the distance between a rear principal point P' and a rear focal point F' of the lens.

f-number (f/#): the ratio of the EFL to an entrance pupil diameter.

BACKGROUND

Multi-aperture digital cameras (or multi-cameras) are standard in today's mobile handheld electronic devices (or in short "mobile devices", e.g. smartphones, tablets, etc.). In general, a Wide camera having a Wide camera field-of-view (FOV$_W$) of 70-90 degrees acts as the mobile device's main (or "primary") camera.

A main challenge is the design of Wide cameras that support ever higher image quality (IQ) and still fit into thin mobile devices with device heights of e.g. <10 mm. One promising path for improving the Wide camera's IQ is the incorporation of larger image sensors.

FIG. 1A illustrates schematically the definition of various camera entities such as TTL, EFL and BFL. In most miniature lenses which are used in multi-cameras incorporated in mobile devices, the TTL is larger than the EFL, as shown in FIG. 1A e.g. for a Wide lens.

FIG. 1B shows an exemplary camera having a lens with a field of view (FOV), an EFL and an image sensor with a sensor width S. For fixed width/height ratios and a (rectangular) image sensor, the sensor diagonal (SD) is proportional to the sensor width and height. For example, a 1/1.2" sensor has a SD of 14.3 mm. The horizontal FOV relates to EFL and sensor width S as follows:

$$\tan\left(\frac{FOV}{2}\right) = s/2/EFL$$

This shows that a larger EFL is required for realizing a camera with a larger image sensor, but similar FOV. Incorporating larger image sensors in Wide cameras is desirable for improving the Wide camera's IQ, but it requires larger EFL for maintaining the same (Wide camera) FOV, resulting in larger TTL, which is undesirable as it impedes the integration of the Wide camera in a mobile device.

Pop-out cameras resolve this conflict. They combine the advantages of a large TTL when the camera is in use ("pop-out state"), and a slim design by collapsing the TTL to a collapsed TTL ("c-TTL") when the camera is not in use ("collapsed state"). The c-TTL is compatible with the height dimensions of modern mobile devices. Only in the pop-out state, the pop-out camera is operational as a camera. Pop-out cameras are described for example in co-owned international patent application PCT/IB2020/058697.

It would be beneficial to have Wide camera lens designs that support pop-out Wide cameras including large image sensors such as 1/1.2" or larger, i.e. having a SD≥14.3 mm.

SUMMARY

In various examples there are provided lens systems for a compact digital camera, comprising an image sensor having a sensor diagonal SD and a lens with a field of view FOV>60 deg and having N≥6 lens elements L1-LN starting with L1 from an object side toward an image side, each lens element Li having a respective focal length $f_i$ with a magnitude $|f_i|$, the lens elements divided into two lens groups G1 and G2 separated by a big gap (BG), the lens having a pop-out total track length TTL<20 mm in a pop-out state and a collapsed total track length (c-TTL) in a collapsed state, wherein the lens system is configured to switch from a pop-out state to a collapsed state by collapsing BG to a collapsed BG (and vice versa), wherein BG>0.25×TTL, wherein SD≥12 mm, and wherein a ratio c-TTL/SD<0.7.

In some examples, G1 may include five or more lens elements and G2 may include 1 or 2 lens elements.

In some examples, the ratio c-TTL/TTL<0.7. In some examples, the ratio c-TTL/TTL<0.65.

In some examples, BG>0.3×TTL. In some examples, BG>0.35×TTL.

In some examples, a thickness $T_{G1}$ of G1 fulfills 0.35×TTL<$T_{G1}$<0.47×TTL.

In some examples, a power $P_{G1}$ of G1 fulfills $P_{G1}>0$ and a power $P_{G2}$ of G2 fulfills $P_{G2}<0$. In some examples, $-1.81 \leq P_{G1}/P_{G2} \leq -0.9$.

In some examples, i=6 and a sequence of lens powers $P_1$ to $P_6$ of lens elements L1 to L6 may be plus-minus-plus-minus-plus-minus.

In some examples, i=7 and a sequence of lens powers $P_1$ to $P_7$ of lens elements L1 to L7 may be plus-minus-minus-plus-minus-plus-minus, or plus-minus-plus-minus-minus-plus-minus, or plus-plus-minus-plus-minus-plus-minus, or plus-minus-plus-minus-plus-minus.

In some examples, i=8 and a sequence of lens powers $P_1$ to $P_8$ of lens elements L1 to L8 may be plus-plus-minus-plus-minus-plus-plus-minus, or plus-minus-minus-plus-minus-plus-plus-minus.

In some examples, the last two lens elements in G1 may have together an Abbe number 50<V<120 and an effective focal length EFL of 13 mm<EFL<50 mm.

In some examples, the focal length magnitude $|f_1|$ of L1 and the focal length magnitude $|f_6|$ of L6 may vary by <25%, and both $|f_1|$ and $|f_6|$ may be less than 45% of each of the magnitudes of focal lengths $|f_2|$, $|f_3|$, $|f_4|$ and $|f_5|$ of, respectively, L2, L3, L4 and L5.

In some examples, L1, L2, L3 and $L_4$ have a meniscus shape with respect to the object side and L5 and L6 have a meniscus shape with respect to the image side.

In some examples, the focal length magnitude $|f_4|$ of L4 may vary by more than 50% of each of the focal length magnitudes $|f_1|$, $|f_2|$, $|f_3|$, $|f_5|$, $|f_6|$ of, respectively, L1, L2, L3, L5 and L6.

In some examples, the focal length magnitude $|f_6|$ of L6 may vary by more than 100% of each of the magnitudes of focal lengths $|f_1|$, $|f_2|$, $|f_3|$, $|f_4|$, $|f_5|$.

In some examples, $P_{G1}/P_3$ does not vary by more than 10% from 1. In some examples, $P_{G1}/P_6$ does not vary by more than 10% from 1. In some examples, $P_{G1}/P_3$ and $P_{G1}/P_6$ do not vary by more than 20% from 1. In some examples, $P_{G1}/P_6$ and $P_{G1}/P_7$ do not vary by more than 20% from 1. In some examples, $P_{G1}/P_1$ does not vary by more than 20% from 1. In some examples, $P_{G1}/P_1$, $P_{G1}/P_5$ and $P_{G1}/P_7$ do not vary by more than 20% from 1. In some examples, $P_{G1}/P_6$ and $P_{G1}/P_8$ do not vary by more than 20% from 1. In some examples, $P_{G1}/P_3$, $P_{G1}/P_6$ and $P_{G1}/P_8$ do not vary by more than 10% from 1.

In some examples, one or more lens elements may be made of glass and the refractive index n of each of the one or more lens elements may be >1.7.

In some examples, $L_4$ is made of glass and has a refractive index n>1.7.

In some examples, $L_2$, $L_4$, $L_6$ are made of glass and have each a refractive index n>1.7.

In some examples, $L_4$ and $L_6$ are made of glass and have each a refractive index n>1.7.

In some examples, a deflection point at the front surface of $L_1$ is located at a distance d-f measured from an optical axis of the lens, wherein 1.5 mm<d-f<3.5 mm.

In some examples, a deflection point at the rear surface of $L_1$ is located at a distance d-r measured from an optical axis of the lens, wherein 1.5 mm<d-r<3.5 mm.

In some examples, a lens system as above or below may be included in a pop-out camera having a sensor with a sensor diagonal SD in the range of 10-30 mm.

In some examples, a lens system as above or below may be included in a pop-out camera having a sensor with a sensor diagonal SD in the range of 14-22 mm.

In some examples, a lens system as above or below may be included in a pop-out camera that is included in a smartphone.

In various examples there are provided lens systems for a lens system for a compact digital camera, comprising an image sensor having a sensor diagonal SD, and a lens with a field of view FOV>60 deg, having a f number (f/#), a lens thickness ("$T_{Lens}$") a back focal length (BFL) and an effective focal length (EFL), and having N≥6 lens elements L1-LN starting with L1 from an object side toward an image side each lens element Li having a respective focal length $f_i$, with a magnitude $|f_i|$, wherein the lens system is configured to switch from a pop-out state to a collapsed state by collapsing BFL to a collapsed BFL (and vice versa), wherein SD≥12 mm, wherein BFL>0.15×TTL, and wherein a ratio c-TTL/SD<0.65.

BRIEF DESCRIPTION OF THE DRAWINGS

Non-limiting examples of examples disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify examples disclosed herein and should not be considered limiting in any way. In the drawings.

DETAILED DESCRIPTION

Figure 1A:
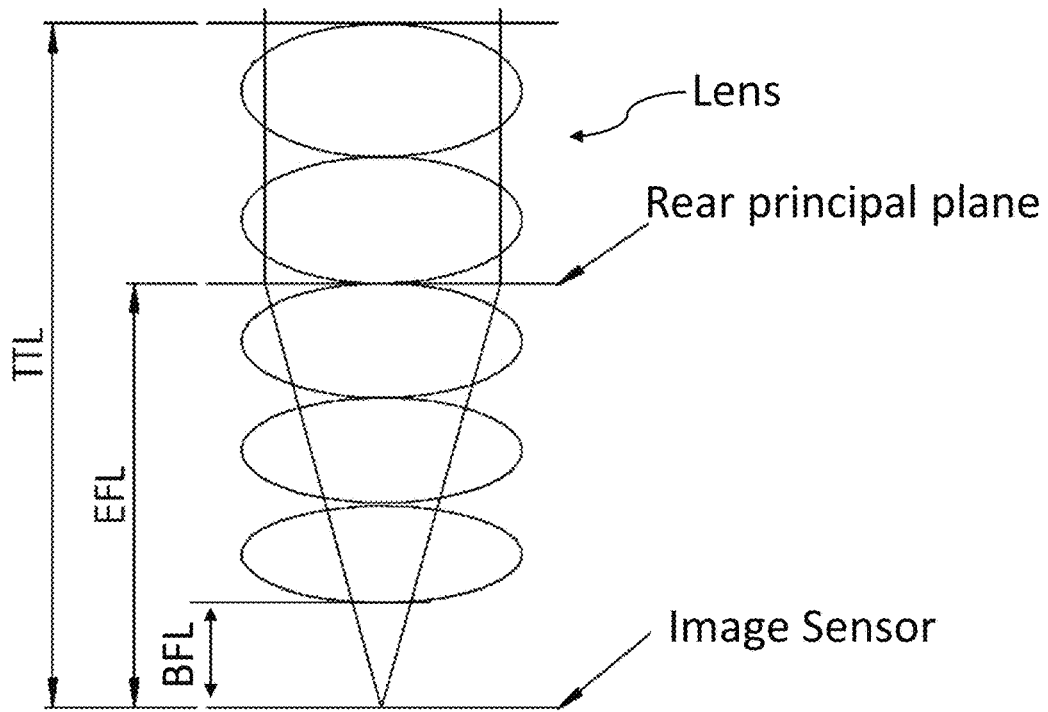
FIG. 1A illustrates schematically the definition of various entities such as TTL and EFL.
Figure 1B:
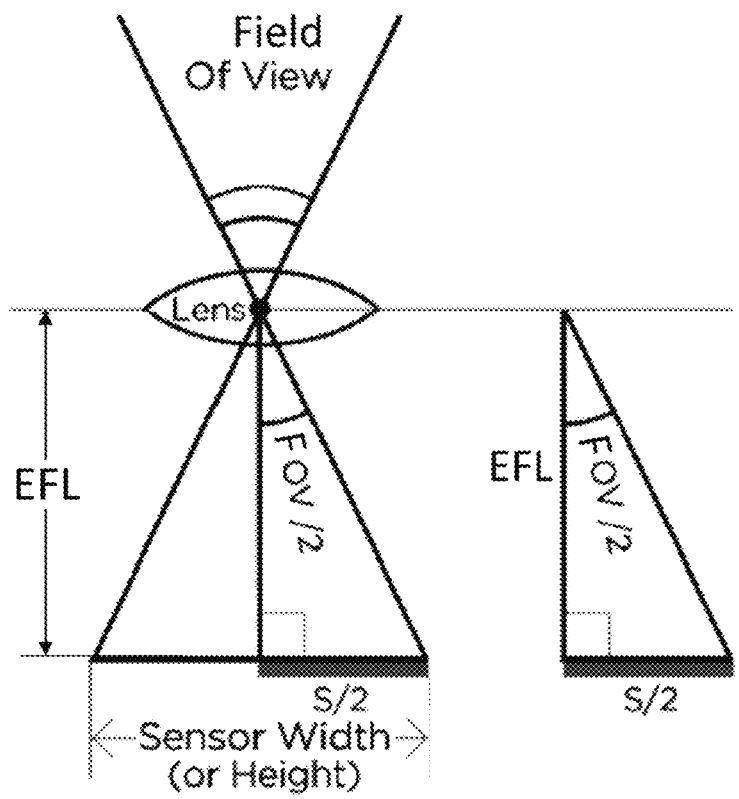
FIG. 1B shows definitions of FOV, EFL and S for a thin lens approximation or equivalence.
Figure 2A:
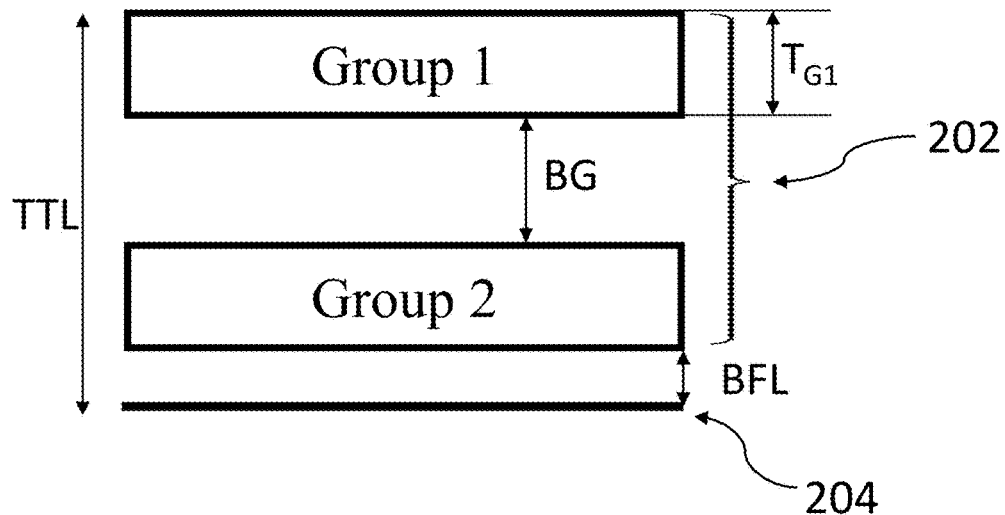
FIG. 2A shows schematically a pop-out optical lens system disclosed herein in a pop-out state focused to infinity.

FIG. 2A shows an example of a "2-group" (or "2G") pop-out optical lens system 200 that comprises a pop-out lens 202 and an image sensor 204 disclosed herein. Pop-out optical lens system 200 is shown in a pop-out or extended state (i.e. focused to infinity). Pop-out lens 202 is divided into two lens groups which are separated by a big gap (BG), a first, object-sided lens group ("G1") and a second, sensor-sided lens group ("G2"). The thickness of G1 is indicated by $T_{G1}$. Lens 202 includes a plurality of N lens elements Li (wherein "i" is an integer between 1 and N and wherein N may be for example between 5 and 9). L1 is the lens element closest to the object side and LN is the lens element closest to the image side, i.e. the side where the image sensor is located. This order holds for all lenses and lens elements disclosed herein. Each lens element Li comprises a respective front surface S2i-1 (the index "2i-1" being the number of the front surface) and a respective rear surface S2i (the index "2i" being the number of the rear surface). This numbering convention is used throughout the description. Alternatively, as done throughout this description, lens surfaces are marked as "Sk", with k running from 1 to 2N. The front surface and the rear surface may be in some cases aspherical. This is however not limiting.

As used herein the term "front surface" of each lens element refers to the surface of a lens element located closer to the entrance of the camera (camera object side) and the term "rear surface" refers to the surface of a lens element located closer to the image sensor (camera image side).

Each lens group includes one or more lens elements Li. G1 may include ≥5 elements and G2 may include 1-2 elements. G2 may act as a field lens as known in the art.

Figure 2B:
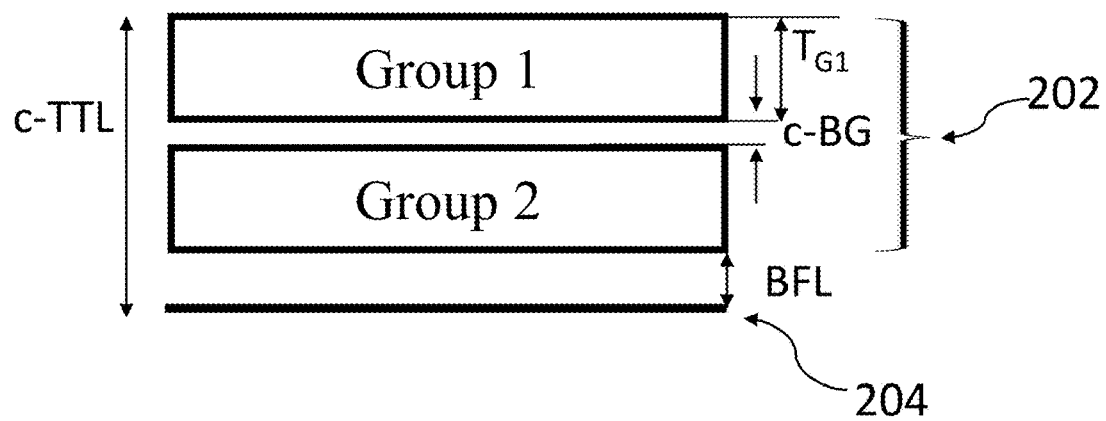
FIG. 2B shows schematically the pop-out system of FIG. 2A in a collapsed state.

FIG. 2B shows 2G pop-out optical lens system 200 in a collapsed state. Big gap BG is collapsed to a collapsed BG (marked "c-BG"), i.e. a distance between G1 and G2 is reduced, resulting in a collapsed TTL ("c-TTL"). c-BG may be in the range 0.2 mm-5 mm. Only BG changes. No other distances in pop-out optical lens system 200, such as distances between lens elements included in G1 and G2 respectively, change.

Figure 2C:
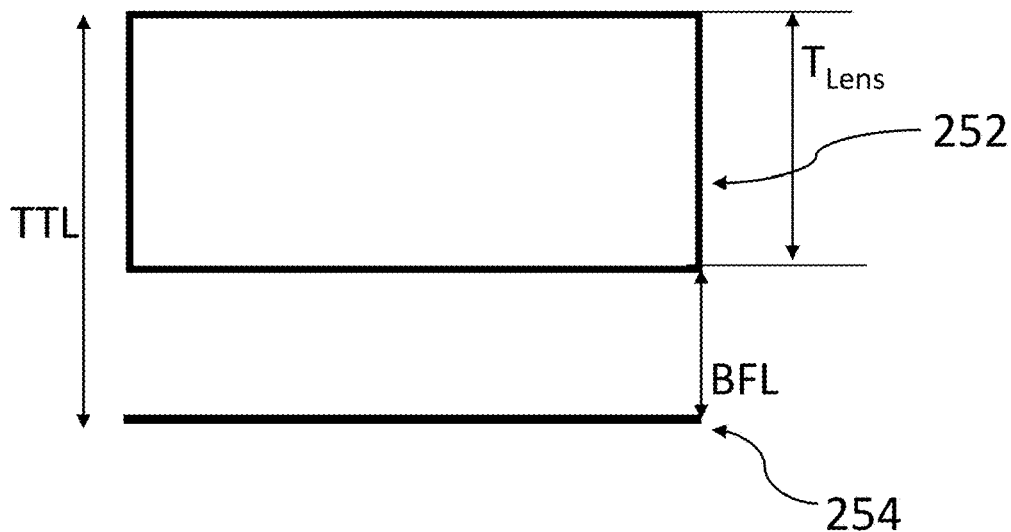
FIG. 2C shows schematically another pop-out optical lens system disclosed herein in a pop-out state.
Figure 2D:
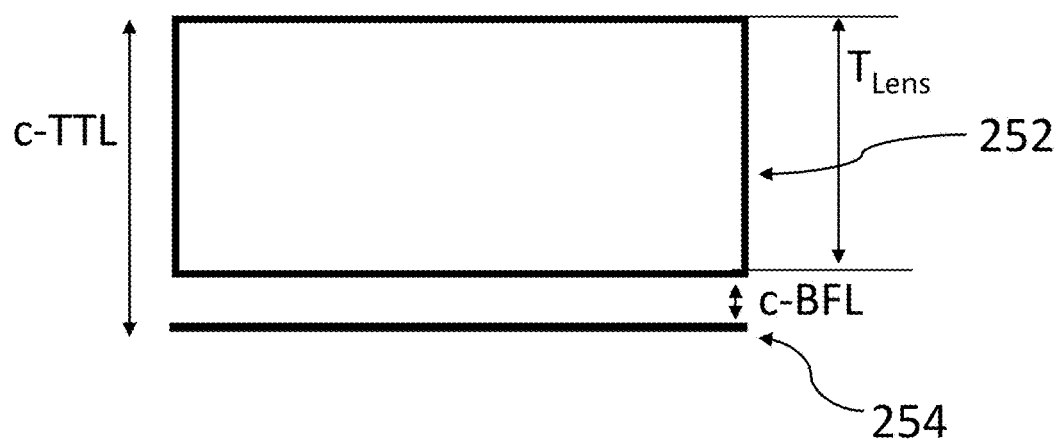
FIG. 2D shows schematically the pop-out system of FIG. 2C in a collapsed state.

FIG. 2C shows an example of a "1-group" (or "1G") pop-out optical lens system 250 that comprises a pop-out lens 252 having a thickness $T_{Lens}$ and an image sensor 254 disclosed herein. Pop-out optical lens system 250 is shown in a pop-out state. Pop-out lens 252 is not divided into two lens groups. FIG. 2D shows 1G pop-out optical lens system 250 in a collapsed state. BFL is collapsed to a collapsed BFL (marked "c-BFL"), i.e. the distance between lens 252 and image sensor 254 is reduced, resulting in a c-TTL. c-BFL may be in the range 0-3 mm. Only BFL changes. No other distances in pop-out optical lens system 250, such as distances between lens elements of lens 252, change.

2G pop-out optical lens system 200 and 1G pop-out optical lens system 250 can be included in a pop-out camera. For performing optical image stabilization (OIS), the pop-out camera may use several methods known in the art. Such methods may be "lens shift OIS", wherein the lens is moved relative to the image sensor and a camera hosting mobile device for OIS, or "sensor shift OIS", wherein the image sensor is moved relative to the lens and to a camera hosting mobile device for OIS.

Figure 3A:
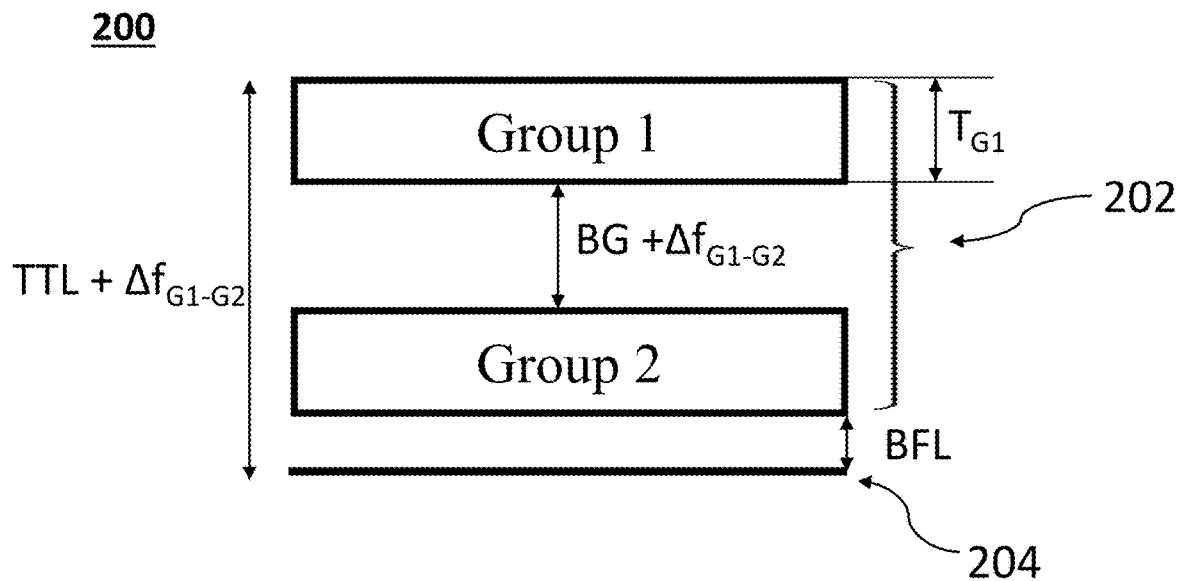
FIG. 3A shows the pop-out system of FIG. 2A focused to a closer (e.g. 50 cm) distance by focusing according to a first method.

All pop-out optical lens systems disclosed herein can be used in the pop-out camera examples described in co-owned PCT patent application PCT/IB2020/058697.

Wherein FIG. 2A shows 2G pop-out optical lens system 200 focused to infinity, FIG. 3A shows 2G pop-out optical lens system 200 focused to a closer object, e.g. focused to 1 m according to a first focusing method referred to as "G1-G2 focusing". For G1-G2 focusing, G1 and G2 move by a focus stroke $\Delta f_{G1\text{-}G2} = T_{Focus} - BG$ from a thickness given by BG to a thickness given by $T_{Focus}$ with respect to each other. BFL does not change, but BG changes. Values for BG and $T_{Focus}$ are given in Table 1 for all 2G lens systems disclosed herein. #BG indicates the surface that changes for G1-G2 focusing.

Figure 3B:
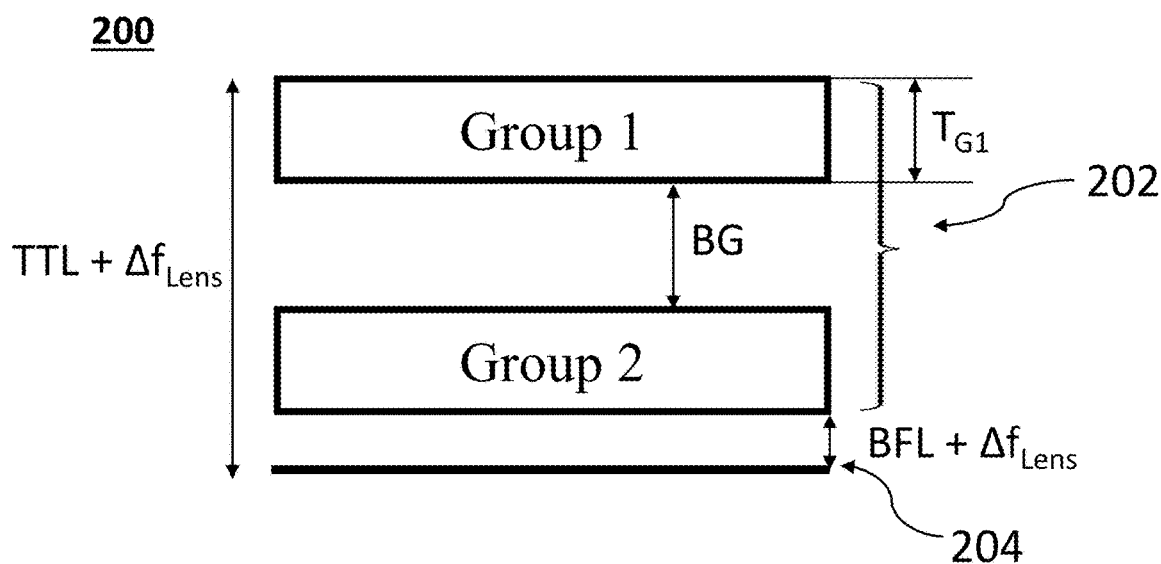
FIG. 3B shows the pop-out system of FIG. 2A focused to a closer (e.g. 50 cm) distance by focusing according to a second method.

FIG. 3B shows 2G pop-out optical lens system 200 focused to a closer object, e.g. focused to 1 m according to a second focusing method referred to as "lens focusing". For lens focusing, G1 and G2 move together as one lens by $\Delta f_{Lens}$ with respect to the image sensor. BG does not change, but BFL changes. Lens focusing is the standard method used in state of the art digital cameras in mobile electronic devices.

All 2G pop-out optical lens systems disclosed below can be both focused by G1-G2 focusing as well as by lens focusing. All 1G pop-out optical lens systems disclosed below are focused by lens focusing.

All pop-out optical lens systems disclosed below are shown in a pop-out state, where a pop-out camera including the optical lens system is operational In a collapsed state, all 2G pop-out optical lens system examples have a c-BG of 0.2 mm-4.4 mm. In a collapsed state, all 1G pop-out optical lens systems examples have a c-BFL of 1.0 mm-2.5 mm. A small c-BG and c-BFL respectively is beneficial for achieving a slim camera module that can be integrated in a slim mobile device such as a smartphone. To clarify, all lens systems disclosed herein may beneficially be included or incorporated in smartphones.

Table 1 shows the values and ranges that are included in lens system examples 400-1800 disclosed below (SD, TTL, c-TTL, BG, c-BG, EFL, TG1, $T_{Focus}$, $d_{L1\text{-}L2}$, $T_{Lens}$, $f_{LS}$, $f_{N-1}$ given in mm; Half-field-of-view ("HFOV") and 35 mm equivalent focal length ("35 mm EqFL") are given in degrees, Abbe number v, #$L_S$ and f number ("f/#") are given without units, and powers are given in inverse meter [1/m]. c-TTL$_{MIN}$ and c-TTL$_{MAX}$ respectively refer to a minimum and maximum c-TTL that can be achieved in the respective example. In general, in Table 1, "MIN" and "MAX" refer respectively to minimum and maximum values in a range.

"#$L_S$" represents the number of the strongest lens element in a lens, i.e. the lens element with the smallest, positive focal length f. "$f_{LS}$" represents the f of the strongest lens element in a lens. "$f_{N-1}$" represents the f of the N-1$^{th}$ (i.e. the second to last) lens element in a lens. $d_{L1\text{-}L2}$ represents a distance (or air gap) between L1 and L2.

For 2G type lens systems, $L_M$ refers to the last lens element in G1. The index "$L_{M-1}+L_M$" refers to properties of the two last lens elements in G1 together. For example, in example 400 $L_{M-1}+L_M$ refers to properties of L5 and L6 together, in example 1500 $L_{M-1}+L_M$ refers to properties of L6 and L7 together, etc. For performing G1-G2 focusing, BG represents the thickness of surface "#BG" when focused to infinity. "$T_{Focus}$" represents the thickness of surface "#BG" when focused to 1 m and 0.5 m respectively. The power of the entire G1 group is marked $P_{G1}$, the power of the entire G2 group is marked $P_{G2}$ and powers of individual lens elements are marked by the element number, i.e. the power of L1 is marked $P_1$, the power of L2 is marked $P_2$, etc. $T_{G1}$ gives the thickness of G1.

TABLE 1

| Example | 400 | 500 | 600 | 700 | 800 | 900 | 1000 | 1100 | 1200 | 1300 | 1400 | 1500 | MIN | MAX |
|---|---|---|---|---|---|---|---|---|---|---|---|---|---|---|
| Type | 2G | 2G | 2G | 2G | 2G | 2G | 2G | 2G | 2G | 2G | 2G | 2G | | |
| SD | 14.3 | 14.3 | 21.5 | 21.5 | 21.5 | 21.5 | 21.5 | 21.5 | 21.5 | 21.5 | 21.5 | 21.5 | 14.30 | 21.50 |
| TTL | 10.83 | 11.07 | 16.79 | 16.82 | 14.99 | 13.80 | 15.90 | 14.01 | 14.00 | 16.39 | 14.66 | 16.72 | 10.83 | 16.82 |
| c-TTL$_{MIN}$ | 6.49 | 6.50 | 9.01 | 9.00 | 9.01 | 9.00 | 9.00 | 9.00 | 9.00 | 8.80 | 8.80 | 8.81 | 6.49 | 9.01 |
| c-TTL$_{MAX}$ | 10.50 | 10.50 | 12.00 | 12.00 | 12.00 | 12.00 | 12.00 | 12.00 | 12.00 | 12.00 | 12.00 | 12.00 | 10.50 | 12.00 |
| BG | 4.54 | 4.78 | 7.98 | 8.01 | 6.18 | 5.00 | 7.10 | 5.20 | 5.20 | 7.79 | 6.07 | 8.12 | 4.54 | 8.12 |
| #BG | 13 | 13 | 13 | 13 | 13 | 11 | 13 | 13 | 13 | 13 | 13 | 15 | 11 | 15 |
| T$_{Focus}$ (1 m) | 4.6073 | 4.848 | 8.309 | 8.332 | 6.435 | | 7.237 | 5.321 | 5.313 | 8.071 | 6.318 | 8.396 | 4.607 | 8.309 |
| T$_{Focus}$ (0.5 m) | | | | | | 5.375 | | | | | | | 5.375 | 8.396 |
| c-BG$_{MIN}$ | 0.20 | 0.20 | 0.20 | 0.20 | 0.20 | 0.20 | 0.20 | 0.20 | 0.20 | 0.20 | 0.20 | 0.20 | 0.20 | 0.20 |
| c-BG$_{MAX}$ | 4.21 | 4.20 | 3.19 | 3.20 | 3.19 | 3.20 | 3.20 | 3.20 | 3.20 | 3.40 | 3.40 | 3.39 | 3.19 | 4.21 |
| EFL | 9.09 | 9.15 | 13.36 | 13.41 | 12.12 | 12.23 | 13.14 | 12.11 | 12.10 | 12.58 | 12.70 | 13.19 | 9.09 | 13.41 |
| T$_{G1}$ | 4.55 | 4.71 | 5.94 | 6.34 | 6.27 | 6.35 | 6.32 | 6.40 | 6.18 | 6.17 | 5.73 | 5.84 | 4.55 | 6.40 |
| P$_{G1}$ | 0.12 | 0.12 | 0.08 | 0.08 | 0.09 | 0.09 | 0.08 | 0.09 | 0.10 | 0.08 | 0.09 | 0.08 | 0.08 | 0.12 |
| P$_{G2}$ | -0.10 | -0.07 | -0.04 | -0.05 | -0.08 | -0.07 | -0.07 | -0.10 | -0.11 | -0.07 | -0.08 | -0.08 | -0.11 | -0.04 |
| v$_{LM+LM}$ | 75.80 | 76.39 | 71.87 | 79.38 | 80.34 | 75.35 | 75.80 | 75.80 | 93.91 | 56.87 | 109.10 | 76.28 | 56.87 | 109.10 |
| EFL$_{LM+LM}$ | 13.93 | 35.70 | 17.51 | 49.75 | 33.06 | 45.84 | 20.27 | 26.20 | 15.81 | 12.50 | 16.65 | 27.55 | 12.50 | 49.75 |
| f/# | 2.00 | 2.00 | 2.00 | 2.00 | 2.00 | 2.50 | 2.00 | 2.00 | 2.00 | 2.00 | 2.00 | 2.00 | 2.00 | 2.50 |
| HFOV | 38.00 | 38.00 | 38.70 | 38.60 | 41.30 | 41.10 | 39.10 | 41.20 | 41.20 | 39.30 | 39.80 | 39.40 | 38.00 | 41.30 |
| 35 mm EqFL | 27.59 | 27.77 | 26.97 | 27.06 | 24.47 | 24.69 | 26.53 | 24.44 | 24.43 | 25.40 | 25.64 | 26.62 | 24.43 | 27.77 |
| BG/TTL | 0.42 | 0.43 | 0.48 | 0.48 | 0.41 | 0.36 | 0.45 | 0.37 | 0.37 | 0.48 | 0.41 | 0.49 | 0.36 | 0.49 |
| c-TTL$_{MIN}$/TTL | 0.60 | 0.59 | 0.54 | 0.54 | 0.60 | 0.65 | 0.57 | 0.64 | 0.64 | 0.54 | 0.60 | 0.53 | 0.53 | 0.65 |
| c-TTL$_{MAX}$/TTL | 0.97 | 0.95 | 0.71 | 0.71 | 0.80 | 0.87 | 0.75 | 0.86 | 0.86 | 0.73 | 0.82 | 0.72 | 0.71 | 0.97 |
| T$_{G1}$/TTL | 0.42 | 0.43 | 0.35 | 0.38 | 0.42 | 0.46 | 0.40 | 0.46 | 0.44 | 0.38 | 0.39 | 0.35 | 0.35 | 0.46 |
| TTL/EFL | 1.19 | 1.21 | 1.26 | 1.25 | 1.24 | 1.13 | 1.21 | 1.16 | 1.16 | 1.30 | 1.15 | 1.27 | 1.13 | 1.30 |
| TTL/SD | 0.76 | 0.77 | 0.78 | 0.78 | 0.70 | 0.64 | 0.74 | 0.65 | 0.65 | 0.76 | 0.68 | 0.78 | 0.64 | 0.78 |
| P$_{G1}$/P$_{G2}$ | 0.45 | 0.45 | 0.42 | 0.42 | 0.42 | 0.42 | 0.42 | 0.42 | 0.42 | 0.41 | 0.41 | 0.41 | 0.41 | 0.45 |
| c-TTL$_{MIN}$/SD | -1.20 | -1.71 | -2.00 | -1.60 | -1.13 | -1.29 | -1.14 | -0.90 | -0.91 | -1.14 | -1.13 | -1.00 | -2.00 | -0.90 |
| c-TTL$_{MAX}$/SD | 0.45 | 0.45 | 0.42 | 0.42 | 0.42 | 0.42 | 0.42 | 0.42 | 0.42 | 0.41 | 0.41 | 0.41 | 0.41 | 0.45 |
| | 0.73 | 0.73 | 0.60 | 0.60 | 0.60 | 0.60 | 0.60 | 0.60 | 0.60 | 0.60 | 0.60 | 0.60 | 0.60 | 0.73 |

| Example | 1600 | 1700 | 1800 | MIN | MAX |
|---|---|---|---|---|---|
| Type | 1G | 1G | 1G | | |
| SD | 16 | 16 | 16 | 16.00 | 16.00 |
| TTL | 10.01 | 9.37 | 10.38 | 9.37 | 10.45 |
| C-TTL$_{MIN}$ | 8.18 | 8.75 | 8.90 | 8.18 | 9.42 |
| C-TTL$_{MAX}$ | 9.61 | 8.97 | 9.98 | 8.97 | 10.05 |
| BFL | 2.81 | 1.62 | 2.48 | 1.62 | 2.81 |
| C-BFL$_{MIN}$ | 1.00 | 1.00 | 1.00 | 1.00 | 1.00 |
| c-BFL$_{MAX}$ | 2.41 | 1.22 | 2.08 | 1.22 | 2.41 |
| d$_{L1-L2}$ | 0.017 | 0.086 | 0.074 | 0.02 | 0.09 |
| #L$_S$ | 1 | 2 | 3 | 1 | 3 |
| f$_{LS}$ | 7.02 | 7.03 | 5.99 | 5.99 | 7.03 |
| f$_{N-1}$ | 7.45 | 13.20 | 8.62 | 7.45 | 13.20 |
| EFL | 9.37 | 8.76 | 8.78 | 8.76 | 9.37 |
| T$_{Lens}$ | 7.20 | 7.75 | 7.90 | 7.18 | 8.42 |
| f/# | 1.84 | 1.86 | 1.68 | 1.68 | 1.86 |
| HFOV | 40.00 | 41.98 | 41.93 | 40.00 | 41.98 |

TABLE 1-continued

| | | | | |
|---|---|---|---|---|
| 35 mm EqFL | 25.42 | 23.77 | 23.83 | 23.77 | 25.42 |
| BFL/TTL | 0.28 | 0.17 | 0.24 | 0.17 | 0.28 |
| TTL/EFL | 1.07 | 1.07 | 1.18 | 1.07 | 1.19 |
| c-TTL$_{MIN}$/TTL | 0.82 | 0.93 | 0.86 | 0.82 | 0.93 |
| c-TTL$_{MAX}$/TTL | 0.96 | 0.96 | 0.96 | 0.96 | 0.96 |
| c-BFL$_{MIN}$/BFL | 0.36 | 0.62 | 0.40 | 0.36 | 0.62 |
| c-BFL$_{MAX}$/BFL | 0.86 | 0.75 | 0.84 | 0.75 | 0.86 |
| c-BFL$_{MIN}$/TTL | 0.10 | 0.11 | 0.10 | 0.10 | 0.11 |
| c-BFL$_{MAX}$/TTL | 0.24 | 0.13 | 0.20 | 0.13 | 0.24 |
| d$_{L1-L2}$/T$_{Lens}$ [%] | 0.75 | 1.11 | 0.93 | 0.24 | 1.11 |
| f$_{LS}$/EFL | 0.79 | 0.80 | 0.68 | 0.68 | 0.80 |
| f$_{N-1}$/EFL | 0.51 | 1.51 | 0.98 | 0.79 | 1.51 |
| c-TTL$_{MIN}$/SD | 0.60 | 0.55 | 0.56 | 0.51 | 0.56 |
| c-TTL$_{MAX}$/SD | 0.63 | 0.56 | 0.62 | 0.56 | 0.62 |
| TTL/SD | | 0.59 | 0.65 | 0.59 | 0.65 |

In all the 2G lens system examples 400-1500 disclosed below, ratios of TTL to EFL are in the range of TTL/EFL=1.13-1.3, ratios of TTL to SD are in the range of TTL/SD=0.64-0.78 and ratios of c-TTL to SD are in the range of c-TTL/SD=0.41-0.73.

In all the 1G lens system examples 1600-1800 disclosed below, ratios of TTL to EFL are in the range of TTL/EFL=1.05-1.3, ratios of TTL to SD are in the range of TTL/SD=0.59-0.65 and ratios of c-TTL to SD are in the range of c-TTL/SD=0.50-0.65.

Figure 4:
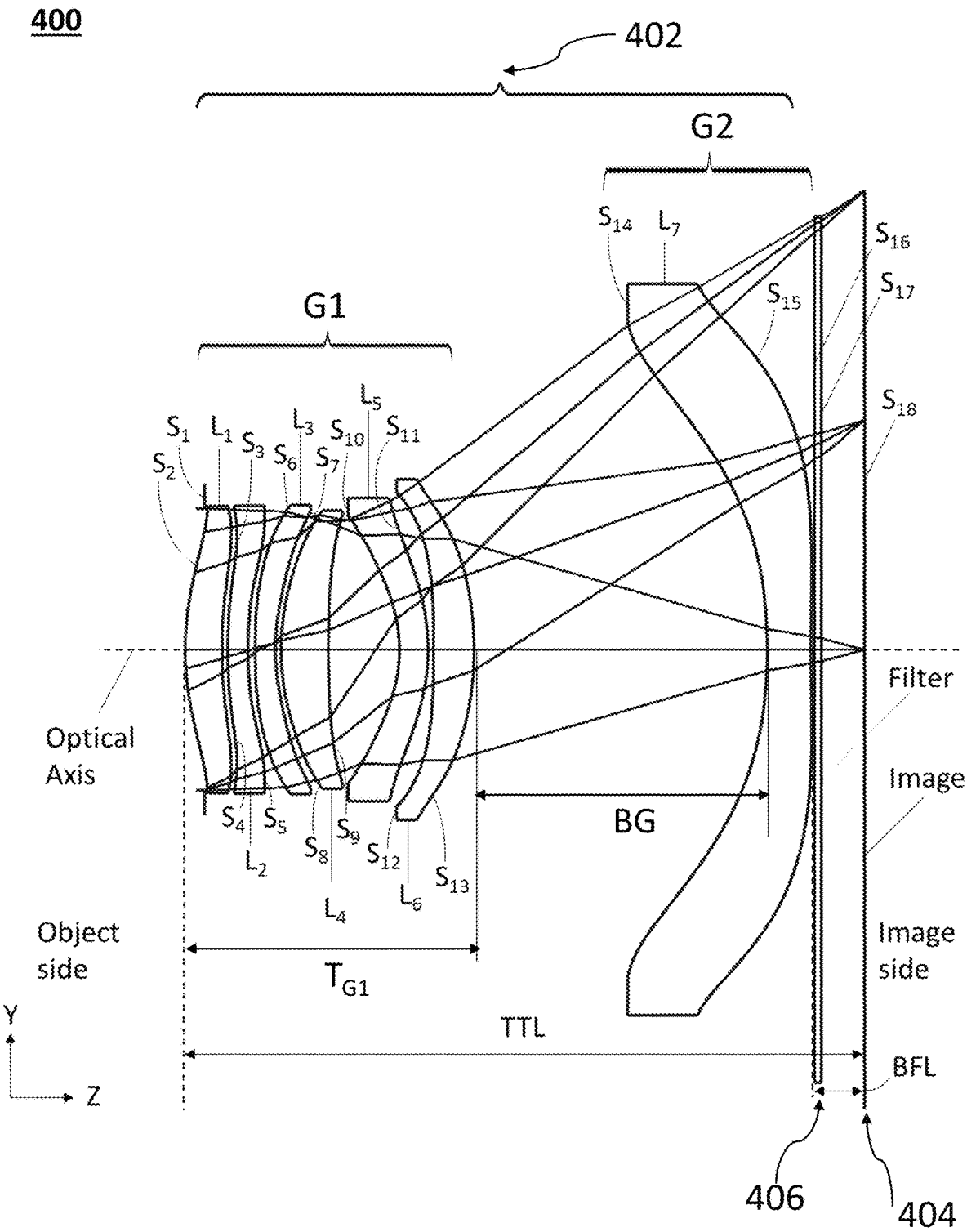
FIG. 4 shows an example of a pop-out optical lens system disclosed herein.

FIG. 4 shows an example of a 2G pop-out optical lens system disclosed herein and numbered 400. Lens system 400 comprises a pop-out lens 402 divided into two lens groups G1 and G2, an image sensor 404 and, optionally, an optical element 406. Optical element 406 may be for example infra-red (IR) filter, and/or a glass image sensor dust cover. Image sensor 404 may have a SD of 14.3 mm. G1 includes 6 lens elements and G2 includes one lens element. Optical rays pass through lens 402 and form an image on image sensor 404. FIG. 4 shows 3 fields with 3 rays for each: the upper marginal-ray, the lower marginal-ray and the chief-ray. All further figures show these 3 rays as well.

Detailed optical data and surface data for pop-out lens 402 are given in Tables 2-3. Table 2 provides surface types and Table 3 provides aspheric coefficients. The surface types are:

a) Plano: flat surfaces, no curvature.
b) Q type 1 (QT1) surface sag formula:

$$z(r) = \frac{cr^2}{1+\sqrt{1-(1+k)c^2r^2}} + D_{con}(u) \quad \text{(Eq. 1)}$$

-continued $$D_{con}(u) = u^4 \sum_{n=0}^{N} A_n Q_n^{con}(u^2)$$

$$u = \frac{r}{r_{norm}}, \quad x = u^2$$

$$Q_0^{con}(x) = 1 \quad Q_1^{con} = -(5-6x) \quad Q_2^{con} = 15-14x(3-2x)$$

$$Q_3^{con} = -\{35-12x[14-x(21-10x)]\}$$

$$Q_4^{con} = 70-3x\{168-5x[84-11x(8-3x)]\}$$

$$Q_5^{con} = -[126-x(1260-11x\{420-x[720-13x(45-14x)]\})]$$

c) Even Asphere (ASP) surface sag formula:

$$z(r) = \frac{cr^2}{1+\sqrt{1-(1+k)c^2r^2}} + \alpha_1 r^2 + \quad \text{(Eq. 2)}$$

$$\alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where $\{z, r\}$ are the standard cylindrical polar coordinates, c is the paraxial curvature of the surface, k is the conic parameter, $r_{norm}$ is generally one half of the surface's clear aperture (CA), and $A_n$ are the aspheric coefficients shown in lens data tables. The Z axis is positive towards the image side. Values for CA are given as a clear aperture radius, i.e. D/2. The reference wavelength is 555.0 nm. Units are in mm except for refractive index ("Index") and Abbe #. Each lens element Li has a respective focal length fi, given in Table 2. The FOV is given as half FOV (HFOV). The definitions for surface types, Z axis, CA values, reference wavelength, units, focal length and HFOV are valid for all following Tables.

TABLE 2

| EFL = 9.1 mm, F number = 2.0, HFOV = 38.0 deg. | | | | | | | | |
|---|---|---|---|---|---|---|---|---|
| Surface # | Comment | Type | Curvature Radius | Thickness | Aperture Radius (D/2) | Material | Index | Abbe # | Focal Length |
| 1 | A.S. | Plano | Infinity | −0.763 | 2.277 | | | | |
| 2 | Lens 1 | QTYP | 3.675 | 1.002 | 2.277 | Glass | 1.58 | 59.45 | 9.1 |
| 3 | | | 10.668 | 0.267 | 2.172 | | | | |
| 4 | Lens 2 | QTYP | −17.802 | 0.33 | 2.142 | Plastic | 1.65 | 21.78 | −27.6 |
| 5 | | | −1173.735 | 0.139 | 2.053 | | | | |
| 6 | Lens 3 | QTYP | 7.245 | 0.352 | 2 | Plastic | 1.64 | 23.37 | −54.94 |
| 7 | | | 5.901 | 0.284 | 1.933 | | | | |
| 8 | Lens 4 | QTYP | 5.005 | 0.335 | 1.896 | Glass | 1.75 | 27.71 | 44.59 |
| 9 | | | 5.712 | 0.486 | 2.039 | | | | |
| 10 | Lens 5 | QTYP | −4.956 | 0.336 | 2.168 | Plastic | 1.64 | 23.37 | −13.53 |
| 11 | | | −11.77 | 0.146 | 2.408 | | | | |
| 12 | Lens 6 | QTYP | −14.425 | 0.876 | 2.572 | Glass | 1.75 | 52.43 | 7.46 |
| 13 | | | −4.165 | See Table 1 | 2.724 | | | | |
| 14 | Lens 7 | QTYP | −10.03 | 0.793 | 5.449 | Plastic | 1.54 | 55.99 | −9.95 |
| 15 | | | 12.229 | 0.125 | 6.043 | | | | |
| 16 | Filter | Plano | Infinity | 0.11 | — | Glass | 1.52 | 64.17 | |
| 17 | | | Infinity | 0.71 | — | | | | |
| 18 | Image | Plano | Infinity | — | — | | | | |

TABLE 3

| Aspheric Coefficients | | | | | |
|---|---|---|---|---|---|
| Surface # | Conic | NR | A0 | A1 | A2 |
| 2 | 0 | 2.342E+00 | 1.992E−02 | 7.027E−03 | 4.692E−04 |
| 3 | 0 | 2.281E+00 | −5.697E−02 | 1.462E−03 | 2.110E−03 |
| 4 | 0 | 2.248E+00 | 1.843E−01 | −4.516E−02 | 1.827E−02 |
| 5 | 0 | 2.171E+00 | 1.687E−01 | −7.279E−02 | 2.341E−02 |
| 6 | 0 | 2.119E+00 | −1.877E−01 | 7.502E−03 | 3.492E−04 |
| 7 | 0 | 2.052E+00 | −2.883E−01 | 4.267E−02 | −1.419E−02 |
| 8 | 0 | 2.030E+00 | −5.376E−01 | −3.317E−02 | 5.467E−03 |
| 9 | 0 | 2.021E+00 | −1.957E−01 | −2.922E−02 | 3.914E−03 |
| 10 | 0 | 2.080E+00 | 2.800E−01 | −1.450E−03 | −1.028E−02 |
| 11 | 0 | 2.368E+00 | 9.984E−02 | 4.665E−03 | −3.114E−03 |
| 12 | 0 | 2.764E+00 | 1.094E−01 | 4.434E−02 | −1.455E−02 |
| 13 | 0 | 3.011E+00 | 5.529E−01 | 1.249E−01 | −1.748E−02 |
| 14 | 0 | 5.429E+00 | −9.400E−01 | 5.873E−01 | −8.047E−02 |
| 15 | 0 | 6.558E+00 | −4.270E+00 | 9.092E−01 | 1.250E−01 |

| Aspheric Coefficients (Continued) | | | | |
|---|---|---|---|---|
| Surface # | A3 | A4 | A5 | A6 |
| 2 | −5.328E−04 | −3.61E−04 | −1.36E−04 | −2.96E−05 |
| 3 | −3.989E−04 | 7.90E−04 | 2.83E−04 | 6.35E−05 |
| 4 | −1.692E−03 | 2.38E−03 | 4.36E−05 | 7.68E−05 |
| 5 | −1.542E−03 | 2.54E−03 | −1.49E−04 | 2.04E−04 |
| 6 | −5.703E−04 | 1.31E−03 | 3.76E−04 | 2.21E−04 |
| 7 | −3.759E−03 | −8.29E−04 | 9.62E−05 | 6.19E−05 |
| 8 | −2.216E−03 | −5.26E−04 | 7.02E−06 | 1.22E−04 |
| 9 | −1.573E−03 | 1.52E−04 | 9.63E−06 | 1.36E−05 |
| 10 | −1.068E−03 | 6.86E−04 | −2.64E−04 | −5.41E−05 |
| 11 | −3.039E−03 | −3.31E−04 | −6.04E−04 | 1.17E−04 |
| 12 | −1.017E−02 | −1.53E−03 | −4.08E−04 | 2.72E−04 |
| 13 | −1.869E−02 | −1.79E−03 | 1.68E−03 | 5.66E−04 |
| 14 | 1.904E−02 | −1.05E−02 | 2.40E−03 | −4.93E−05 |
| 15 | 1.202E−01 | −1.51E−02 | 5.10E−03 | −3.73E−03 |

The deflection point of L1 is located at a distance of 1.884 mm measured from the optical axis ("OA") at the rear surface. The magnitudes of the focal lengths of $L_1$ ($|f_1|$) and of $L_6$ ($|f_6|$) are similar, i.e. their magnitude may differ by <30%. The magnitudes $|f_1|$ and $|f_6|$ are pairwise much smaller than the magnitudes of all the focal lengths of the single lens elements $L_2$, $L_3$, $L_4$ and $L_5$, i.e. $|f_1|$, $|f_6| \ll |f_2|$, $|f_3|$, $|f_4|$, $|f_5|$. For example $|f_2|$, $|f_3|$, $|f_4|$, $|f_5|$ may be greater than $|f_1|$, $|f_6|$ by more than 45%. The ratio between the power of L1 ($P_1$) and $P_{G1}$ fulfills $P_1/P_{G1}=0.89$. Specifically, Table 4 shows ratios $|fi/f_1|$ and $|fi/f_6|$ and ratios between each $P_i$ and $P_{G1}$.

TABLE 4

| Lens element Li | $|fi/f_1|$ | $|fi/f_6|$ | $P_i/P_{G1}$ |
|---|---|---|---|
| 1 | 1.00 | 1.22 | 0.89 |
| 2 | 3.03 | 3.70 | −0.29 |

TABLE 4-continued

| Lens element Li | $|fi/f_1|$ | $|fi/f_6|$ | $P_i/P_{G1}$ |
|---|---|---|---|
| 3 | 6.04 | 7.36 | −0.15 |
| 4 | 4.90 | 5.97 | 0.18 |
| 5 | 1.49 | 1.81 | −0.60 |
| 6 | 0.82 | 1.00 | 1.09 |
| 7 | | | −0.82 |

Figure 5:
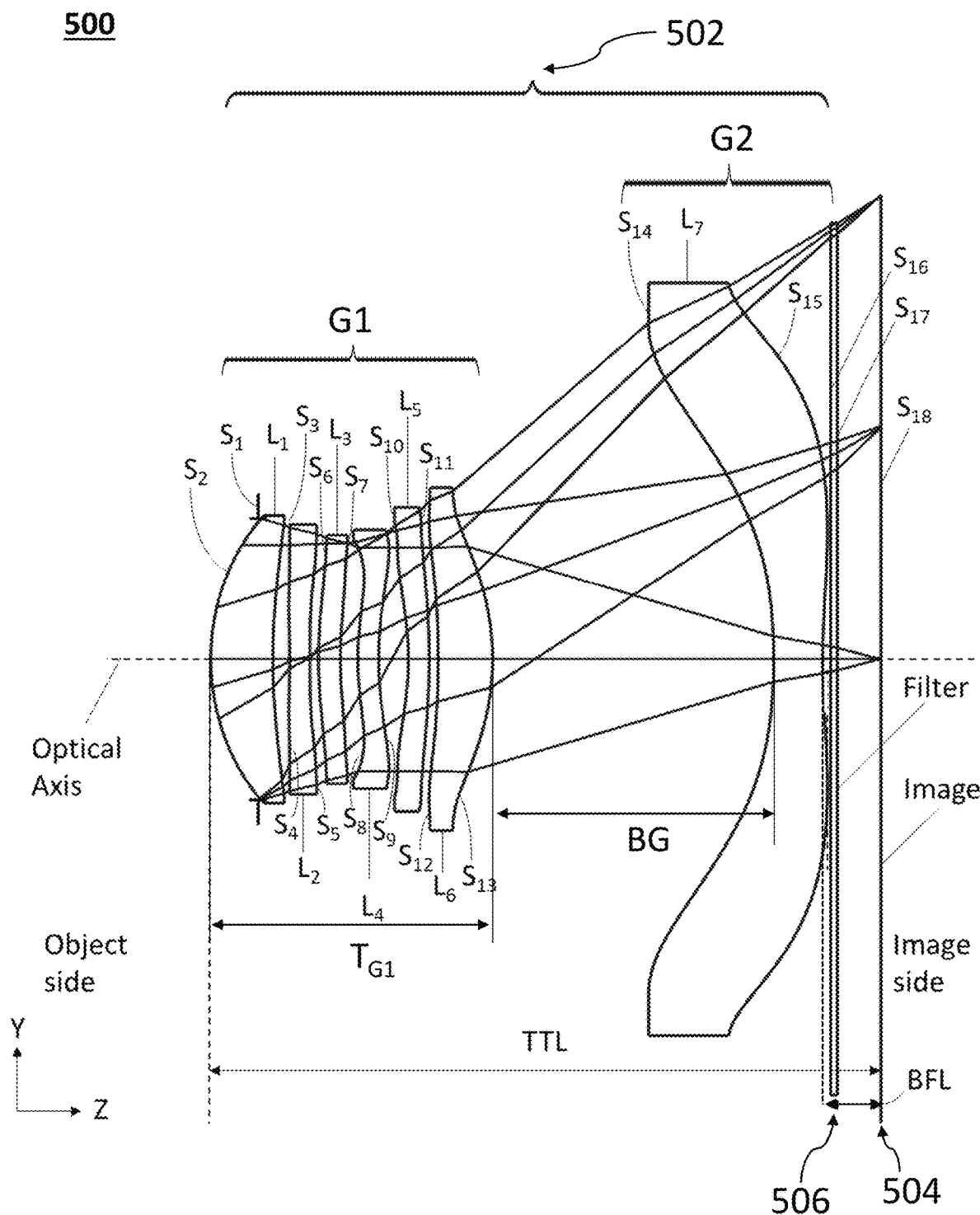
FIG. 5 shows another example of a pop-out optical lens system disclosed herein.

FIG. 5 shows another example of a 2G pop-out optical lens system disclosed herein and numbered 500. Lens system 500 comprises a pop-out lens 502 divided into two lens groups G1 and G2, an image sensor 504 and, optionally, an optical element 506. Image sensor 504 may have a SD of 14.3 mm ("1/1.2" sensor"). Table 5 provides surface types and Table 6 provides aspheric coefficients.

TABLE 5

| | | | | | | | | | |
|---|---|---|---|---|---|---|---|---|---|
| EFL = 9.15 mm, F number = 2.0, HFOV = 38.0 deg. | | | | | | | | | |
| Surface # | Comment | Type | Curvature Radius | Thickness | Aperture Radius (D/2) | Material | Index | Abbe # | Focal Length |
| 1 | A.S. | Plano | Infinity | −0.313 | 2.292 | | | | |
| 2 | Lens 1 | QTYP | 4.701 | 0.599 | 2.292 | Plastic | 1.55 | 56.02 | 17.87 |
| 3 | | QTYP | 8.623 | 0.093 | 2.291 | | | | |
| 4 | Lens 2 | QTYP | 10.955 | 0.33 | 2.283 | Plastic | 1.67 | 19.44 | −65.6 |
| 5 | | QTYP | 8.676 | 0.115 | 2.296 | | | | |
| 6 | Lens 3 | QTYP | 11.464 | 0.33 | 2.306 | Plastic | 1.59 | 28.3 | −8.38 |
| 7 | | QTYP | 3.421 | 0.091 | 2.226 | | | | |

TABLE 5-continued

EFL = 9.15 mm, F number = 2.0, HFOV = 38.0 deg.

| Surface # | Comment | Type | Curvature Radius | Thickness | Aperture Radius (D/2) | Material | Index | Abbe # | Focal Length |
|---|---|---|---|---|---|---|---|---|---|
| 8 | Lens 4 | QTYP | 3.71 | 0.77 | 2.22 | Glass | 1.88 | 40.78 | 5.02 |
| 9 | | QTYP | 19.987 | 1.166 | 2.121 | | | | |
| 10 | Lens 5 | QTYP | −2.38 | 0.466 | 2.133 | Plastic | 1.66 | 20.37 | −15.07 |
| 11 | | QTYP | −3.364 | 0.089 | 2.422 | | | | |
| 12 | Lens 6 | QTYP | −39.543 | 0.658 | 2.512 | Plastic | 1.55 | 56.02 | 11.83 |
| 13 | | QTYP | −5.606 | See Table 1 | 2.724 | | | | |
| 14 | Lens 7 | QTYP | −8.385 | 0.712 | 5.287 | Plastic | 1.53 | 56.16 | −13.35 |
| 15 | | QTYP | 49.689 | 0.058 | 5.914 | | | | |
| 16 | Filter | Plano | Infinity | 0.11 | — | Glass | 1.52 | 64.17 | |
| 17 | | Plano | Infinity | 0.71 | — | | | | |
| 18 | Image | Plano | Infinity | — | — | | | | |

TABLE 6

Aspheric Coefficients

| Surface # | Conic | NR | A0 | A1 | A2 |
|---|---|---|---|---|---|
| 2 | 0 | 2.312E+00 | −2.228E−01 | −2.048E−02 | −7.882E−05 |
| 3 | 0 | 2.310E+00 | −1.717E−01 | −4.906E−02 | 9.485E−03 |
| 4 | 0 | 2.302E+00 | −8.608E−02 | −7.006E−02 | 1.927E−02 |
| 5 | 0 | 2.322E+00 | 2.442E−02 | −9.880E−02 | 2.945E−02 |
| 6 | 0 | 2.344E+00 | 3.409E−01 | −2.368E−02 | 1.068E−02 |
| 7 | 0 | 2.308E+00 | −3.385E−01 | 5.580E−02 | −2.051E−02 |
| 8 | 0 | 2.253E+00 | −1.273E−01 | 2.876E−02 | −1.878E−03 |
| 9 | 0 | 2.150E+00 | 1.016E−01 | 5.743E−03 | 1.365E−03 |
| 10 | 0 | 2.112E+00 | 4.558E−01 | 2.672E−02 | 8.358E−03 |
| 11 | 0 | 2.379E+00 | 3.537E−01 | 2.741E−02 | −6.241E−04 |
| 12 | 0 | 2.487E+00 | −4.523E−01 | 8.071E−03 | −5.215E−03 |
| 13 | 0 | 2.642E+00 | −2.108E−01 | 8.015E−03 | 9.941E−03 |
| 14 | 0 | 5.429E+00 | −7.379E−01 | 4.538E−01 | −1.127E−02 |
| 15 | 0 | 6.558E+00 | −2.956E+00 | 7.554E−01 | 2.869E−01 |

Aspheric Coefficients (Continued)

| Surface # | A3 | A4 | A5 | A6 |
|---|---|---|---|---|
| 2 | −1.050E−05 | −9.895E−06 | 3.323E−05 | 6.008E−06 |
| 3 | −1.358E−03 | 8.433E−04 | −4.676E−04 | 1.264E−04 |
| 4 | −2.466E−03 | 1.023E−03 | −4.285E−04 | 6.084E−05 |
| 5 | −2.683E−03 | −5.068E−04 | 7.937E−05 | −7.299E−05 |
| 6 | −1.336E−03 | −8.614E−04 | 2.075E−04 | −3.049E−04 |
| 7 | −4.065E−03 | −6.339E−04 | −5.556E−05 | −4.174E−04 |
| 8 | −4.929E−04 | −3.378E−04 | −7.682E−05 | −7.572E−05 |
| 9 | 2.982E−04 | −1.878E−04 | −1.123E−04 | −3.653E−05 |
| 10 | 7.761E−04 | 4.735E−04 | −2.554E−05 | 5.436E−05 |
| 11 | −3.601E−04 | −5.909E−04 | −1.719E−04 | 2.542E−05 |
| 12 | 1.521E−03 | −1.550E−03 | −4.599E−04 | −2.452E−04 |
| 13 | 3.511E−03 | 2.021E−03 | −2.512E−04 | −1.698E−04 |
| 14 | 1.093E−02 | −6.463E−03 | −1.341E−03 | 4.945E−04 |
| 15 | 1.268E−01 | 2.273E−02 | 3.099E−03 | 7.579E−04 |

The power sequence for lens element from L1 to L7 is as follows: +−−+−+− (plus-minus-minus-plus-minus-plus-minus). Specifically, lens powers $P_i$ for lens element from L1 to L7 are given in Table 7. L1, L2 and L4 are each formed meniscus with respect to the object side. L5 and L6 are each formed meniscus with respect to the image side. $|f_4|$ is much smaller than the |f| of all the focal lengths of the single lens elements $L_1$, $L_2$, and $L_3$. That is, $|f_4| \ll |f_1|, |f_2|, |f_3|$. For example, $|f_1|, |f_2|, |f_3|$ may be greater than $|f_4|$ by more than 50%. L4 is made of glass, with a refractive index n>1.7. $P_{G1}$ and $P_3$ are similar, i.e. $P_{G1}/P_3$ does not vary by more than 10% from 1. Specifically, Table 7 shows powers $P_i$, ratios $|f/f_4|$, and ratios between each $P_i$ and $P_{G1}$

TABLE 7

| Lens element Li | $P_i$ | $|f/f_4|$ | $P_i/P_{G1}$ |
|---|---|---|---|
| 1 | 0.06 | 3.56 | 0.47 |
| 2 | −0.02 | 13.06 | −0.13 |
| 3 | −0.12 | 1.67 | −1.00 |
| 4 | 0.20 | 1.00 | 1.67 |
| 5 | −0.066 | 3.00 | −0.56 |
| 6 | 0.08 | 2.36 | 0.71 |
| 7 | −0.07 | | −0.63 |

Figure 6:
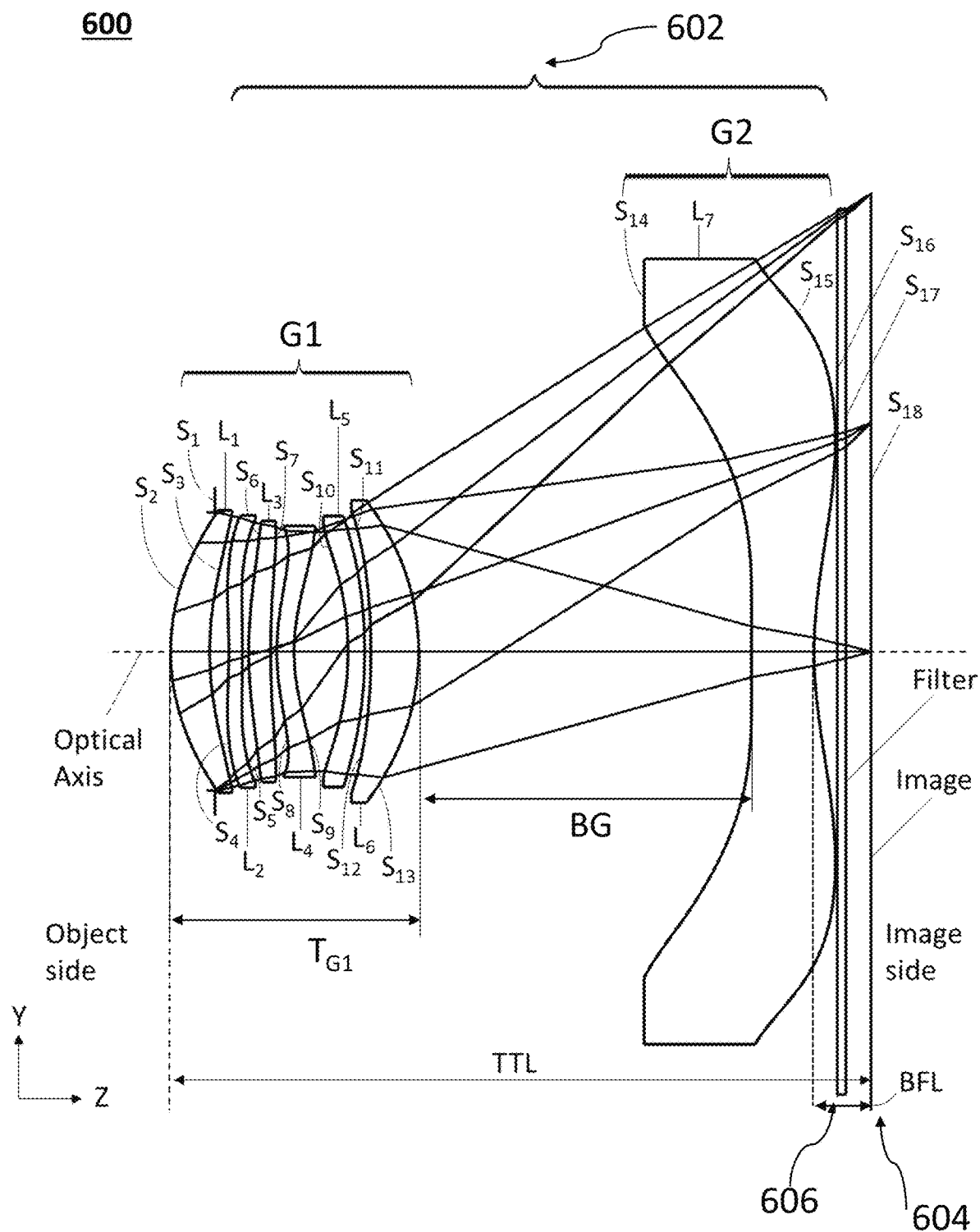
FIG. 6 shows yet another example of a pop-out optical lens system disclosed herein.

FIG. 6 shows yet another example of a 2G pop-out optical lens system disclosed herein and numbered 600. Lens system 600 comprises a pop-out lens 602 divided into G1 and G2, an image sensor 604 and, optionally, an optical element 606. Image sensor 604 may have a SD of 21.5 mm ("1/0.8" sensor"). Table 8 provides surface types and Table 9 provides aspheric coefficients.

an Abbe-$\#_{L5+L6}$=71.87 and an $EFL_{L5+L6}$=17.51 mm. $|f_6|$ is much smaller than the magnitude of all the focal lengths of the single lens elements $L_1, L_2, L_3, L_4, L_5$, i.e. $|f_6|<<|f_1|, |f_2|, |f_3|, |f_4|, |f_5|$. For example, $|f_1|, |f_2|, |f_3|, |f_4|, |f_5|$ may be

TABLE 8

| | | | EFL = 13.4 mm, F number = 2.0, HFOV = 38.7 deg. | | | | | | |
|---|---|---|---|---|---|---|---|---|---|
| Surface # | Comment | Type | Curvature Radius | Thickness | Aperture Radius (D/2) | Material | Index | Abbe # | Focal Length |
| 1 | A.S. | Plano | Infinity | −1.058 | 3.34 | | | | |
| 2 | Lens 1 | QTYP | 5.277 | 0.933 | 3.34 | Glass | 1.58 | 59.45 | 25.23 |
| 3 | | QTYP | 7.679 | 0.457 | 3.258 | | | | |
| 4 | Lens 2 | QTYP | −19.149 | 0.329 | 3.216 | Glass | 1.8 | 28.39 | −153.41 |
| 5 | | QTYP | −22.862 | 0.149 | 3.113 | | | | |
| 6 | Lens 3 | QTYP | 11.011 | 0.523 | 3.088 | Glass | 1.65 | 58.52 | 33.17 |
| 7 | | QTYP | 21.954 | 0.149 | 3.028 | | | | |
| 8 | Lens 4 | QTYP | 5.875 | 0.412 | 2.957 | Glass | 1.75 | 27.71 | −35.61 |
| 9 | | QTYP | 4.675 | 1.292 | 2.962 | | | | |
| 10 | Lens 5 | QTYP | −7.251 | 0.399 | 2.985 | Plastic | 1.67 | 19.44 | −30.04 |
| 11 | | QTYP | −11.536 | 0.149 | 3.203 | | | | |
| 12 | Lens 6 | QTYP | −16.526 | 1.152 | 3.358 | Glass | 1.75 | 52.43 | 11.72 |
| 13 | | QTYP | −5.945 | See Table 1 | 3.578 | | | | |
| 14 | Lens 7 | QTYP | 131.123 | 1.496 | 7.781 | Glass | 1.5 | 56.41 | −23.02 |
| 15 | | QTYP | 10.598 | 0.551 | 9.375 | | | | |
| 16 | Filter | Plano | Infinity | 0.21 | — | Glass | 1.52 | 64.17 | |
| 17 | | Plano | Infinity | 0.61 | — | | | | |
| 18 | Image | Plano | Infinity | — | — | | | | |

TABLE 9

| | | Aspheric Coefficients | | | |
|---|---|---|---|---|---|
| Surface # | Conic | NR | A0 | A1 | A2 |
| 2 | 0 | 3.435E+00 | −8.330E−02 | −1.460E−02 | −1.340E−03 |
| 3 | 0 | 3.346E+00 | −2.180E−01 | −8.720E−03 | 4.973E−03 |
| 4 | 0 | 3.296E+00 | 6.016E−01 | −3.329E−02 | 6.221E−03 |
| 5 | 0 | 3.185E+00 | 5.671E−01 | −3.032E−02 | 3.896E−03 |
| 6 | 0 | 3.107E+00 | −1.547E−01 | 2.423E−03 | 6.657E−03 |
| 7 | 0 | 3.009E+00 | −6.753E−02 | −1.839E−02 | 1.766E−03 |
| 8 | 0 | 2.977E+00 | −6.020E−01 | −3.387E−02 | −4.751E−03 |
| 9 | 0 | 2.964E+00 | −5.604E−01 | 9.384E−03 | 4.645E−04 |
| 10 | 0 | 3.051E+00 | 3.974E−02 | 3.237E−02 | 6.908E−03 |
| 11 | 0 | 3.473E+00 | −5.742E−02 | 1.715E−02 | 2.850E−04 |
| 12 | 0 | 4.053E+00 | −2.565E−01 | −1.954E−02 | −1.276E−02 |
| 13 | 0 | 4.416E+00 | 5.790E−02 | 9.910E−02 | 2.532E−02 |
| 14 | 0 | 7.963E+00 | −3.528E+00 | 7.011E−01 | 8.371E−02 |
| 15 | 0 | 9.619E+00 | −8.035E+00 | 3.629E−01 | −6.957E−02 |
| | | Aspheric Coefficients (Continued) | | | |
| Surface # | | A3 | A4 | A5 | A6 |
| 2 | | 6.450E−04 | 6.734E−05 | 1.684E−05 | 1.215E−05 |
| 3 | | 3.093E−03 | −7.664E−04 | −2.648E−05 | 1.238E−04 |
| 4 | | 3.051E−03 | −2.713E−04 | 5.560E−04 | −1.247E−04 |
| 5 | | 2.892E−03 | 1.264E−03 | 9.987E−04 | −1.156E−04 |
| 6 | | 1.069E−03 | 1.115E−03 | 2.658E−04 | −1.238E−04 |
| 7 | | −1.370E−03 | 2.450E−04 | −3.497E−05 | −8.649E−05 |
| 8 | | −5.961E−05 | 1.049E−04 | 2.363E−04 | −3.592E−06 |
| 9 | | 1.054E−03 | −2.871E−04 | 9.801E−05 | −6.196E−06 |
| 10 | | −2.147E−04 | −1.235E−03 | 3.796E−05 | 1.015E−04 |
| 11 | | −4.169E−03 | −3.032E−03 | 1.568E−03 | 2.758E−04 |
| 12 | | −3.579E−03 | 4.638E−03 | 6.031E−03 | 8.180E−04 |
| 13 | | −8.018E−03 | −9.655E−03 | −2.828E−03 | −2.185E−04 |
| 14 | | 3.460E−02 | 5.576E−04 | −3.777E−03 | −1.705E−04 |
| 15 | | 1.066E−01 | 7.556E−03 | −1.287E−02 | −4.342E−04 |

The power sequence for lens element from L1 to L7 is as follows: +−+−−+− (plus-minus-plus-minus-minus-plus-minus). L5 and L6 (last 2 lens elements of G1) together have greater than $|f_6|$ by more than 100%. L2, L4 and L6 are made of glass, with a refractive index n>1.7. $P_{G1}$ and $P_6$ are similar, i.e. $P_{G1}/P_6$ does not vary by more than 10% from 1.

Specifically, Table 10 shows powers $P_i$, ratios $|f/f_6|$ and ratios between each $P_i$ and $P_{G1}$.

TABLE 10

| Lens element Li | $P_i$ | $|f/f_6|$ | $P_i/P_{G1}$ | Refractive Index n |
|---|---|---|---|---|
| 1 | 0.04 | 2.15 | 0.50 | 1.58 |
| 2 | −0.01 | 13.09 | −0.08 | 1.80 |
| 3 | 0.03 | 2.83 | 0.38 | 1.65 |
| 4 | −0.03 | 3.04 | −0.36 | 1.75 |
| 5 | −0.03 | 2.56 | −0.42 | 1.68 |

TABLE 10-continued

| Lens element Li | $P_i$ | $|f/f_6|$ | $P_i/P_{G1}$ | Refractive Index n |
|---|---|---|---|---|
| 6 | 0.09 | 1.00 | 1.08 | 1.76 |
| 7 | −0.04 | 1.00 | −0.55 | 1.50 |

Figure 7:
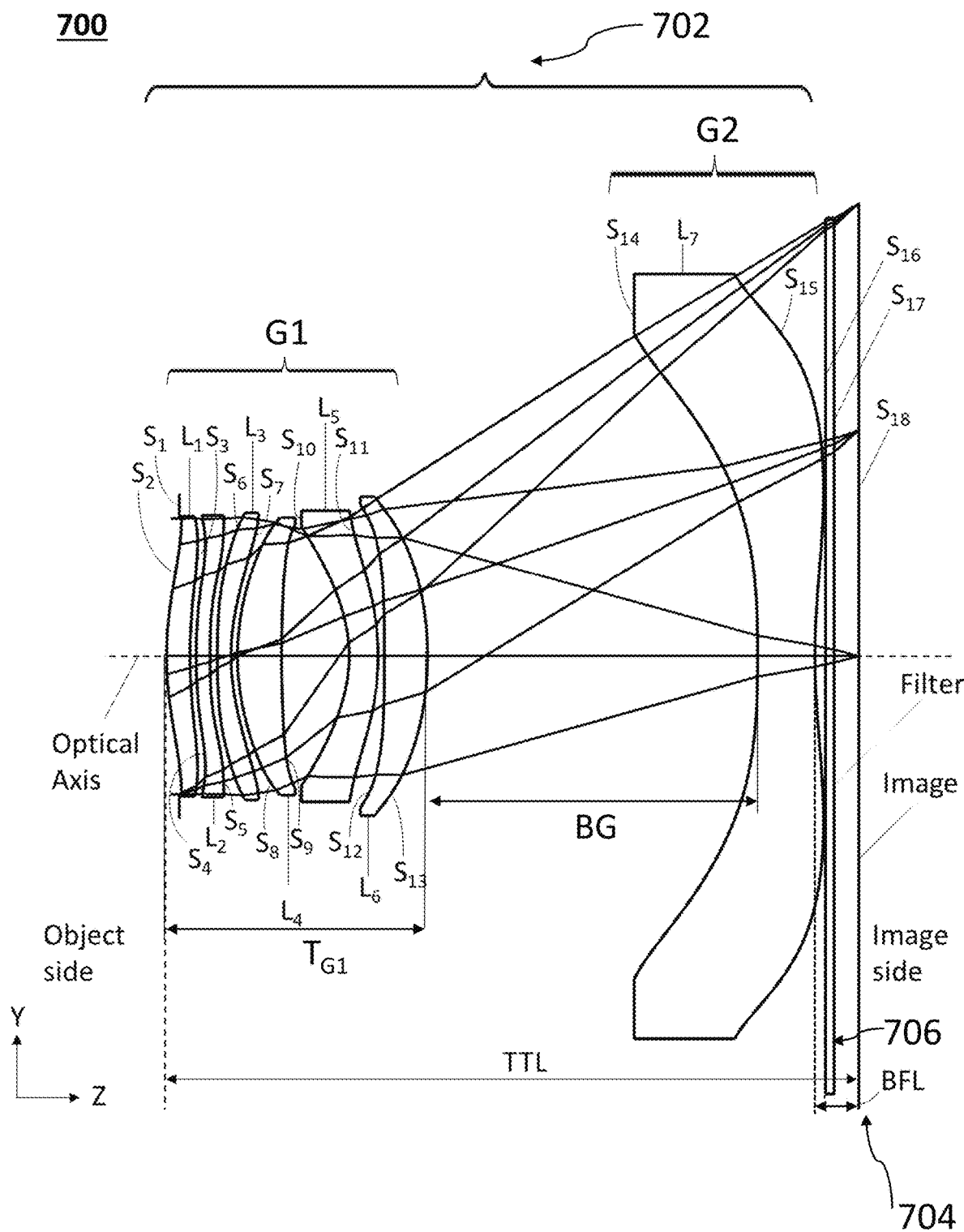
FIG. 7 shows yet another example of a pop-out optical lens system disclosed herein.

FIG. 7 shows yet another example of a 2G pop-out optical lens system disclosed herein and numbered 700. Lens system 700 comprises a pop-out lens 702 divided into G1 and G2, an image sensor 704 and, optionally, an optical clement 706. Image sensor 204 may have a SD of 21.5 mm ("1/0.8" sensor"). Table 11 provides surface types and Table 12 provides aspheric coefficients.

TABLE 11

EFL = 13.4 mm, F number = 2.0, HFOV = 38.6 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −0.307 | 3.352 | | | | |
| 2 | Lens 1 | QTYP | 8.118 | 0.57 | 3.352 | Plastic | 1.55 | 56.02 | 37.83 |
| 3 | | QTYP | 13.007 | 0.15 | 3.355 | | | | |
| 4 | Lens 2 | QTYP | 13.861 | 0.33 | 3.342 | Plastic | 1.67 | 19.44 | 151.7 |
| 5 | | QTYP | 15.876 | 0.182 | 3.375 | | | | |
| 6 | Lens 3 | QTYP | 25.961 | 0.33 | 3.44 | Plastic | 1.58 | 28.22 | −11.25 |
| 7 | | QTYP | 5.248 | 0.157 | 3.396 | | | | |
| 8 | Lens 4 | QTYP | 5.778 | 1.071 | 3.325 | Glass | 1.88 | 40.78 | 7.59 |
| 9 | | QTYP | 37.193 | 1.637 | 3.16 | | | | |
| 10 | Lens 5 | QTYP | −3.556 | 0.712 | 3.106 | Plastic | 1.63 | 23.36 | −16.78 |
| 11 | | QTYP | −5.742 | 0.15 | 3.487 | | | | |
| 12 | Lens 6 | QTYP | 1654.871 | 1.052 | 3.633 | Plastic | 1.55 | 56.02 | 14.14 |
| 13 | | QTYP | −7.788 | See Table 1 | 3.834 | | | | |
| 14 | Lens 7 | QTYP | −33.826 | 1.386 | 7.797 | Plastic | 1.53 | 56.16 | −20.36 |
| 15 | | QTYP | 16.297 | 0.256 | 9.247 | | | | |
| 16 | Filter | Plano | Infinity | 0.21 | — | Glass | 1.52 | 64.17 | |
| 17 | | Plano | Infinity | 0.61 | — | | | | |
| 18 | Image | Plano | Infinity | — | — | | | | |

TABLE 12

Aspheric Coefficients

| Surface # | Conic | NR | A0 | A1 | A2 | A3 |
|---|---|---|---|---|---|---|
| 2 | 0 | 3.390E+00 | −3.730E−01 | −1.514E−02 | 2.945E−03 | −4.989E−04 |
| 3 | 0 | 3.388E+00 | −2.961E−01 | −3.935E−02 | 4.904E−03 | 2.612E−05 |
| 4 | 0 | 3.376E+00 | −2.066E−01 | −8.890E−02 | 1.620E−02 | 3.787E−03 |
| 5 | 0 | 3.405E+00 | 6.021E−02 | −1.244E−01 | 3.506E−02 | 4.437E−03 |
| 6 | 0 | 3.438E+00 | 4.547E−01 | −6.225E−02 | 2.113E−02 | 5.558E−04 |
| 7 | 0 | 3.385E+00 | −5.643E−01 | 5.145E−03 | −1.265E−02 | −1.390E−03 |
| 8 | 0 | 3.304E+00 | −1.129E−01 | 4.829E−02 | 2.524E−03 | 7.171E−04 |
| 9 | 0 | 3.154E+00 | 1.262E−01 | 3.003E−02 | 6.768E−03 | 1.160E−03 |
| 10 | 0 | 3.098E+00 | 6.435E−01 | 2.731E−02 | 1.313E−02 | 1.166E−03 |
| 11 | 0 | 3.489E+00 | 4.682E−01 | 1.917E−02 | 2.533E−04 | −4.889E−04 |
| 12 | 0 | 3.647E+00 | −5.625E−01 | −3.789E−03 | −1.003E−02 | 3.206E−03 |
| 13 | 0 | 3.876E+00 | −2.461E−01 | −1.794E−02 | 7.369E−03 | 6.491E−03 |
| 14 | 0 | 7.963E+00 | −2.665E+00 | 5.812E−01 | −4.696E−02 | 3.626E−02 |
| 15 | 0 | 9.619E+00 | −5.889E+00 | 5.626E−01 | 1.325E−02 | 1.334E−01 |

Aspheric Coefficients (Continued)

| Surface # | A4 | A5 | A6 |
|---|---|---|---|
| 2 | −4.893E−04 | 3.602E−05 | 9.729E−05 |
| 3 | −1.171E−03 | 9.917E−04 | −3.303E−05 |
| 4 | −2.122E−03 | 1.619E−03 | −3.584E−04 |
| 5 | −4.114E−03 | 1.635E−03 | −4.492E−04 |
| 6 | −2.004E−03 | 8.672E−04 | −1.981E−04 |
| 7 | 8.441E−04 | 8.169E−04 | −3.232E−04 |
| 8 | −2.463E−04 | 2.781E−04 | −3.720E−05 |
| 9 | −3.417E−05 | −2.070E−06 | 1.232E−05 |
| 10 | 6.432E−04 | 1.006E−04 | 7.294E−05 |

TABLE 12-continued

| | | | |
|---|---|---|---|
| 11 | −4.309E−04 | 3.393E−05 | −3.081E−05 |
| 12 | 2.586E−04 | 4.192E−04 | −1.253E−05 |
| 13 | 3.107E−03 | 9.339E−04 | 2.311E−04 |
| 14 | −4.361E−03 | −1.111E−03 | −1.748E−03 |
| 15 | 1.995E−04 | 2.381E−03 | −2.411E−04 |

The power sequence for lens element from L1 to L7 is as follows: ++−+−+− (plus-plus-minus-plus-minus-plus-minus), see Table 13. L5 and L6 (the last 2 lens elements of G1) together have an Abbe-$\#_{L5+L6}$=79.38 and an $EFL_{L5+L6}$=49.75 mm. $|f_4|$ is much smaller than that of all the focal lengths of the single lens elements $L_1$, $L_2$, $L_3$ $L_5$, $L_6$, i.e. $|f_4|\ll|f_1|$, $|f_2|$, $|f_3|$, $|f_5|$, $|f_6|$. For example, $|f_1|$, $|f_2|$, $|f_3|$, $|f_5|$, $|f_6|$ may be greater than $|f_4|$ by more than 80%.

The deflection point of L1 is located at a distance of 3.275 mm measured from the OA at the front surface and at a distance of 2.749 mm measured from the OA at the rear surface. $P_{G1}$ and $P_3$, as well as $P_{G1}$ and $P_6$ are similar, i.e. $P_{G1}/P_3$ as well as $P_{G1}/P_6$ do not vary by more than 20% from 1. L4 is made of glass, with a refractive index n>1.7. Specifically, Table 13 also shows powers $P_i$, ratios between each $P_i$ and $P_{G1}$, ratios $|f/f_4|$ and refractive indexes of each lens element.

TABLE 13

| Lens element Li | $P_i$ | $P_i/P_{G1}$ | $|f/f_4|$ | Refractive index n |
|---|---|---|---|---|
| 1 | 0.03 | 0.33 | 4.98 | 1.55 |
| 2 | 0.01 | 0.08 | 19.99 | 1.68 |
| 3 | −0.09 | −1.12 | 1.48 | 1.59 |
| 4 | 0.13 | 1.67 | 1.00 | 1.89 |
| 5 | −0.06 | −0.75 | 2.21 | 1.64 |
| 6 | 0.07 | 0.89 | 1.86 | 1.55 |
| 7 | −0.05 | −0.62 | | 1.53 |

Figure 8:
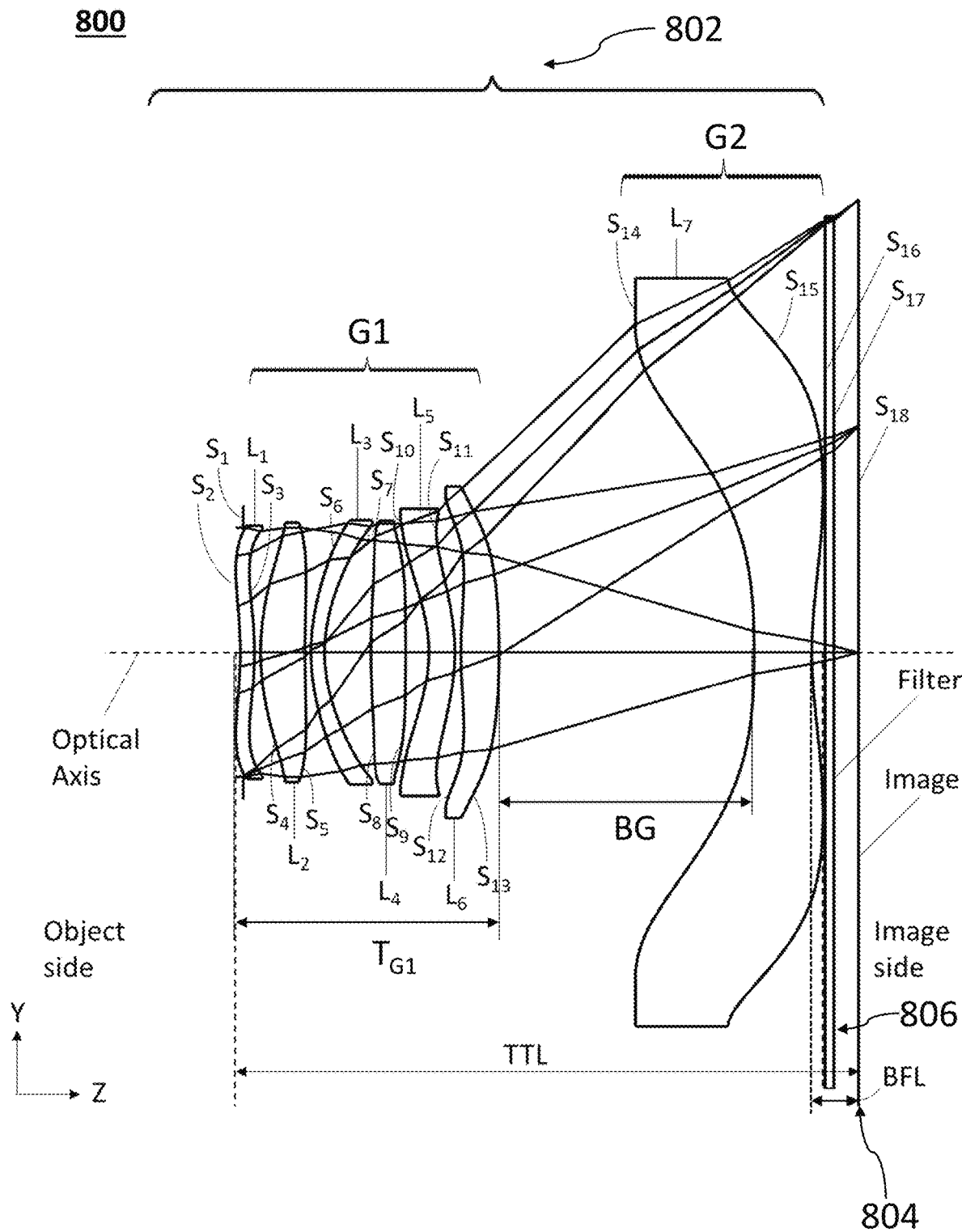
FIG. 8 shows yet another example of a pop-out optical lens system disclosed herein.

FIG. 8 shows yet another example of a 2G pop-out optical lens system disclosed herein and numbered 800. Lens system 800 comprises a pop-out lens 802 divided into G1 and G2, an image sensor 804 and, optionally, an optical element 806. Image sensor 804 may have a SD of 21.5 mm. Table 14 provides just surface types and Table 15 provides aspheric coefficients.

TABLE 14

EFL = 12.1 mm, F number = 2.0, HFOV = 41.3 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −0.071 | 3.028 | | | | |
| 2 | Lens 1 | QTYP | −9.406 | 0.343 | 3.028 | Plastic | 1.66 | 21.26 | 70.53 |
| 3 | | QTYP | −7.942 | 0.148 | 2.945 | | | | |
| 4 | Lens 2 | QTYP | 6.216 | 1.07 | 3.074 | Plastic | 1.54 | 56.05 | 15.54 |
| 5 | | QTYP | 21.745 | 0.149 | 3.103 | | | | |
| 6 | Lens 3 | QTYP | 5.072 | 0.33 | 3.159 | Plastic | 1.65 | 21.78 | −27.18 |
| 7 | | QTYP | 3.846 | 1.12 | 3.061 | | | | |
| 8 | Lens 4 | QTYP | 19.026 | 0.853 | 3.126 | Plastic | 1.54 | 56.05 | 30.13 |
| 9 | | QTYP | −120.768 | 0.564 | 3.148 | | | | |
| 10 | Lens 5 | QTYP | −3.422 | 0.623 | 3.162 | Plastic | 1.62 | 24.44 | −18.03 |
| 11 | | QTYP | −5.257 | 0.15 | 3.44 | | | | |
| 12 | Lens 6 | QTYP | 10.603 | 0.922 | 3.67 | Plastic | 1.54 | 55.9 | 12.72 |
| 13 | | QTYP | −19.495 | See Table 1 | 3.979 | | | | |
| 14 | Lens 7 | QTYP | −23.148 | 1.396 | 8.002 | Plastic | 1.54 | 55.99 | −13.18 |
| 15 | | QTYP | 10.681 | 0.319 | 9.039 | | | | |
| 16 | Filter | Plano | Infinity | 0.21 | — | Glass | 1.52 | 64.17 | |
| 17 | | Plano | Infinity | 0.61 | — | | | | |
| 18 | Image | Plano | Infinity | — | — | | | | |

TABLE 15

| | Aspheric Coefficients | | | | |
|---|---|---|---|---|---|
| Surface # | Conic | NR | A0 | A1 | A2 |
| 2 | 0 | 3.313E+00 | 8.957E−01 | 4.109E−02 | 8.360E−03 |
| 3 | 0 | 3.212E+00 | 1.028E+00 | 7.698E−02 | 2.576E−02 |
| 4 | 0 | 3.305E+00 | −3.018E−01 | −3.778E−02 | −5.269E−03 |
| 5 | 0 | 3.208E+00 | −4.006E−01 | −3.108E−04 | −9.269E−03 |
| 6 | 0 | 3.160E+00 | −2.459E−01 | 4.353E−02 | −9.540E−04 |
| 7 | 0 | 3.196E+00 | −4.877E−01 | 1.567E−02 | −6.572E−03 |
| 8 | 0 | 3.259E+00 | −1.187E−01 | 6.735E−02 | 3.056E−02 |
| 9 | 0 | 3.340E+00 | −3.000E−01 | 5.534E−02 | 4.719E−02 |
| 10 | 0 | 3.390E+00 | 1.911E+00 | 8.570E−02 | 7.185E−02 |
| 11 | 0 | 3.401E+00 | 8.313E−01 | 2.304E−02 | 8.364E−03 |
| 12 | 0 | 3.739E+00 | −1.184E+00 | 1.073E−01 | 2.210E−02 |
| 13 | 0 | 3.896E+00 | −4.957E−01 | 1.422E−02 | 2.538E−02 |
| 14 | 0 | 7.839E+00 | −2.401E+00 | 1.038E+00 | −1.558E−01 |

TABLE 15-continued

| | | | | | |
|---|---|---|---|---|---|
| 15 | 0 | 9.455E+00 | −8.848E+00 | 1.028E+00 | 2.281E−02 |

| | Aspheric Coefficients (Continued) | | | |
|---|---|---|---|---|
| Surface # | A3 | A4 | A5 | A6 |
| 2 | 2.264E−03 | 5.970E−04 | −7.580E−05 | 4.376E−05 |
| 3 | 8.420E−03 | 2.804E−03 | 5.578E−04 | 1.736E−04 |
| 4 | −3.905E−04 | −1.633E−03 | −7.214E−04 | −1.205E−04 |
| 5 | 8.447E−05 | −2.128E−03 | −5.100E−05 | −1.513E−04 |
| 6 | −5.431E−04 | −2.053E−03 | 2.628E−04 | 7.901E−05 |
| 7 | −3.724E−03 | −2.817E−03 | −2.357E−04 | 8.681E−05 |
| 8 | 8.447E−03 | 2.631E−04 | −7.949E−04 | −3.010E−04 |
| 9 | 1.855E−02 | 6.479E−03 | 2.460E−03 | 2.437E−04 |
| 10 | 1.062E−02 | 1.028E−02 | 2.963E−03 | 4.296E−04 |
| 11 | −5.818E−03 | −5.594E−05 | 3.334E−04 | −2.177E−04 |
| 12 | 8.046E−03 | −8.268E−03 | −2.892E−03 | −1.411E−03 |
| 13 | 4.112E−03 | −3.740E−03 | −1.547E−03 | −6.049E−04 |
| 14 | 2.461E−02 | −1.499E−02 | 5.715E−03 | −8.238E−04 |
| 15 | 1.962E−01 | −3.926E−02 | 2.242E−02 | −5.473E−04 |

A sequence of lens powers from L1 to L7 is as follows: ++−+−+− (plus-plus-minus-plus-minus-plus-minus). The deflection point of L1 is located at a distance of 1.989 mm measured from the OA at the front surface and at a distance of 1.95 mm measured from the OA at the rear surface. $P_{G1}$ and $P_6$ as well as $P_{G1}$ and $P_7$ are similar, i.e. $P_{G1}/P_6$ as well as $P_{G1}/P_7$ do not vary by more than 20% from 1. Specifically, Table 16 shows powers $P_i$ and ratios between each $P_i$ and $P_{G1}$.

TABLE 16

| Lens element Li | $P_i$ | $P_i/P_{G1}$ |
|---|---|---|
| 1 | 0.01 | 0.16 |
| 2 | 0.06 | 0.71 |
| 3 | −0.04 | −0.41 |

TABLE 16-continued

| Lens element Li | $P_i$ | $P_i/P_{G1}$ |
|---|---|---|
| 4 | 0.03 | 0.37 |
| 5 | −0.06 | −0.61 |
| 6 | 0.08 | 0.87 |
| 7 | −0.08 | −0.84 |

Figure 9:
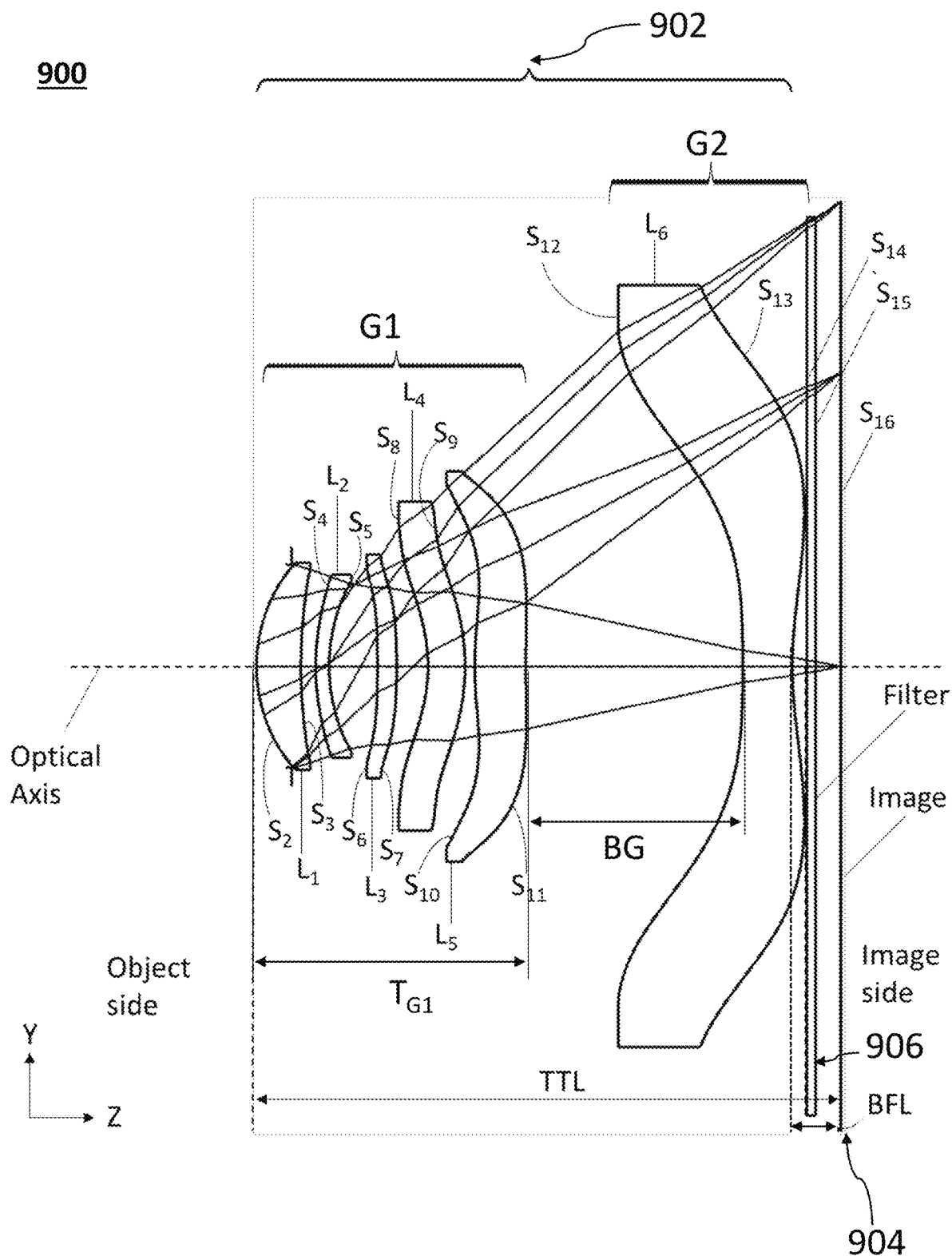
FIG. 9 shows yet another example of a pop-out optical lens system disclosed herein.

FIG. 9 shows yet another example of a 2G pop-out optical lens system disclosed herein and numbered 900. Lens system 900 comprises a pop-out lens 902 divided into G1 and G2, an image sensor 904 and, optionally, an optical element 906. Image sensor 904 may have a SD of 21.5 mm. G1 includes 5 lens elements and G2 includes one lens element. Table 17 provides surface types and Table 18 provides aspheric coefficients.

TABLE 17

| EFL = 12.2 mm, F number = 2.5, HFOV = 41.1 deg. | | | | | | | | | |
|---|---|---|---|---|---|---|---|---|---|
| Surface # | Comment | Type | Curvature Radius | Thickness | Aperture Radius (D/2) | Material | Index | Abbe # | Focal Length |
| 1 | A.S. | Plano | Infinity | −0.830 | 2.398 | | | | |
| 2 | Lens 1 | QTYP | 3.851 | 1.041 | 2.398 | Plastic | 1.54 | 55.91 | 10.35 |
| 3 | | QTYP | 10.916 | 0.348 | 2.286 | | | | |
| 4 | Lens 2 | QTYP | 5.19 | 0.318 | 2.146 | Plastic | 1.67 | 19.44 | −28.23 |
| 5 | | QTYP | 3.978 | 1.151 | 2.005 | | | | |
| 6 | Lens 3 | QTYP | −33.307 | 0.453 | 2.349 | Plastic | 1.54 | 55.91 | 55.24 |
| 7 | | QTYP | −15.915 | 0.737 | 2.592 | | | | |
| 8 | Lens 4 | QTYP | −3.797 | 0.871 | 3.283 | Plastic | 1.67 | 19.44 | −23.29 |
| 9 | | QTYP | −5.467 | 0.226 | 3.828 | | | | |
| 10 | Lens 5 | QTYP | 7.497 | 1.206 | 4.231 | Plastic | 1.54 | 55.91 | 16.89 |
| 11 | | QTYP | 37.557 | See Table1 | 4.563 | | | | |
| 12 | Lens 6 | QTYP | −49.973 | 1.169 | 7.903 | Plastic | 1.54 | 55.91 | −14.45 |
| 13 | | QTYP | 9.459 | 0.337 | 8.940 | | | | |
| 14 | Filter | Plano | Infinity | 0.21 | — | Glass | 1.52 | 64.17 | |
| 15 | | Plano | Infinity | 0.61 | — | | | | |
| 16 | Image | Plano | Infinity | — | — | | | | |

TABLE 18

Aspheric Coefficients

| Surface # | Conic | NR | A0 | A1 | A2 |
|---|---|---|---|---|---|
| 2 | 0 | 2.491E+00 | 4.440E−02 | 9.801E−03 | 2.525E−03 |
| 3 | 0 | 2.458E+00 | −3.707E−02 | 1.324E−02 | −1.374E−03 |
| 4 | 0 | 2.421E+00 | −1.545E−01 | 2.164E−02 | −9.674E−03 |
| 5 | 0 | 2.342E+00 | −1.074E−02 | 3.903E−02 | −1.296E−03 |
| 6 | 0 | 2.393E+00 | −2.229E−01 | 2.616E−02 | 1.354E−02 |
| 7 | 0 | 2.537E+00 | −2.120E−01 | 3.323E−02 | 1.339E−02 |
| 8 | 0 | 3.094E+00 | 9.095E−01 | 3.023E−02 | 2.507E−03 |
| 9 | 0 | 3.592E+00 | 5.490E−01 | 1.013E−01 | −3.267E−02 |
| 10 | 0 | 4.010E+00 | −1.866E+00 | 1.988E−01 | −1.808E−02 |
| 11 | 0 | 4.321E+00 | −1.429E+00 | −1.897E−02 | −5.209E−03 |
| 12 | 0 | 7.594E+00 | −3.232E+00 | 1.078E+00 | −1.596E−01 |
| 13 | 0 | 8.882E+00 | −9.125E+00 | 9.677E−01 | −1.603E−01 |

Aspheric Coefficients (Continued)

| Surface # | A3 | A4 | A5 | A6 |
|---|---|---|---|---|
| 2 | 5.460E−04 | 9.609E−05 | −8.114E−06 | — |
| 3 | 1.848E−05 | −1.084E−04 | −8.918E−06 | — |
| 4 | −7.402E−04 | −2.033E−05 | 2.019E−05 | — |
| 5 | 4.145E−04 | 1.481E−04 | −6.227E−05 | — |
| 6 | 2.289E−03 | 2.499E−04 | −1.424E−04 | — |
| 7 | 2.864E−04 | −1.163E−04 | −1.725E−04 | −4.524E−05 |
| 8 | −5.696E−03 | 3.022E−03 | −4.446E−04 | −1.182E−04 |
| 9 | −4.194E−03 | 2.606E−03 | −4.025E−04 | −1.797E−04 |
| 10 | 1.183E−02 | −1.467E−03 | −5.540E−04 | −5.377E−04 |
| 11 | −8.930E−04 | 4.458E−03 | 7.204E−04 | 6.093E−04 |
| 12 | 1.507E−02 | −1.296E−02 | 7.023E−03 | −1.074E−03 |
| 13 | 3.356E−02 | −5.957E−02 | 1.294E−02 | −2.078E−03 |

A sequence of lens powers from L1 to L6 is as follows: +−+−+− (plus-minus-plus-minus-plus-minus). $P_{G1}$ and $P_1$ are similar, i.e. $P_{G1}/P_1$ does not vary by more than 20% from 1. Specifically, Table 19 shows powers $P_i$ and ratios between each $P_i$ and $P_{G1}$.

TABLE 19

| Lens element Li | $P_i$ | $P_i/P_{G1}$ |
|---|---|---|
| 1 | 0.10 | 1.09 |
| 2 | −0.04 | −0.40 |
| 3 | 0.02 | 0.20 |
| 4 | −0.04 | −0.48 |

TABLE 19-continued

| Lens element Li | $P_i$ | $P_i/P_{G1}$ |
|---|---|---|
| 5 | 0.06 | 0.67 |
| 6 | −0.07 | −0.78 |

Figure 10:
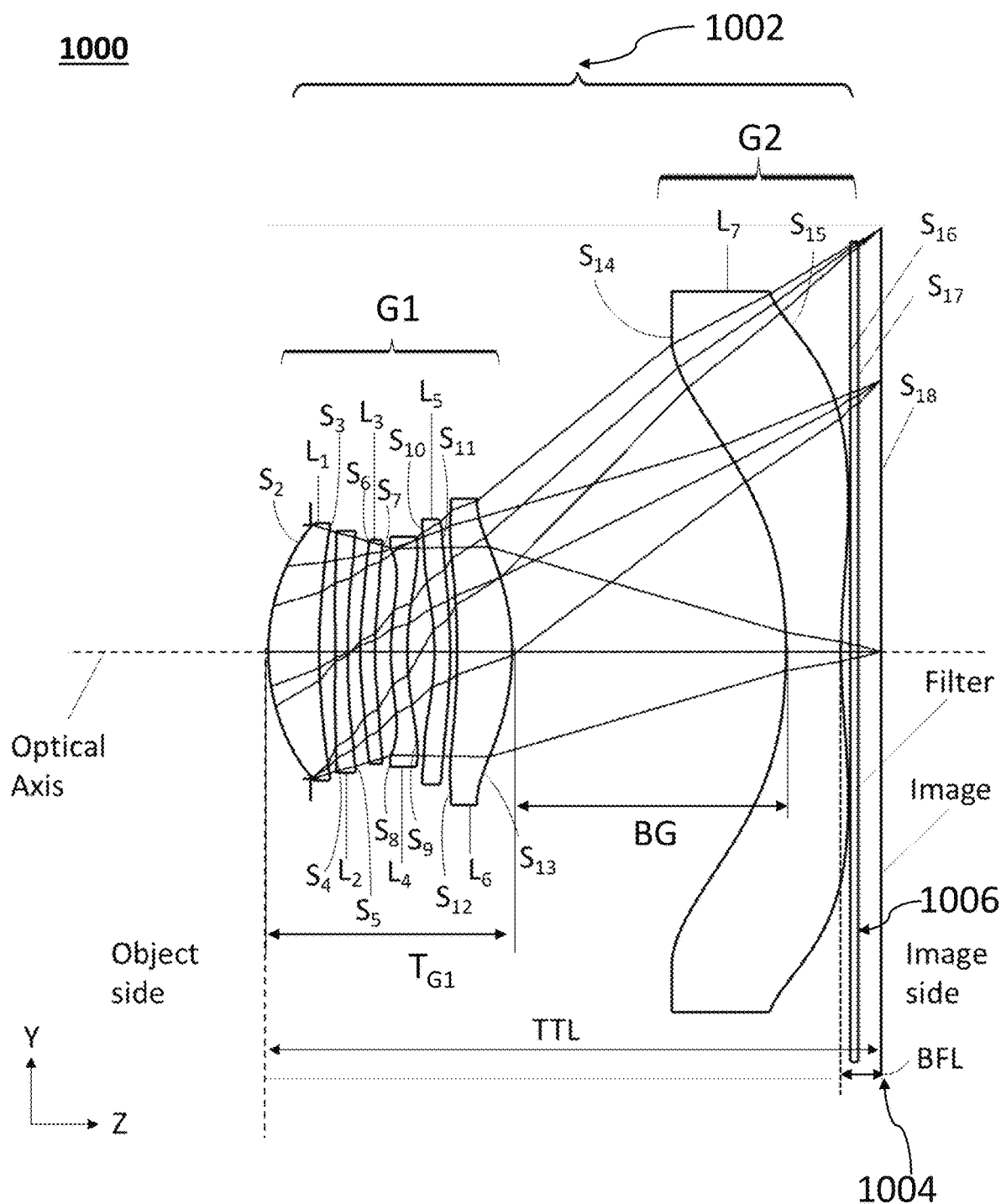
FIG. 10 shows yet another example of a pop-out optical lens system disclosed herein.

FIG. 10 shows yet another example of a 2G pop-out optical lens system disclosed herein and numbered 1000. Lens system 1000 comprises a pop-out lens 1002 divided into G1 and G2, an image sensor 1004 and, optionally, an optical element 1006. Image sensor 204 may have a SD of 21.5 mm. Table 20 provides surface types and Table 21 provides aspheric coefficients.

TABLE 20

EFL = 13.1 mm, F number = 2, HFOV = 39.1 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.095 | 3.289 | | | | |
| 2 | Lens 1 | QTYP | 5.488 | 1.318 | 3.289 | Glass | 1.58 | 59.45 | 13.77 |
| 3 | | QTYP | 15.69 | 0.418 | 3.159 | | | | |
| 4 | Lens 2 | QTYP | −27.704 | 0.33 | 3.101 | Plastic | 1.65 | 21.78 | −46.91 |
| 5 | | QTYP | −282.717 | 0.315 | 3.005 | | | | |
| 6 | Lens 3 | QTYP | 9.98 | 0.376 | 2.911 | Plastic | 1.64 | 23.37 | −81.82 |
| 7 | | QTYP | 8.269 | 0.43 | 2.844 | | | | |
| 8 | Lens 4 | QTYP | 7.214 | 0.426 | 2.787 | Glass | 1.75 | 27.71 | 77.39 |
| 9 | | QTYP | 8.025 | 0.699 | 2.939 | | | | |
| 10 | Lens 5 | QTYP | −6.935 | 0.404 | 3.099 | Plastic | 1.64 | 23.37 | −19.69 |
| 11 | | QTYP | −15.627 | 0.18 | 3.383 | | | | |
| 12 | Lens 6 | QTYP | −23.396 | 1.423 | 3.67 | Glass | 1.75 | 52.43 | 10.85 |
| 13 | | QTYP | −6.236 | See Table 1 | 3.926 | | | | |
| 14 | Lens 7 | QTYP | −15.089 | 1.424 | 7.998 | Plastic | 1.54 | 55.99 | −13.69 |
| 15 | | QTYP | 15.34 | 0.238 | 9.302 | | | | |
| 16 | Filter | Plano | Infinity | 0.21 | — | Glass | 1.52 | 64.17 | |
| 17 | | Plano | Infinity | 0.61 | — | | | | |
| 18 | Image | Plano | Infinity | — | — | | | | |

TABLE 21

Aspheric Coefficients

| Surface # | Conic | NR | A0 | A1 | A2 | A3 |
|---|---|---|---|---|---|---|
| 2 | 0 | 3.435E+00 | 5.002E−02 | 1.923E−02 | 3.655E−03 | 1.317E−04 |
| 3 | 0 | 3.346E+00 | −7.572E−02 | 1.189E−02 | −3.167E−04 | −5.946E−04 |
| 4 | 0 | 3.296E+00 | 2.744E−01 | −6.799E−02 | 2.373E−02 | −1.366E−03 |
| 5 | 0 | 3.185E+00 | 2.833E−01 | −8.883E−02 | 3.090E−02 | −2.104E−04 |
| 6 | 0 | 3.107E+00 | −2.719E−01 | 3.963E−02 | −3.736E−03 | −1.893E−03 |
| 7 | 0 | 3.009E+00 | −4.217E−01 | 6.410E−02 | −2.386E−02 | −9.752E−03 |
| 8 | 0 | 2.977E+00 | −7.884E−01 | −5.166E−02 | 6.128E−03 | −5.476E−03 |
| 9 | 0 | 2.964E+00 | −2.987E−01 | −3.838E−02 | 5.225E−03 | −2.759E−03 |
| 10 | 0 | 3.051E+00 | 4.321E−01 | −5.039E−03 | −1.595E−02 | −1.685E−03 |
| 11 | 0 | 3.473E+00 | 1.457E−01 | −6.641E−03 | −5.240E−03 | −4.904E−03 |
| 12 | 0 | 4.053E+00 | 1.869E−01 | 7.094E−02 | −2.167E−02 | −1.287E−02 |
| 13 | 0 | 4.416E+00 | 7.823E−01 | 1.748E−01 | −3.634E−02 | −3.794E−02 |
| 14 | 0 | 7.963E+00 | −1.304E+00 | 7.078E−01 | −9.398E−02 | 2.563E−02 |
| 15 | 0 | 9.619E+00 | −6.107E+00 | 7.241E−01 | −1.507E−02 | 1.531E−01 |

Aspheric Coefficients (Continued)

| Surface # | A4 | A5 | A6 |
|---|---|---|---|
| 2 | −3.206E−04 | −1.266E−04 | −3.507E−05 |
| 3 | 3.659E−04 | 2.430E−04 | −9.735E−06 |
| 4 | 1.986E−03 | −4.930E−05 | −1.801E−04 |
| 5 | 2.037E−03 | 8.652E−05 | −2.348E−05 |
| 6 | 1.350E−03 | 1.456E−03 | 4.098E−04 |
| 7 | −2.356E−03 | 3.057E−04 | 2.124E−04 |
| 8 | −1.609E−03 | −6.836E−05 | 2.410E−04 |
| 9 | 1.407E−04 | 3.219E−05 | 6.245E−05 |
| 10 | 8.996E−04 | −5.355E−04 | −5.956E−05 |
| 11 | −2.225E−03 | −1.419E−03 | 3.236E−04 |
| 12 | −1.924E−03 | 5.020E−03 | 9.564E−04 |
| 13 | −1.061E−02 | −9.185E−04 | 8.961E−05 |

A sequence of lens powers from L1 to L7 is as follows: +−−+−+− (plus-minus-minus-plus-minus-plus-minus). $P_{G1}$ and $P_6$ are similar, i.e. $P_{G1}/P_6$ does not vary by more than 20% from 1. L4 and L6 are made of glass, with a refractive index n>1.7. Specifically, Table 22 shows powers $P_i$, ratios between each $P_i$ and $P_{G1}$ and the refractive indexes of lens elements.

TABLE 22

| Lens element Li | $P_i$ | $P_i/P_{G1}$ | Refractive index n |
|---|---|---|---|
| 1 | 0.07 | 0.86 | 1.58 |
| 2 | −0.02 | −0.25 | 1.65 |
| 3 | −0.01 | −0.15 | 1.64 |
| 4 | 0.01 | 0.15 | 1.75 |
| 5 | −0.05 | −0.60 | 1.64 |
| 6 | 0.09 | 1.10 | 1.76 |
| 7 | −0.07 | −0.87 | 1.55 |

TABLE 22-continued

Figure 11:
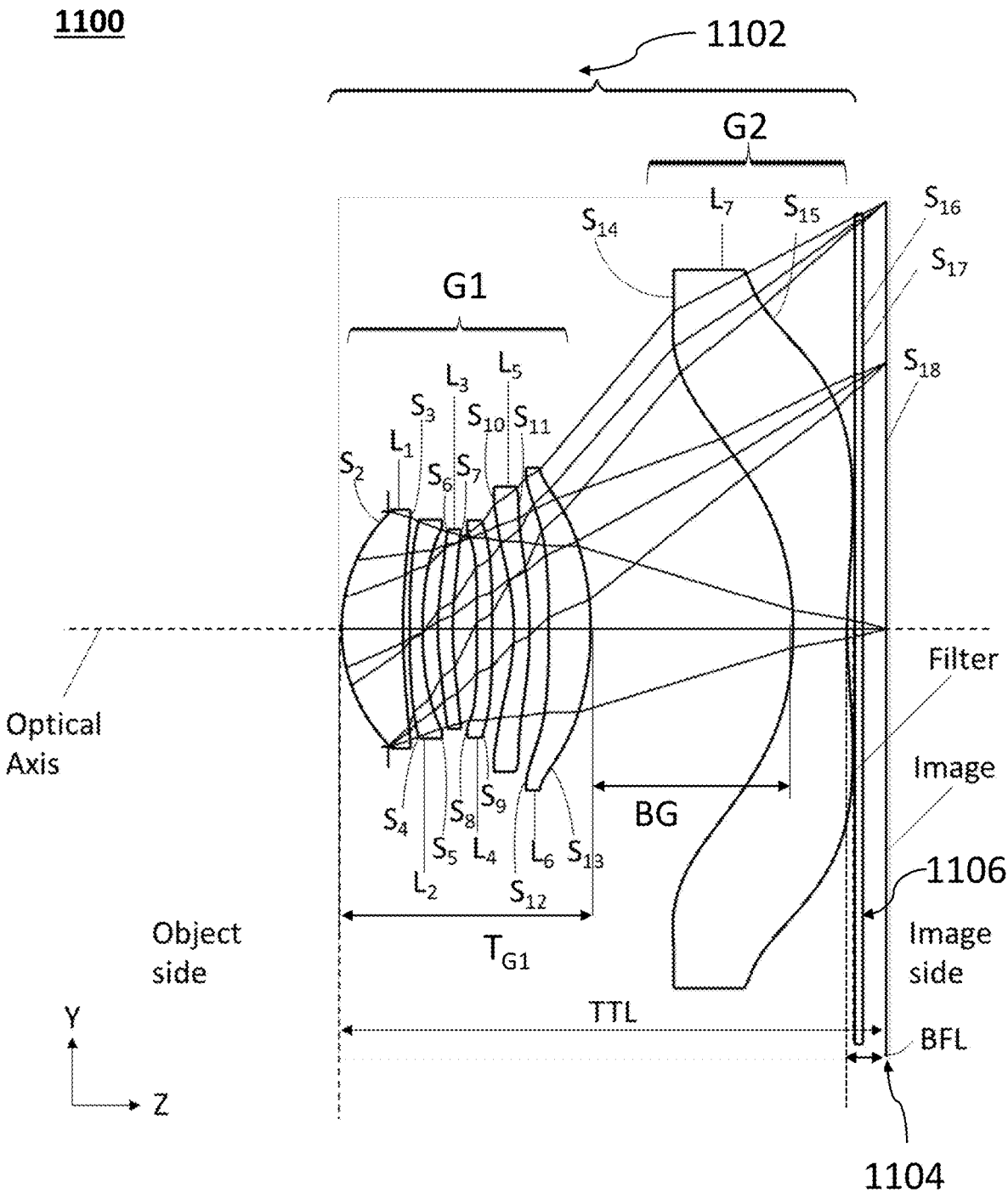
FIG. 11 shows yet another example of a pop-out optical lens system disclosed herein.

FIG. 11 shows yet another example of a 2G pop-out optical lens system disclosed herein and numbered 1100. Lens system 1100 comprises a pop-out lens 1102 divided into G1 and G2, an image sensor 1104 and, optionally, an optical clement 1106. Image sensor 1104 may have a SD of 21.5 mm. Table 23 provides surface types and Table 24 provides aspheric coefficients.

TABLE 23

EFL = 12.1 mm, F number = 2, HFOV = 41.2 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.201 | 3.028 | | | | |
| 2 | Lens 1 | QTYP | 4.329 | 1.587 | 3.028 | Plastic | 1.53 | 56.16 | 10.63 |
| 3 | | QTYP | 15.838 | 0.176 | 2.865 | | | | |
| 4 | Lens 2 | QTYP | 64.604 | 0.33 | 2.788 | Plastic | 1.65 | 21.78 | −22.89 |
| 5 | | QTYP | 12.145 | 0.391 | 2.597 | | | | |
| 6 | Lens 3 | QTYP | 7.748 | 0.38 | 2.561 | Plastic | 1.64 | 23.37 | 156.79 |
| 7 | | QTYP | 8.23 | 0.615 | 2.487 | | | | |
| 8 | Lens 4 | QTYP | −3026.741 | 0.4 | 2.479 | Glass | 1.75 | 27.71 | 50.54 |
| 9 | | QTYP | −37.597 | 0.55 | 2.75 | | | | |
| 10 | Lens 5 | QTYP | −6.299 | 0.4 | 3.206 | Plastic | 1.64 | 23.37 | −18.25 |
| 11 | | QTYP | −13.887 | 0.494 | 3.622 | | | | |
| 12 | Lens 6 | QTYP | −65.179 | 1.08 | 3.904 | Glass | 1.75 | 52.43 | 11.73 |
| 13 | | QTYP | −7.864 | See Table 1 | 4.106 | | | | |

TABLE 23-continued

EFL = 12.1 mm, F number = 2, HFOV = 41.2 deg.

| Surface # | Comment | Type | Curvature Radius | Thickness | Aperture Radius (D/2) | Material | Index | Abbe # | Focal Length |
|---|---|---|---|---|---|---|---|---|---|
| 14 | Lens 7 | QTYP | −9.837 | 1.387 | 8.231 | Plastic | 1.54 | 55.99 | −10.29 |
| 15 | | QTYP | 13.788 | 0.193 | 9.201 | | | | |
| 16 | Filter | Plano | Infinity | 0.21 | — | Glass | 1.52 | 64.17 | |
| 17 | | Plano | Infinity | 0.61 | — | | | | |
| 18 | Image | Plano | Infinity | — | — | | | | |

TABLE 24

| Aspheric Coefficients | | | | | | |
|---|---|---|---|---|---|---|
| Surface # | Conic | NR | A0 | A1 | A2 | A3 |
| 2 | 0 | 3.435E+00 | 6.800E−03 | −2.002E−02 | −1.794E−02 | −9.577E−03 |
| 3 | 0 | 3.346E+00 | −1.344E−01 | 6.154E−03 | −1.069E−02 | −5.257E−03 |
| 4 | 0 | 3.296E+00 | 3.472E−01 | 6.961E−03 | 1.856E−02 | 8.602E−04 |
| 5 | 0 | 3.185E+00 | 4.529E−01 | −1.527E−02 | 7.381E−03 | −4.863E−03 |
| 6 | 0 | 3.107E+00 | −3.209E−01 | 6.810E−02 | −2.046E−02 | −2.222E−02 |
| 7 | 0 | 3.009E+00 | −3.312E−01 | 4.847E−02 | −3.047E−02 | −3.037E−02 |
| 8 | 0 | 2.977E+00 | −4.778E−01 | −3.186E−02 | 1.913E−02 | 2.793E−03 |
| 9 | 0 | 2.964E+00 | −1.901E−01 | 1.328E−04 | 2.573E−02 | 1.134E−02 |
| 10 | 0 | 3.051E+00 | 3.018E−01 | 2.468E−02 | −1.563E−02 | 2.174E−03 |
| 11 | 0 | 3.473E+00 | 1.133E−01 | 6.276E−02 | −3.039E−02 | −4.606E−04 |
| 12 | 0 | 4.053E+00 | −6.073E−01 | 1.253E−01 | 2.681E−02 | −2.082E−03 |
| 13 | 0 | 4.416E+00 | −1.486E−01 | 2.059E−01 | 1.320E−01 | 4.297E−02 |
| 14 | 0 | 7.963E+00 | 9.061E−02 | 1.119E+00 | −2.440E−01 | 1.567E−02 |
| 15 | 0 | 9.619E+00 | −8.108E+00 | 1.368E+00 | −5.642E−02 | −3.287E−02 |

| Aspheric Coefficients (Continued) | | | |
|---|---|---|---|
| Surface # | A4 | A5 | A6 |
| 2 | −4.170E−03 | −1.271E−03 | −2.922E−04 |
| 3 | −1.060E−03 | −9.981E−04 | −2.532E−04 |
| 4 | 1.403E−03 | −9.479E−04 | −2.192E−04 |
| 5 | −2.441E−03 | −1.600E−03 | −3.275E−04 |
| 6 | −8.996E−03 | −1.789E−03 | −1.665E−04 |
| 7 | −1.411E−02 | −3.771E−03 | −5.864E−04 |
| 8 | −1.543E−03 | −1.700E−04 | 1.237E−04 |
| 9 | 2.869E−03 | 1.063E−03 | 2.493E−04 |
| 10 | 1.739E−04 | 2.560E−04 | −1.756E−04 |
| 11 | −3.692E−04 | 7.370E−04 | −4.804E−04 |
| 12 | −3.331E−03 | 4.442E−04 | 1.214E−04 |
| 13 | 1.196E−02 | 3.543E−03 | 7.783E−04 |

A sequence of lens powers from L1 to L7 is as follows: +−++−+− (plus-minus-plus-plus-minus-plus-minus). $P_{G1}$ and $P_1$ as well as $P_{G1}$ and $P_7$ are similar, i.e. $P_{G1}/P_1$ as well as $P_{G1}/P_7$ do not vary by more than 10% from 1. L4 and L6 are made of glass, with a refractive index n>1.7. Specifically, Table 25 shows powers $P_i$, ratios between each $P_i$ and $P_{G1}$ and the refractive indexes of lens elements.

TABLE 25

| Lens element Li | $P_i$ | $P_i/P_{G1}$ | Refractive index n |
|---|---|---|---|
| 1 | 0.09 | 1.00 | 1.53 |
| 2 | −0.04 | −0.46 | 1.65 |
| 3 | 0.01 | 0.07 | 1.64 |
| 4 | 0.02 | 0.21 | 1.75 |

TABLE 25-continued

| Lens element Li | $P_i$ | $P_i/P_{G1}$ | Refractive index n |
|---|---|---|---|
| 5 | −0.055 | −0.58 | 1.64 |
| 6 | 0.09 | 0.90 | 1.76 |
| 7 | −0.10 | −1.03 | 1.55 |

Figure 12:
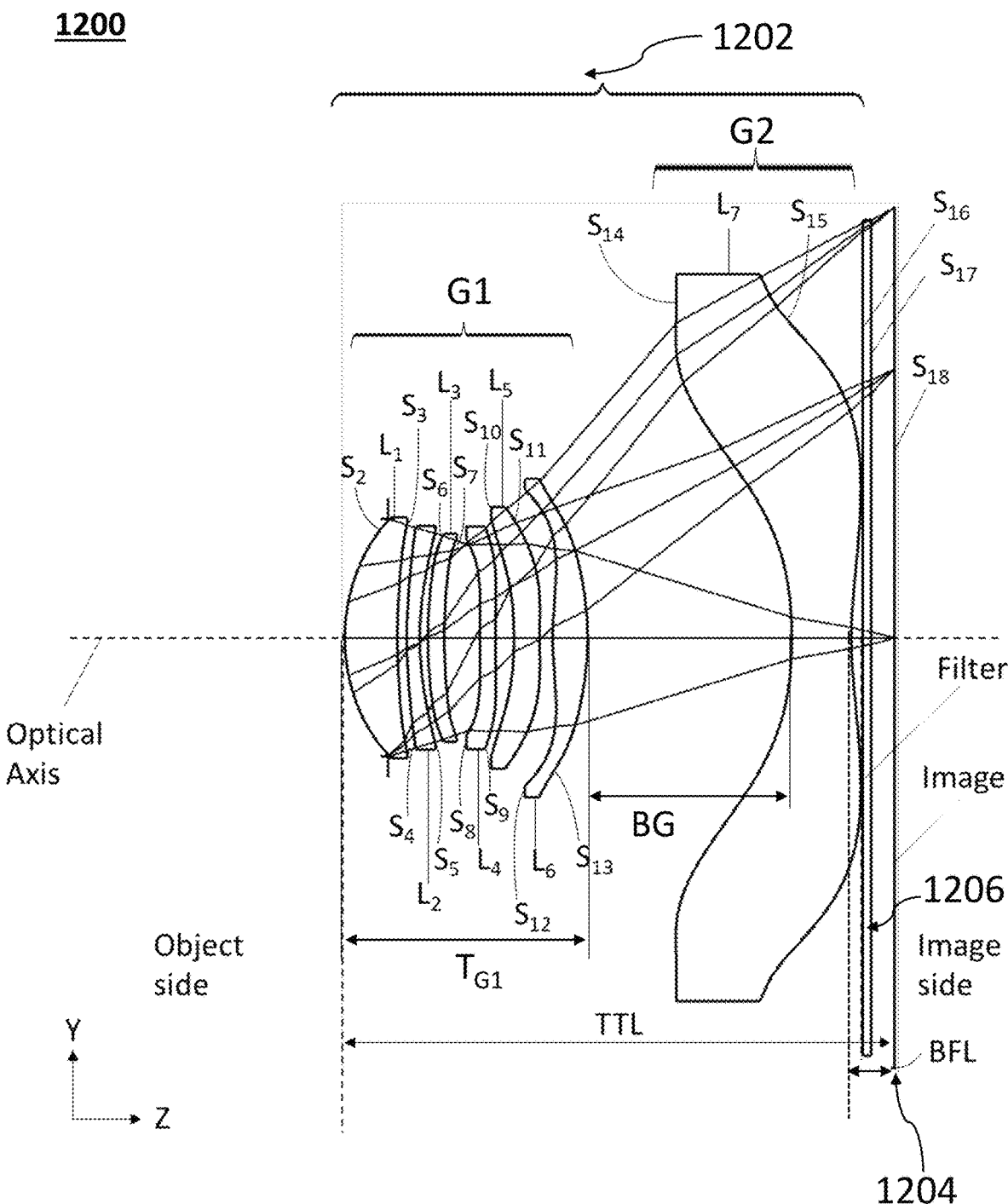
FIG. 12 shows yet another example of a pop-out optical lens system disclosed herein.

FIG. 12 shows yet another example of a 2G pop-out optical lens system disclosed herein and numbered 1200. Lens system 1200 comprises a pop-out lens 1202 divided into G1 and G2, an image sensor 1204 and, optionally, an optical element 1206. Image sensor 1204 may have a SD of 21.5 mm. Table 26 provides surface types and Table 27 provides aspheric coefficients.

TABLE 26

| | | | EFL = 12.1 mm, F number = 2, HFOV = 41.2 deg. | | | | | |
|---|---|---|---|---|---|---|---|---|
| Surface # | Comment | Type | Curvature Radius | Thickness | Aperture Radius (D/2) | Material | Index | Abbe # | Focal Length |
| 1 | A.S. | Plano | Infinity | −1.092 | 3.026 | | | | |
| 2 | Lens 1 | QTYP | 4.769 | 1.352 | 3.026 | Plastic | 1.54 | 55.91 | 11.62 |
| 3 | | QTYP | 17.232 | 0.236 | 2.884 | | | | |
| 4 | Lens 2 | QTYP | 12.713 | 0.33 | 2.817 | Plastic | 1.66 | 20.27 | −32.44 |
| 5 | | QTYP | 7.922 | 0.208 | 2.697 | | | | |
| 6 | Lens 3 | QTYP | 12.337 | 0.415 | 2.646 | Plastic | 1.54 | 56.41 | 166.99 |
| 7 | | QTYP | 14.124 | 0.897 | 2.536 | | | | |
| 8 | Lens 4 | QTYP | 33.441 | 0.399 | 2.485 | Plastic | 1.67 | 19.44 | −99.32 |
| 9 | | QTYP | 22.206 | 0.474 | 2.797 | | | | |
| 10 | Lens 5 | QTYP | 11.659 | 0.655 | 2.986 | Plastic | 1.57 | 37.43 | −12.59 |
| 11 | | QTYP | 18.942 | 0.332 | 3.286 | | | | |
| 12 | Lens 6 | QTYP | 8.13 | 0.886 | 3.717 | Plastic | 1.52 | 56.49 | 7.51 |
| 13 | | QTYP | −7.161 | See Table 1 | 4.01 | | | | |
| 14 | Lens 7 | QTYP | −10.75 | 1.512 | 8.052 | Plastic | 1.54 | 55.84 | −9.37 |
| 15 | | QTYP | 10.232 | 0.29 | 9.229 | | | | |
| 16 | Filter | Plano | Infinity | 0.21 | — | Glass | 1.52 | 64.17 | |
| 17 | | Plano | Infinity | 0.61 | — | | | | |
| 18 | Image | Plano | Infinity | — | — | | | | |

TABLE 27

| Aspheric Coefficients | | | | | | |
|---|---|---|---|---|---|---|
| Surface # | Conic | NR | A0 | A1 | A2 | A3 |
| 2 | 0 | 3.625E+00 | 2.026E−01 | 8.199E−02 | 2.304E−02 | 4.348E−03 |
| 3 | 0 | 3.354E+00 | 1.816E−02 | 4.501E−02 | 1.005E−04 | 3.441E−03 |
| 4 | 0 | 3.350E+00 | −1.194E−01 | 6.618E−02 | 1.455E−02 | 8.102E−03 |
| 5 | 0 | 3.308E+00 | −1.402E−01 | 3.525E−02 | 1.938E−02 | 3.259E−03 |
| 6 | 0 | 3.308E+00 | 3.506E−01 | 6.438E−02 | −3.239E−02 | −1.571E−02 |
| 7 | 0 | 3.183E+00 | 2.955E−01 | 6.134E−02 | −4.671E−02 | −2.408E−02 |
| 8 | 0 | 3.183E+00 | −1.145E+00 | 2.052E−03 | 1.657E−02 | −4.672E−04 |
| 9 | 0 | 3.755E+00 | −8.645E−01 | 3.255E−01 | 9.233E−02 | 2.749E−02 |
| 10 | 0 | 4.113E+00 | −8.324E−02 | 4.451E−01 | 1.688E−01 | 2.217E−01 |
| 11 | 0 | 4.327E+00 | −2.554E+00 | 5.919E−01 | −6.482E−02 | 9.881E−02 |
| 12 | 0 | 4.632E+00 | −3.445E+00 | 2.696E−01 | 1.141E−02 | 2.475E−02 |
| 13 | 0 | 5.112E+00 | −1.545E−01 | −1.860E−01 | −6.736E−02 | −1.039E−02 |
| 14 | 0 | 9.049E+00 | 9.589E−01 | 1.376E+00 | 6.918E−01 | 1.024E−01 |
| 15 | 0 | 9.922E+00 | −1.135E+01 | 1.231E+00 | −2.802E−01 | −3.718E−02 |

| Aspheric Coefficients (Continued) | | | | | |
|---|---|---|---|---|---|
| Surface # | A4 | A5 | A6 | A7 | A8 | A9 |
| 2 | 3.581E−04 | — | — | — | — | — |
| 3 | 9.607E−04 | 1.543E−04 | — | — | — | — |
| 4 | 2.093E−04 | −8.588E−04 | — | — | — | — |
| 5 | −1.593E−04 | −8.193E−04 | — | — | — | — |
| 6 | 9.074E−04 | 1.072E−03 | — | — | — | — |
| 7 | −4.734E−03 | −9.441E−05 | — | — | — | — |
| 8 | 2.554E−04 | 1.030E−03 | — | — | — | — |
| 9 | 1.530E−02 | 5.659E−03 | −7.614E−04 | — | — | — |
| 10 | 9.458E−02 | 3.658E−02 | 2.670E−03 | 1.391E−03 | — | — |
| 11 | 2.500E−02 | 3.472E−02 | 1.155E−02 | 5.493E−03 | — | — |
| 12 | −2.345E−02 | −4.521E−03 | −4.322E−03 | −5.488E−04 | — | — |
| 13 | 1.387E−01 | 1.057E−01 | 3.310E−02 | 1.565E−03 | −6.534E−04 | — |

A sequence of lens powers from L1 to L7 is as follows: +-+--+- (plus-minus-plus-minus-minus-plus-minus). $P_{G1}$ and $P_1$ as well as $P_{G1}$ and $P_5$ and $P_{G1}$ and $P_7$ are similar, i.e. $P_{G1}/P_1$ as well as $P_{G1}/P_5$ as well as $P_{G1}/P_7$ do not vary by more than 20% from 1. Specifically, Table 28 shows powers $P_i$ and ratios between each $P_i$ and $P_{G1}$.

TABLE 28

| Lens element Li | $P_i$ | $P_i/P_{G1}$ |
|---|---|---|
| 1 | 0.09 | 0.90 |
| 2 | −0.03 | −0.32 |
| 3 | 0.01 | 0.06 |
| 4 | −0.01 | −0.10 |
| 5 | −0.08 | −0.83 |
| 6 | 0.13 | 1.39 |
| 7 | −0.11 | −1.11 |

Figure 13:
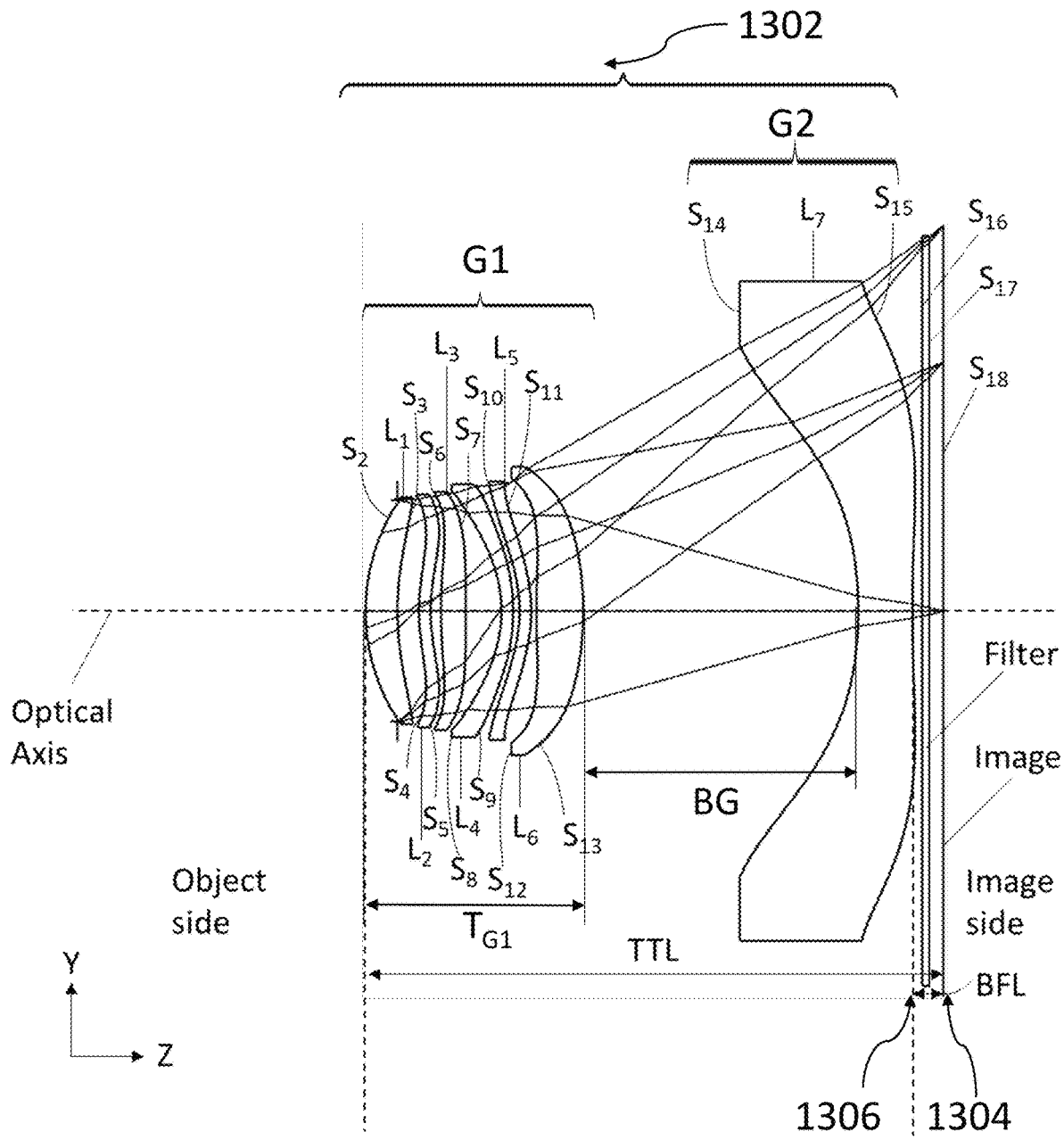
FIG. 13 shows yet another example of a pop-out optical lens system disclosed herein.

FIG. 13 shows yet another example of a 2G pop-out optical lens system disclosed herein and numbered 1300. Lens system 1300 comprises a pop-out lens 1302 divided into G1 and G2, an image sensor 1304 and, optionally, an optical element 1306. Image sensor 1304 may have a SD of 21.5 mm. Table 29 provides surface types and Table 30 provides aspheric coefficients.

A sequence of lens powers from L1 to L7 is as follows: +-+--+- (plus-minus-plus-minus-minus-plus-minus). $P_{G1}$ and $P_6$ and $P_{G1}$ and $P_7$ are similar, i.e. $P_{G1}/P_6$ as well as $P_{G1}/P_7$ do not vary by more than 20% from 1. Specifically, Table 31 shows powers $P_i$, and ratios between each $P_i$ and $P_{G1}$.

TABLE 31

| Lens element Li | $P_i$ | $P_i/P_{G1}$ |
|---|---|---|
| 1 | 0.03 | 0.39 |
| 2 | −0.01 | −0.13 |
| 3 | 0.05 | 0.57 |
| 4 | −0.05 | −0.63 |
| 5 | −0.003 | −0.04 |
| 6 | 0.08 | 0.96 |
| 7 | −0.07 | −0.88 |

Figure 14:
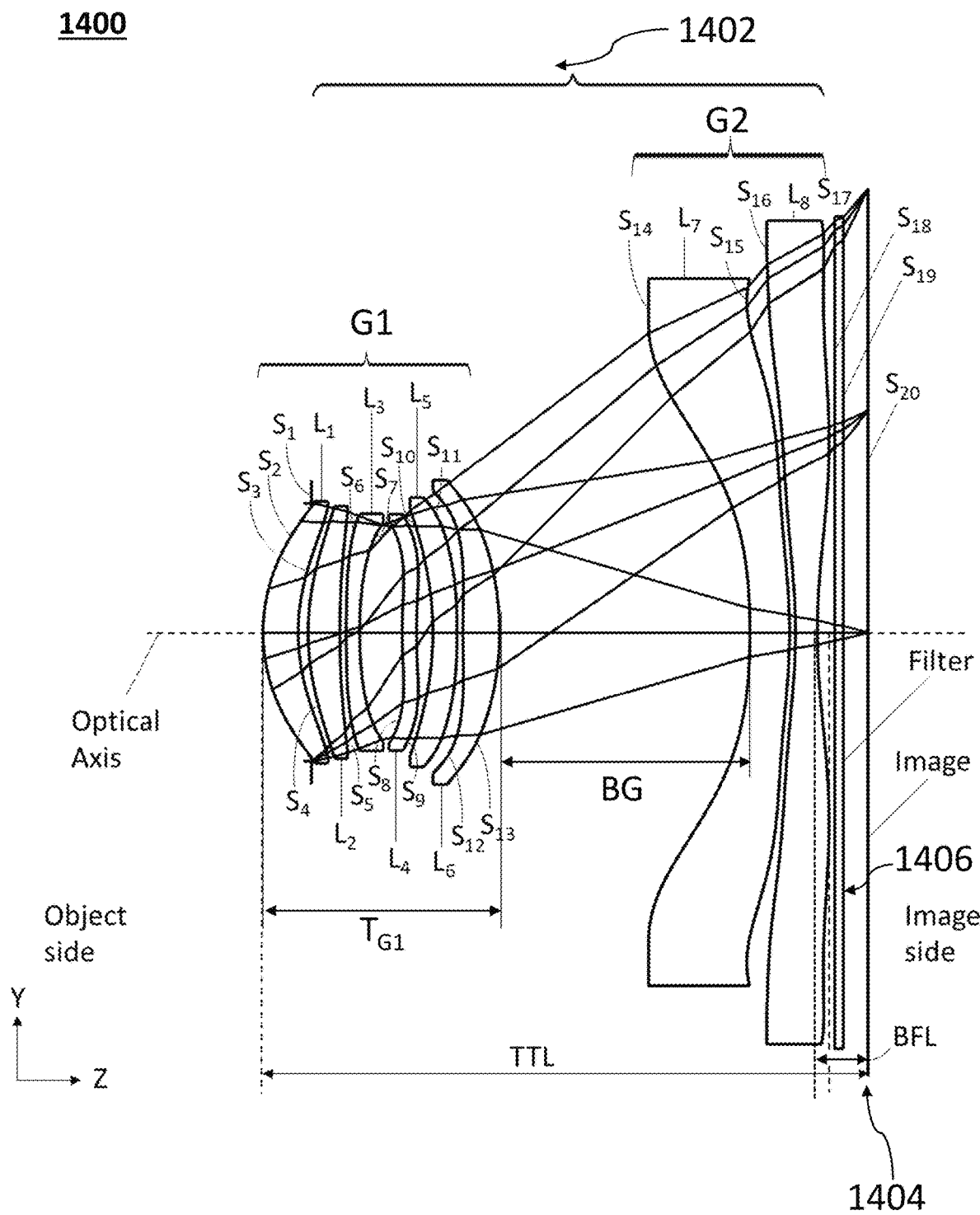
FIG. 14 shows yet another example of a pop-out optical lens system disclosed herein.

FIG. 14 shows yet another example of a 2G pop-out optical lens system disclosed herein and numbered 1400. Lens system 1400 comprises a pop-out lens 1402 divided into G1 and G2, an image sensor 1404 and, optionally, an optical element 1406. Image sensor 1404 may have a SD of 21.5 mm. G1 includes 6 lens elements and G2 includes 2 lens elements. Table 32 provides surface types and Table 33 provides aspheric coefficients.

TABLE 29

EFL = 12.6 mm, F number = 2, HFOV = 39.3 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −0.903 | 3.142 | | | | |
| 2 | Lens 1 | EVAS | 5.615 | 0.901 | 3.179 | Plastic | 1.54 | 55.99 | 30.68 |
| 3 | | EVAS | 7.961 | 0.627 | 3.175 | | | | |
| 4 | Lens 2 | EVAS | 5.836 | 0.329 | 3.187 | Plastic | 1.67 | 19.44 | −93.33 |
| 5 | | EVAS | 5.22 | 0.289 | 3.26 | | | | |
| 6 | Lens 3 | EVAS | 12.044 | 0.706 | 3.267 | Plastic | 1.55 | 56.02 | 20.88 |
| 7 | | EVAS | −225.315 | 1.006 | 3.347 | | | | |
| 8 | Lens 4 | EVAS | −3.849 | 0.33 | 3.347 | Plastic | 1.67 | 19.44 | −18.81 |
| 9 | | EVAS | −5.713 | 0.182 | 3.557 | | | | |
| 10 | Lens 5 | EVAS | −4.241 | 0.331 | 3.578 | Plastic | 1.67 | 19.44 | −307.83 |
| 11 | | EVAS | −4.465 | 0.148 | 3.642 | | | | |
| 12 | Lens 6 | EVAS | 25.56 | 1.323 | 3.724 | Plastic | 1.57 | 37.43 | 12.42 |
| 13 | | EVAS | −9.583 | See Table 1 | 4.041 | | | | |
| 14 | Lens 7 | EVAS | −11.028 | 1.532 | 7.503 | Plastic | 1.64 | 23.66 | −13.47 |
| 15 | | EVAS | 42.148 | 0.272 | 9.308 | | | | |
| 16 | Filter | Plano | Infinity | 0.21 | — | Glass | 1.52 | 64.17 | |
| 17 | | Plano | Infinity | 0.41 | — | | | | |
| 18 | Image | Plano | Infinity | — | — | | | | |

TABLE 30

Aspheric Coefficients

| Surface # | Conic | NR | A0 | A1 | A2 | A3 |
|---|---|---|---|---|---|---|
| 2 | 0 | 3.229E+00 | −1.235E−02 | 4.715E−03 | 9.662E−04 | 1.386E−04 |
| 3 | 0 | 3.225E+00 | −2.368E−01 | −2.926E−03 | −1.557E−04 | 1.368E−04 |
| 4 | 0 | 3.237E+00 | −1.043E+00 | 2.199E−02 | 6.547E−03 | 2.206E−04 |
| 5 | 0 | 3.310E+00 | −1.243E+00 | 1.930E−02 | 5.252E−03 | −2.858E−04 |
| 6 | 0 | 3.317E+00 | −5.969E−01 | −3.406E−02 | −7.316E−03 | −2.547E−03 |
| 7 | 0 | 3.397E+00 | −5.013E−01 | −1.798E−02 | −5.619E−03 | −2.550E−03 |
| 8 | 0 | 3.397E+00 | 5.778E−01 | 5.399E−02 | −8.323E−04 | −7.149E−04 |
| 9 | 0 | 3.607E+00 | 2.081E−01 | 1.736E−02 | −3.999E−02 | −1.142E−03 |
| 10 | 0 | 3.628E+00 | 1.154E+00 | 1.023E−02 | 8.780E−03 | 3.538E−04 |
| 11 | 0 | 3.692E+00 | 1.162E+00 | 2.182E−02 | 3.335E−02 | 6.836E−04 |
| 12 | 0 | 3.774E+00 | −9.166E−01 | −7.666E−02 | −1.886E−02 | −5.092E−04 |
| 13 | 0 | 4.091E+00 | −6.129E−01 | −1.144E−01 | −1.873E−02 | −1.030E−03 |
| 14 | 0 | 7.553E+00 | −8.439E−01 | 5.216E−01 | −3.266E−02 | −2.044E−03 |
| 15 | 0 | 9.358E+00 | −2.860E+00 | 3.162E−01 | 5.330E−02 | 7.525E−03 |

TABLE 32

EFL = 12.7 mm, F number = 2.0, HFOV = 39.8 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.173 | 3.126 | | | | |
| 2 | Lens 1 | QTYP | 4.257 | 0.849 | 3.126 | Plastic | 1.55 | 55.64 | 40.02 |
| 3 | | | 4.905 | 0.239 | 3.050 | | | | |
| 4 | Lens 2 | QTYP | 5.858 | 0.767 | 3.013 | Plastic | 1.54 | 56.02 | 14.52 |
| 5 | | | 21.545 | 0.155 | 2.929 | | | | |
| 6 | Lens 3 | QTYP | 43.094 | 0.327 | 2.826 | Plastic | 1.67 | 19.44 | −22.34 |
| 7 | | | 11.138 | 1.043 | 2.615 | | | | |
| 8 | Lens 4 | QTYP | 12.884 | 0.343 | 2.666 | Plastic | 1.66 | 20.37 | −256.57 |
| 9 | | | 11.853 | 0.399 | 2.818 | | | | |
| 10 | Lens 5 | QTYP | −7.412 | 0.580 | 2.954 | Plastic | 1.48 | 53.18 | −22.78 |
| 11 | | | −22.945 | 0.143 | 3.218 | | | | |
| 12 | Lens 6 | QTYP | 23.742 | 0.887 | 3.377 | Plastic | 1.54 | 55.93 | 10.11 |
| 13 | | | −7.101 | See Table 1 | 3.640 | | | | |
| 14 | Lens 7 | QTYP | −17.344 | 0.958 | 7.429 | Plastic | 1.54 | 55.84 | 100.36 |
| 15 | | | −13.428 | 0.144 | 8.528 | | | | |
| 16 | Lens 8 | QTYP | −13.701 | 0.526 | 9.105 | Plastic | 1.64 | 22.48 | −11.01 |
| 17 | | | 15.049 | 0.418 | 9.940 | | | | |
| 18 | Filter | Plano | Infinity | 0.210 | — | Glass | 1.52 | 64.17 | |
| 19 | | | Infinity | 0.610 | — | | | | |
| 20 | Image | Plano | Infinity | — | — | | | | |

TABLE 33

Aspheric Coefficients

| Surface # | Conic | NR | A0 | A1 | A2 | A3 |
|---|---|---|---|---|---|---|
| 2 | 0 | 3.143E+00 | −1.098E−01 | −2.995E−02 | −9.778E−03 | −2.383E−03 |
| 3 | 0 | 3.065E+00 | −3.197E−01 | −3.252E−02 | −4.966E−03 | −1.075E−04 |
| 4 | 0 | 3.028E+00 | −2.078E−01 | −5.212E−02 | −1.565E−03 | −1.263E−03 |
| 5 | 0 | 2.943E+00 | −5.199E−03 | −5.229E−03 | −2.287E−03 | −1.050E−03 |
| 6 | 0 | 2.842E+00 | 2.122E−01 | 1.208E−03 | 3.425E−03 | 7.139E−04 |
| 7 | 0 | 2.641E+00 | 2.189E−01 | 1.861E−02 | 5.213E−03 | 1.194E−03 |
| 8 | 0 | 2.690E+00 | −6.105E−01 | 1.330E−02 | 6.598E−03 | −3.544E−04 |
| 9 | 0 | 2.840E+00 | −6.878E−01 | 2.026E−02 | 9.721E−03 | −7.749E−04 |
| 10 | 0 | 2.974E+00 | 7.904E−02 | −5.296E−03 | 9.013E−04 | 1.902E−03 |
| 11 | 0 | 3.236E+00 | −5.517E−01 | 2.281E−02 | −3.339E−02 | 6.714E−03 |
| 12 | 0 | 3.377E+00 | −9.074E−01 | −4.722E−03 | −1.976E−02 | 8.406E−03 |
| 13 | 0 | 3.646E+00 | −2.077E−01 | −3.542E−02 | 1.401E−02 | 5.964E−03 |
| 14 | 0 | 7.352E+00 | −1.488E+00 | 7.850E−01 | −1.083E−01 | 1.104E−03 |
| 15 | 0 | 8.543E+00 | 2.265E+00 | −4.326E−01 | 3.402E−01 | −8.181E−02 |
| 16 | 0 | 9.177E+00 | 3.244E+00 | −5.744E−01 | 2.497E−01 | −1.108E−01 |
| 17 | 0 | 9.950E+00 | −4.293E+00 | 8.805E−01 | −2.453E−01 | 1.766E−02 |

Aspheric Coefficients (Continued)

| Surface # | A4 | A5 | A6 | A7 |
|---|---|---|---|---|
| 2 | −3.582E−04 | −5.203E−05 | 2.764E−05 | 0 |
| 3 | 4.497E−04 | −2.254E−04 | 4.933E−05 | 0 |
| 4 | 1.891E−04 | −5.820E−05 | 1.191E−05 | 0 |
| 5 | −5.243E−04 | −6.759E−04 | 2.412E−04 | 0 |
| 6 | −6.093E−04 | −3.465E−04 | 1.582E−04 | 0 |
| 7 | −1.226E−04 | −7.590E−05 | 2.154E−05 | 0 |
| 8 | −2.222E−04 | −1.919E−04 | −6.507E−05 | 0 |
| 9 | −2.815E−04 | −4.442E−04 | −1.443E−04 | 0 |
| 10 | 5.612E−04 | −5.409E−04 | −1.665E−04 | 0 |
| 11 | 1.104E−03 | 2.116E−04 | −8.451E−05 | 0 |
| 12 | 1.459E−03 | 1.062E−03 | 1.328E−04 | 2.473E−08 |
| 13 | 1.823E−03 | 6.058E−05 | −1.096E−04 | −8.042E−05 |
| 14 | −5.708E−03 | 3.784E−03 | −9.286E−04 | 5.045E−05 |
| 15 | −8.215E−04 | 3.556E−03 | −2.557E−03 | 6.527E−04 |
| 16 | 2.505E−02 | −2.317E−03 | −3.436E−03 | −3.352E−05 |
| 17 | −1.755E−03 | −3.480E−03 | −2.580E−04 | −1.976E−03 |

A sequence of lens powers from L1 to L8 is as follows: ++−+−++− (plus-plus-minus-plus-minus-plus-plus-minus. $P_{G1}$ and $P_6$ as well as $P_{G1}$ and $P_8$ are similar, i.e. $P_{G1}/P_6$ as well as $P_{G1}/P_8$ do not vary by more than 20% from 1. Specifically, Table 34 shows powers $P_i$ and ratios between each $P_i$ and $P_{G1}$.

TABLE 34

| Lens element Li | $P_i$ | $P_i/P_{G1}$ |
|---|---|---|
| 1 | 0.02 | 0.28 |
| 2 | 0.07 | 0.78 |
| 3 | −0.04 | −0.50 |
| 4 | 0.00 | −0.04 |
| 5 | −0.044 | −0.50 |
| 6 | 0.10 | 1.12 |
| 7 | 0.01 | 0.11 |
| 8 | −0.09 | −1.02 |

TABLE 35

| | | | | | | | | | |
|---|---|---|---|---|---|---|---|---|---|
| \multicolumn{10}{c}{EFL = 13.2 mm, F number = 2.0, HFOV = 39.4 deg.} |

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −0.494 | 3.126 | | | | |
| 2 | Lens 1 | QTYP | 7.657 | 0.901 | 3.126 | Plastic | 1.54 | 55.91 | 15.04 |
| 3 | | | 107.057 | 0.210 | 3.050 | | | | |
| 4 | Lens 2 | QTYP | −48.306 | 0.295 | 3.013 | Plastic | 1.67 | 19.44 | −33.21 |
| 5 | | | 41.959 | 0.116 | 2.929 | | | | |
| 6 | Lens 3 | QTYP | 21.922 | 0.397 | 2.826 | Plastic | 1.61 | 25.98 | −12.31 |
| 7 | | | 5.607 | 0.106 | 2.615 | | | | |
| 8 | Lens 4 | QTYP | 5.453 | 0.904 | 2.666 | Plastic | 1.64 | 23.51 | 9.33 |
| 9 | | | 55.523 | 1.139 | 2.818 | | | | |
| 10 | Lens 5 | QTYP | −3.972 | 0.412 | 2.954 | Plastic | 1.66 | 20.37 | −16.54 |
| 11 | | | −6.471 | 0.157 | 3.218 | | | | |
| 12 | Lens 6 | QTYP | 246.542 | 1.199 | 3.377 | Plastic | 1.54 | 55.91 | 11.33 |
| 13 | | | −6.345 | 0.177 | 3.640 | | | | |
| 14 | Lens 7 | QTYP | −6.372 | 0.730 | 7.429 | Plastic | 1.54 | 55.91 | 199.96 |
| 15 | | | −6.265 | See Table 1 | 8.528 | | | | |
| 16 | Lens 8 | QTYP | −9.380 | 0.850 | 9.105 | Plastic | 1.54 | 55.91 | −12.85 |
| 17 | | | 28.902 | 0.500 | 9.940 | | | | |
| 18 | Filter | Plano | Infinity | 0.210 | — | Glass | 1.52 | 64.17 | |
| 19 | | | Infinity | 0.303 | — | | | | |
| 20 | Image | Plano | Infinity | — | — | | | | |

Figure 15:
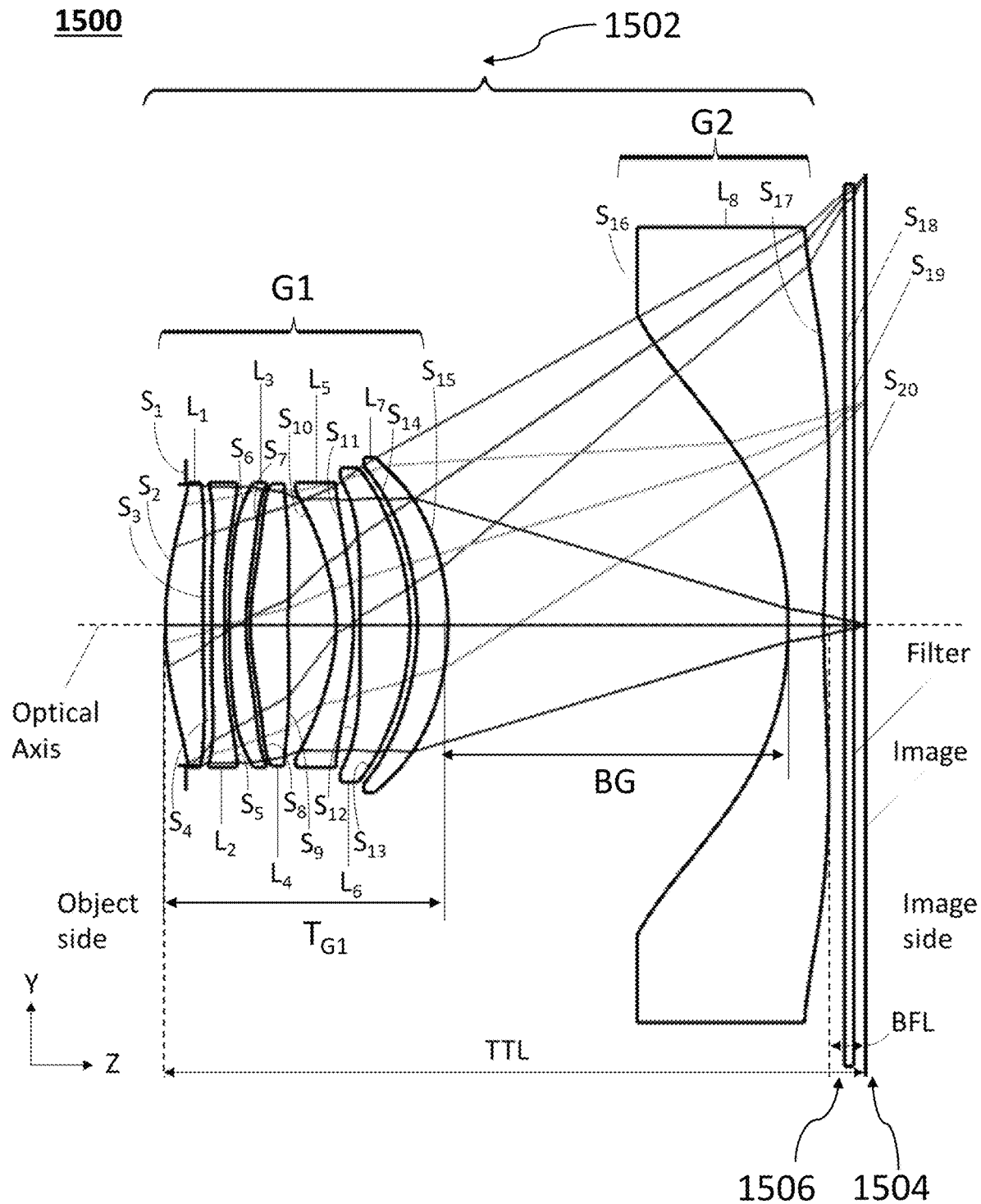
FIGS. 15, 16, 17 and 18 show yet other examples of pop-out optical lens systems disclosed herein.

FIG. 15 shows yet another example of a 2G pop-out optical lens system disclosed herein and numbered 1500. Lens system 1500 comprises a pop-out lens 1502 divided into G1 and G2, an image sensor 1504 and, optionally, an optical element 1506. Image sensor 1504 may have a SD of 21.5 mm. G1 includes 6 lens elements and G2 includes one lens element. Table 35 provides surface types and Table 36 provides aspheric coefficients.

TABLE 36

| | | | Aspheric Coefficients | | | |
|---|---|---|---|---|---|---|
| Surface # | Conic | NR | A0 | A1 | A2 | A3 |
| 2 | 0 | 3.450E+00 | −2.469E−01 | −1.438E−02 | 1.904E−03 | 0.000E+00 |
| 3 | 0 | 3.450E+00 | −9.930E−02 | −2.812E−02 | 8.326E−03 | −9.317E−04 |
| 4 | 0 | 3.550E+00 | 9.246E−02 | −1.182E−01 | 2.438E−02 | −4.846E−03 |
| 5 | 0 | 3.600E+00 | 2.517E−01 | −1.189E−01 | 1.268E−02 | −8.922E−03 |
| 6 | 0 | 3.650E+00 | 4.045E−01 | 5.631E−02 | 3.458E−03 | −5.764E−04 |
| 7 | 0 | 3.650E+00 | −8.877E−01 | 2.412E−01 | 1.765E−03 | 1.056E−02 |
| 8 | 0 | 3.650E+00 | −9.234E−01 | 2.566E−01 | 3.189E−02 | 1.579E−02 |
| 9 | 0 | 3.650E+00 | −2.653E−01 | 7.598E−02 | 3.497E−02 | 7.540E−03 |
| 10 | 0 | 3.650E+00 | 1.118E+00 | −2.755E−02 | 4.450E−02 | −5.308E−03 |
| 11 | 0 | 3.850E+00 | 9.315E−01 | −1.944E−02 | 6.237E−02 | 1.738E−03 |
| 12 | 0 | 3.850E+00 | −6.634E−01 | 5.333E−02 | 5.310E−02 | 3.425E−02 |
| 13 | 0 | 3.850E+00 | −7.973E−03 | −5.870E−03 | −3.239E−03 | −2.326E−03 |
| 14 | 0 | 4.250E+00 | −1.316E−02 | −1.447E−03 | 3.163E−02 | 7.507E−03 |
| 15 | 0 | 4.250E+00 | −3.488E−01 | −1.423E−02 | 5.162E−02 | 3.651E−02 |
| 16 | 0 | 7.850E+00 | −2.353E−01 | 7.871E−01 | −9.935E−02 | 3.144E−02 |
| 17 | 0 | 9.750E+00 | −2.626E+00 | 5.124E−01 | −7.258E−02 | 3.113E−02 |

| | Aspheric Coefficients (Continued) | | | |
|---|---|---|---|---|
| Surface # | A4 | A5 | A6 | A7 |
| 2 | 0.000E+00 | 0.000E+00 | 0.000E+00 | 0.000E+00 |
| 3 | 2.698E−04 | 0.000E+00 | 0.000E+00 | 0.00E+00 |

TABLE 36-continued

| | | | | |
|---|---|---|---|---|
| 4 | −2.299E−03 | 0.000E+00 | 0.000E+00 | 0.00E+00 |
| 5 | −7.397E−04 | 1.759E−04 | 0.000E+00 | 0.00E+00 |
| 6 | 3.646E−03 | 1.197E−03 | 5.762E−04 | 0.00E+00 |
| 7 | 1.439E−03 | 3.035E−03 | 1.448E−03 | 0.00E+00 |
| 8 | 3.193E−03 | 2.294E−03 | 1.037E−03 | 0.00E+00 |
| 9 | 2.396E−03 | 7.310E−05 | 1.092E−04 | 0.00E+00 |
| 10 | 4.547E−03 | 7.679E−04 | 1.488E−03 | 4.45E−04 |
| 11 | 9.201E−03 | 8.693E−04 | 1.689E−03 | 5.03E−04 |
| 12 | 1.890E−02 | 5.849E−03 | 1.045E−03 | 3.347E−04 |
| 13 | 1.158E−03 | 1.445E−03 | −8.931E−04 | 5.032E−05 |
| 14 | −2.724E−03 | −5.502E−03 | −3.435E−03 | 3.098E−04 |
| 15 | 1.753E−02 | 6.219E−03 | 1.298E−03 | 2.331E−04 |
| 16 | −3.689E−03 | 6.368E−03 | −5.464E−04 | 8.309E−04 |
| 17 | −8.399E−03 | 6.362E−03 | −7.124E−04 | 7.999E−04 |

The sequence of lens powers for lens element from L1 to L7 is as follows: +−−+−++− (plus-minus-minus-plus-minus-plus-plus-minus). The deflection point of L1 is located at a distance of 2.16 mm measured from the OA at the rear surface. $P_{G1}$ and $P_3$, $P_{G1}$ and $P_6$ and $P_{G1}$ and $P_8$ are similar, i.e. $P_{G1}/P_3$ as well as $P_{G1}/P_6$ as well as $P_{G1}/P_8$ do not vary by more than 10% from 1. Specifically, Table 37 shows powers $P_i$ and ratios between each $P_i$ and $P_{G1}$.

TABLE 37

| Lens element Li | $P_i$ | $P_i/P_{G1}$ |
|---|---|---|
| 1 | 0.07 | 0.79 |
| 2 | −0.03 | −0.36 |

TABLE 37-continued

| Lens element Li | $P_i$ | $P_i/P_{G1}$ |
|---|---|---|
| 3 | −0.08 | −0.97 |
| 4 | 0.11 | 1.28 |
| 5 | −0.060 | −0.72 |
| 6 | 0.09 | 1.05 |
| 7 | 0.01 | 0.06 |
| 8 | −0.08 | −0.93 |

Figure 16:
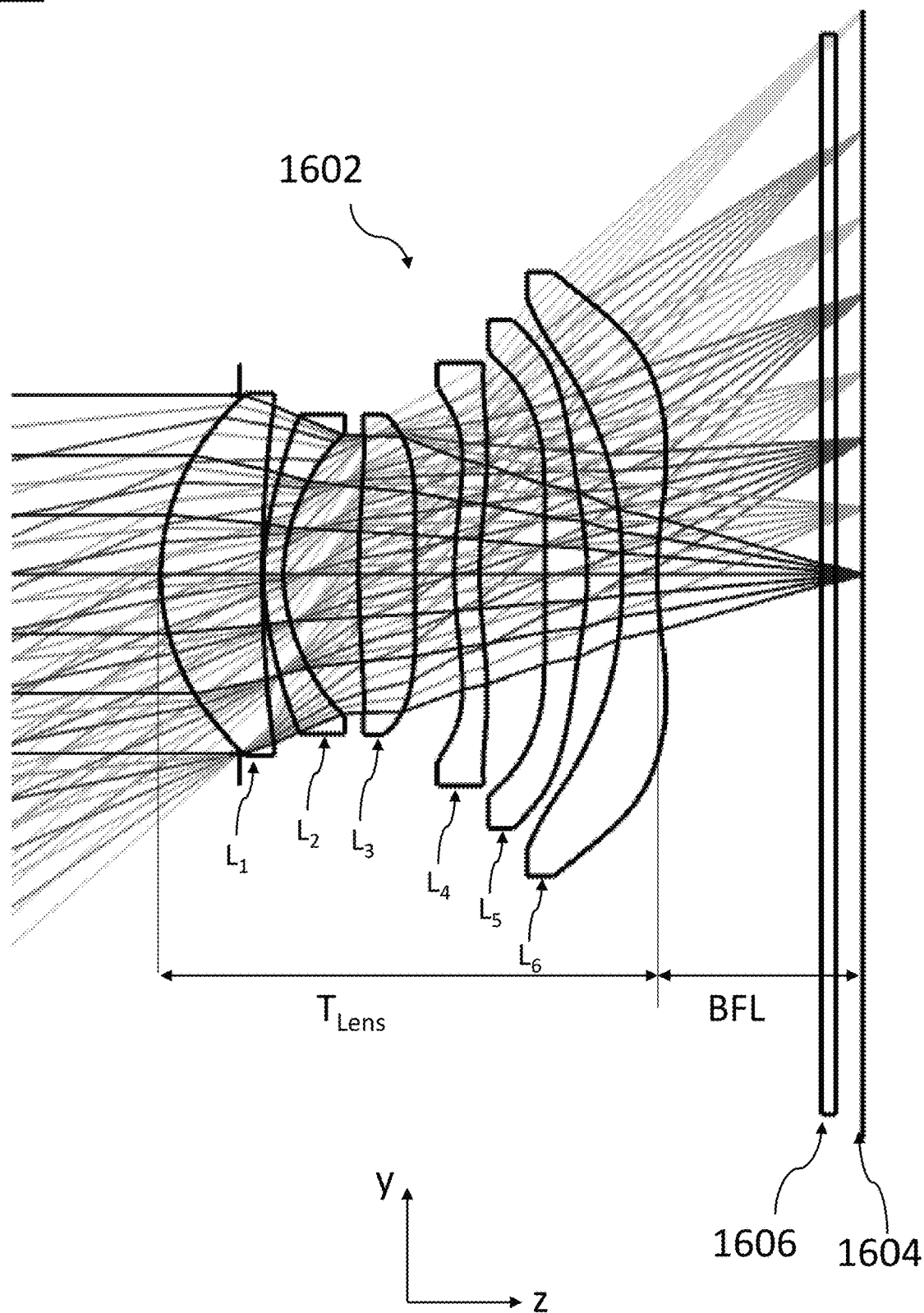

FIG. 16 shows an example of a 1G pop-out optical lens system disclosed herein and numbered 1600. Lens system 1600 comprises a pop-out lens 1602, an image sensor 1604 and, optionally, an optical element 1606. Image sensor 1604 may have a SD of 16.0 mm. Table 38 provides surface types and Table 39 provides aspheric coefficients.

TABLE 38

Embodiment 1600
EFL = 9.37 mm, F number = 1.84, HFOV = 40.0 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.122 | 2.550 | | | | |
| 2 | Lens 1 | EVAS | 3.227 | 1.443 | 2.550 | Plastic | 1.53 | 55.69 | 7.02 |
| 3 | | EVAS | 18.976 | 0.017 | 2.404 | | | | |
| 4 | Lens 2 | EVAS | 3.461 | 0.284 | 2.248 | Plastic | 1.66 | 20.37 | −10.67 |
| 5 | | EVAS | 2.252 | 1.075 | 1.989 | | | | |
| 6 | Lens 3 | EVAS | 13.144 | 0.808 | 2.013 | Plastic | 1.57 | 37.43 | 30.59 |
| 7 | | EVAS | 52.540 | 0.551 | 2.250 | | | | |
| 8 | Lens 4 | EVAS | 5.277 | 0.361 | 2.638 | Plastic | 1.59 | 28.30 | 61.61 |
| 9 | | EVAS | 6.014 | 0.934 | 2.982 | | | | |
| 10 | Lens 5 | EVAS | −53.694 | 0.604 | 3.147 | Plastic | 1.54 | 55.93 | 7.45 |
| 11 | | EVAS | −3.798 | 0.499 | 3.597 | | | | |
| 12 | Lens 6 | EVAS | −8.200 | 0.499 | 3.878 | Plastic | 1.53 | 55.69 | −5.56 |
| 13 | | EVAS | 4.791 | 2.333 | 4.275 | | | | |
| 14 | Filter | Plano | Infinity | 0.210 | | Glass | 1.52 | 64.17 | |
| 15 | | Plano | Infinity | 0.390 | | | | | |
| 16 | Image | Plano | Infinity | — | — | | | | |

TABLE 39

| | Aspheric Coefficients | | | |
|---|---|---|---|---|
| Surface # | Conic | A2 | A4 | A6 | A8 |
| 2 | 0 | 0.000E+00 | 3.222E−04 | −4.323E−04 | 9.425E−05 |
| 3 | 0 | 0.000E+00 | −1.488E−03 | 2.408E−03 | −1.278E−03 |
| 4 | 0 | 0.000E+00 | −3.295E−02 | 1.182E−02 | −3.724E−03 |
| 5 | 0 | 0.000E+00 | −3.670E−02 | 1.014E−02 | −2.509E−03 |
| 6 | 0 | 0.000E+00 | −4.156E−03 | 1.429E−04 | 2.540E−04 |
| 7 | 0 | 0.000E+00 | −1.490E−02 | 2.801E−03 | −1.612E−03 |
| 8 | 0 | 0.000E+00 | −2.351E−02 | 2.210E−03 | −4.348E−04 |
| 9 | 0 | 0.000E+00 | −1.965E−02 | 6.792E−04 | 3.093E−04 |

TABLE 39-continued

| | | | | | |
|---|---|---|---|---|---|
| 10 | 0 | 0.000E+00 | 6.912E−03 | −1.457E−03 | −7.604E−04 |
| 11 | 0 | 0.000E+00 | 3.911E−02 | −7.011E−03 | 4.579E−04 |
| 12 | 0 | 0.000E+00 | 3.459E−04 | −5.140E−03 | 1.727E−03 |
| 13 | 0 | 0.000E+00 | −3.175E−02 | 4.512E−03 | −5.677E−04 |

Aspheric Coefficients (Continued)

| Surface # | A10 | A12 | A14 | A16 |
|---|---|---|---|---|
| 2 | −2.325E−05 | 3.135E−06 | −3.321E−07 | 1.739E−08 |
| 3 | 3.596E−04 | −5.754E−05 | 4.985E−06 | −1.807E−07 |
| 4 | 8.317E−04 | −1.178E−04 | 9.389E−06 | −3.464E−07 |
| 5 | 2.460E−04 | 2.627E−05 | −9.329E−06 | 2.372E−07 |
| 6 | −3.190E−04 | 1.243E−04 | −2.388E−05 | 1.773E−06 |
| 7 | 4.400E−04 | −8.468E−05 | 9.509E−06 | −5.306E−07 |
| 8 | 8.410E−05 | −2.403E−05 | 3.251E−06 | −1.327E−07 |
| 9 | −1.002E−04 | 1.824E−05 | −1.666E−06 | 5.839E−08 |
| 10 | 1.604E−04 | −3.126E−06 | −1.293E−06 | 7.684E−08 |
| 11 | 4.776E−05 | −9.884E−06 | 5.758E−07 | −1.089E−08 |
| 12 | −2.634E−04 | 2.080E−05 | −8.200E−07 | 1.276E−08 |
| 13 | 5.143E−05 | −3.272E−06 | 1.216E−07 | −1.885E−09 |

A thickness profile (the thickness being measured along the z-axis) of L5 taken along the y-axis and starting from lens 1602's OA has a local maximum at the OA and a local minimum, wherein the location of the local minimum is not at L5's margin (or border), i.e. the local minimum is located at a distance smaller than DA/2 from the OA. A thickness profile of L6 taken as see above for L5 has a local minimum at the OA and a local maximum, wherein the location of the local maximum is not at L6's margin. This property of L5 and L6 respectively is beneficial for achieving a lens with low Field curvature. The power sequence for lens elements L1 to L6 is plus-minus-plus-plus-plus-minus. L2 is a strong negative lens, its magnitude |f2| fulfils |f2|/EFL<1.5.

Figure 17:
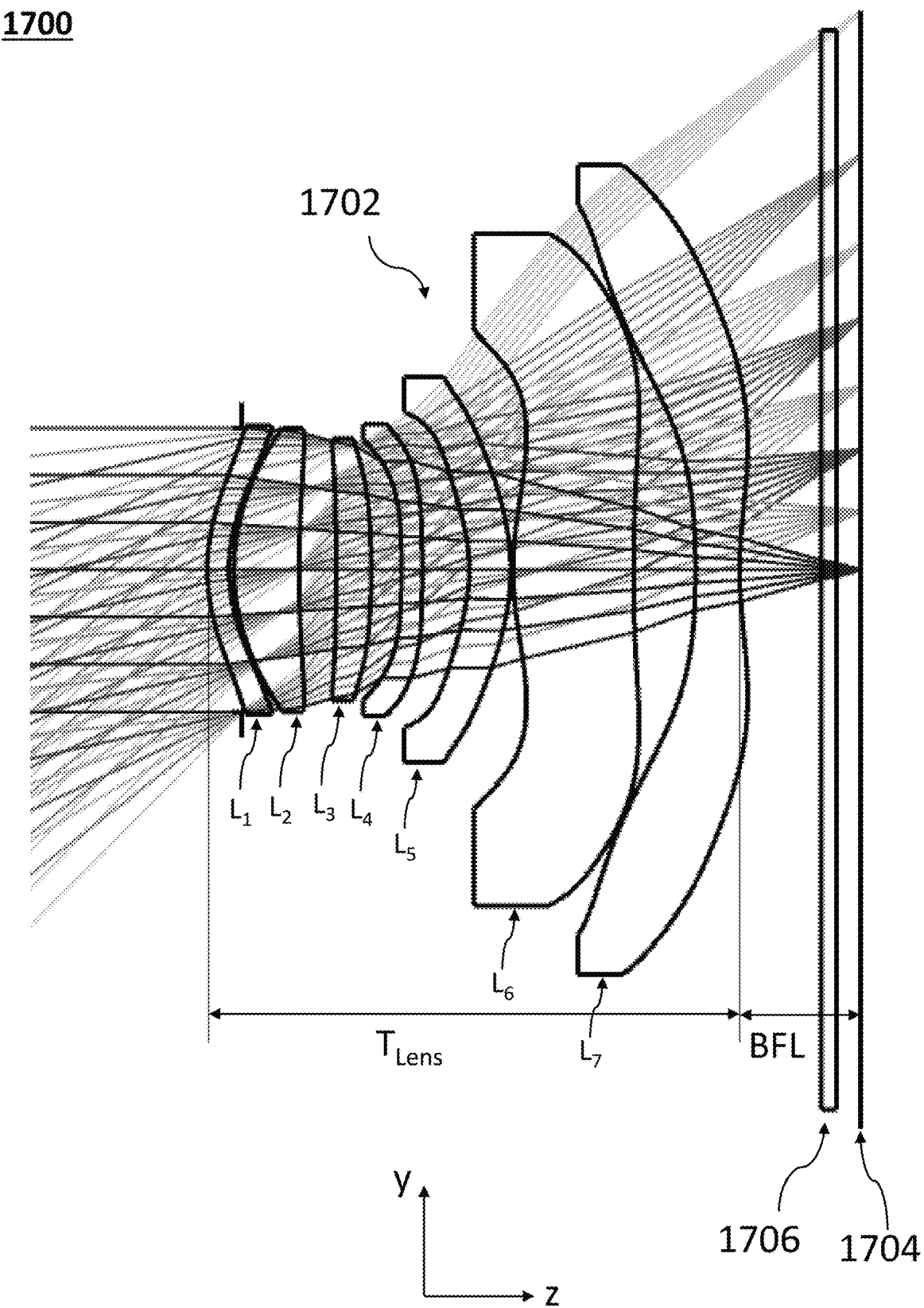

FIG. 17 shows another example of a 1G pop-out optical lens system disclosed herein and numbered 1700. Lens system 1700 comprises a pop-out lens 1702, an image sensor 1704 and, optionally, an optical element 1706. Image sensor 1704 may have a SD of 16.0 mm. Table 40 provides surface types and Table 41 provides aspheric coefficients.

TABLE 40

Embodiment 1700
EFL = 7.68 mm, F number = 1.88, HFOV = 45.5 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −0.490 | 2.036 | | | | |
| 2 | Lens 1 | QType | 2.756 | 0.309 | 2.036 | Plastic | 1.67 | 19.24 | −29.45 |
| 3 | | QType | 2.312 | 0.075 | 1.993 | | | | |
| 4 | Lens 2 | QType | 2.932 | 0.936 | 2.006 | Plastic | 1.54 | 55.93 | 6.48 |
| 5 | | QType | 15.214 | 0.529 | 1.956 | | | | |
| 6 | Lens 3 | QType | 551.231 | 0.499 | 1.845 | Plastic | 1.54 | 55.93 | 25.99 |
| 7 | | QType | −14.565 | 0.436 | 1.829 | | | | |
| 8 | Lens 4 | QType | −20.972 | 0.299 | 1.831 | Plastic | 1.67 | 19.24 | −71.17 |
| 9 | | QType | −37.348 | 0.675 | 2.057 | | | | |
| 10 | Lens 5 | QType | −2.328 | 0.594 | 2.229 | Plastic | 1.67 | 19.24 | −17.48 |
| 11 | | QType | −3.197 | 0.033 | 2.735 | | | | |
| 12 | Lens 6 | QType | 4.088 | 1.728 | 3.394 | Plastic | 1.54 | 55.93 | 8.23 |
| 13 | | QType | 38.318 | 0.887 | 4.788 | | | | |
| 14 | Lens 7 | QType | −13.465 | 0.636 | 5.199 | Plastic | 1.59 | 28.30 | −6.90 |
| 15 | | QType | 5.957 | 1.171 | 5.772 | | | | |
| 16 | Filter | Plano | Infinity | 0.210 | | Glass | 1.52 | 64.17 | |
| 17 | | Plano | Infinity | 0.350 | | | | | |
| 18 | Image | Plano | Infinity | — | — | | | | |

TABLE 41

Aspheric Coefficients

| Surface # | Conic | Norm Radius | A0 | A1 | A2 | A3 |
|---|---|---|---|---|---|---|
| 2 | 0 | 2.35E+00 | −6.504E−01 | −3.822E−02 | 5.215E−03 | 3.401E−03 |
| 3 | 0 | 2.30E+00 | −9.762E−01 | −7.592E−02 | −2.475E−03 | 6.950E−03 |
| 4 | 0 | 2.30E+00 | −2.498E−01 | 4.742E−02 | −3.017E−02 | −5.791E−03 |
| 5 | 0 | 2.27E+00 | −1.224E−01 | −1.972E−02 | −6.107E−04 | 9.147E−03 |
| 6 | 0 | 2.10E+00 | −3.239E−02 | 8.029E−02 | 4.028E−02 | 1.906E−02 |
| 7 | 0 | 2.06E+00 | −1.648E−01 | 5.856E−02 | 2.847E−02 | 1.510E−02 |

TABLE 41-continued

| | | | | | | |
|---|---|---|---|---|---|---|
| 8 | 0 | 2.03E+00 | −6.689E−01 | 2.784E−03 | 6.319E−04 | −1.605E−04 |
| 9 | 0 | 2.34E+00 | −7.010E−01 | 1.041E−02 | 2.584E−02 | 1.459E−02 |
| 10 | 0 | 2.41E+00 | 1.120E+00 | −1.166E−01 | 3.139E−02 | 3.720E−03 |
| 11 | 0 | 2.89E+00 | 7.671E−01 | −3.878E−01 | 3.986E−02 | 1.379E−02 |
| 12 | 0 | 3.51E+00 | −2.723E+00 | 8.833E−02 | −1.341E−02 | 2.533E−03 |
| 13 | 0 | 4.32E+00 | −8.076E−01 | −1.254E−01 | 7.299E−02 | −1.896E−02 |
| 14 | 0 | 5.11E+00 | −9.693E−01 | 5.510E−01 | −2.286E−01 | 4.907E−02 |
| 15 | 0 | 5.74E+00 | −6.334E+00 | 7.433E−01 | −4.116E−01 | 6.440E−02 |

| | Aspheric Coefficients (Continued) | | |
|---|---|---|---|
| Surface # | A4 | A5 | A6 |
| 2 | −4.852E−04 | −8.759E−05 | 2.283E−05 |
| 3 | 2.670E−03 | 2.670E−03 | 9.297E−04 |
| 4 | 1.436E−03 | 3.073E−03 | 1.195E−03 |
| 5 | 6.841E−03 | 2.351E−03 | 3.722E−04 |
| 6 | 7.179E−03 | 1.920E−03 | 2.523E−04 |
| 7 | 6.779E−03 | 2.057E−03 | 4.147E−04 |
| 8 | 2.188E−03 | 9.726E−05 | −5.666E−05 |
| 9 | 6.770E−03 | −2.975E−04 | −1.054E−04 |
| 10 | 9.033E−03 | 8.668E−04 | 2.888E−04 |
| 11 | 4.342E−03 | −6.248E−03 | −1.343E−03 |
| 12 | −3.529E−03 | −2.370E−03 | −1.358E−03 |
| 13 | 6.583E−03 | −4.586E−03 | 7.122E−04 |
| 14 | −9.388E−03 | −3.842E−03 | 2.482E−03 |
| 15 | −3.297E−02 | −5.116E−03 | −1.298E−02 |

L1 and L2 as well as L3 and L4 have a uniform distance to each other. For all values between OA and DA/2 along the y-axis, the average of the distance between L1 and L2 ("$\mu_{L1-L2}$") and L3 and L4 ("$\mu_{L3-L4}$") respectively measured along the z-axis is $\mu_{dL1-L2}$=0.06 mm and $\mu_{dL3-L4}$=0.39 mm, the standard deviation of the average being $\sigma_{dL1-L2}$=0.02 mm and $\sigma_{dL3-L4}$=0.07 mm. Ratios of σ and μ are $\sigma_{dL1-L2}/\mu_{L1-L2}$=0.36 and $\sigma_{dL3-L4}/\mu_{L3-L4}$=0.17 for L1, L2 and L3, L4 respectively. Ratios of the distance at the OA between L1 and L2 ("$d_{L1-L2}$") and L3 and L4 ("$d_{L3-L4}$") respectively and $T_{Lens}$ are $d_{L1-L2}/T_{Lens}$=1.03% and $d_{L3-L4}/T_{Lens}$=5.2%. L1 and L2 are very close to each other and resemble a doublet lens.

Figure 18:
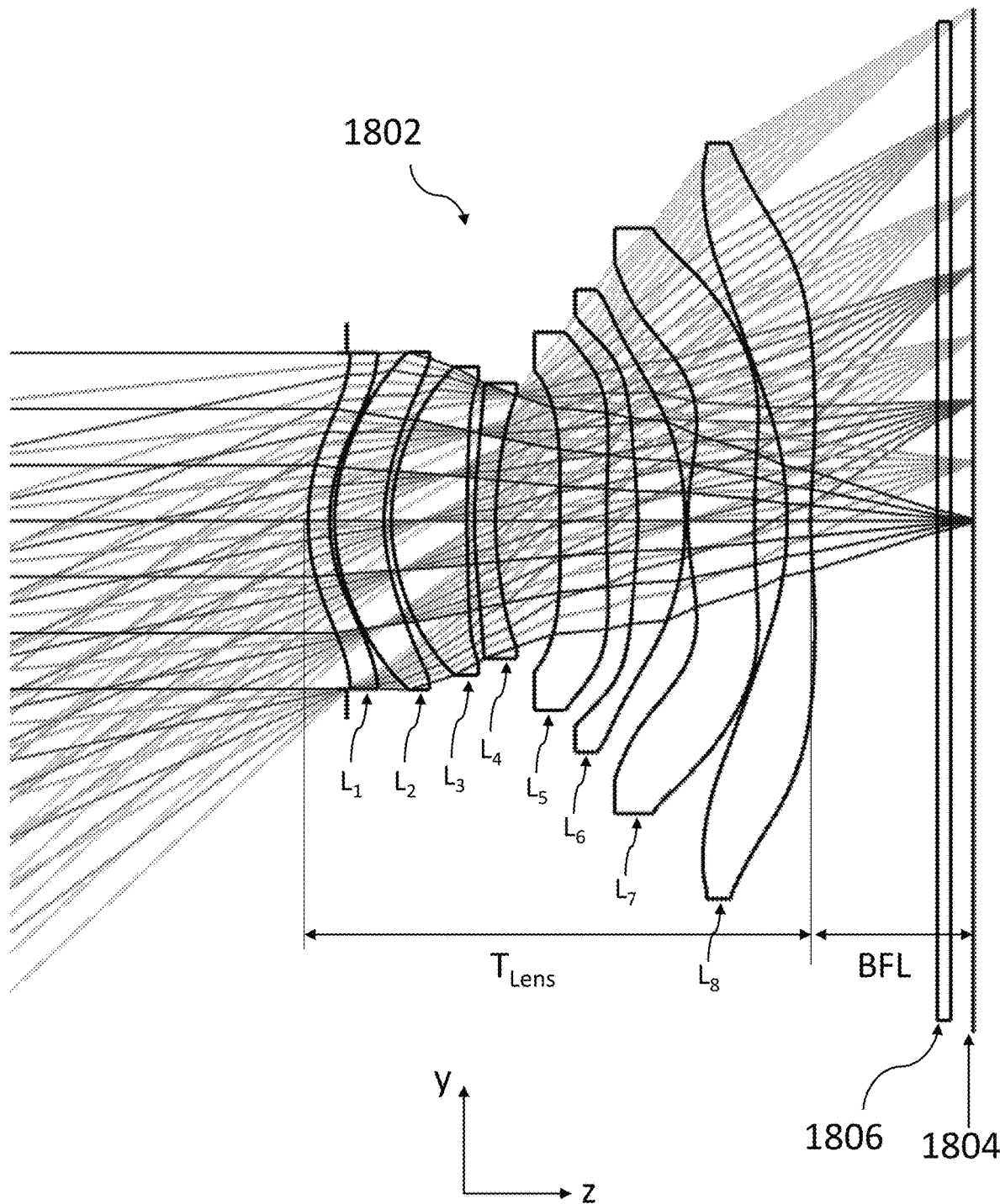

FIG. 18 shows another example of a 1G pop-out optical lens system disclosed herein and numbered 1800. Lens system 1800 comprises a pop-out lens 1802, an image sensor 1804 and, optionally, an optical element 1806. Image sensor 1804 may have a SD of 16.0 mm. Table 42 provides surface types and Table 43 provides aspheric coefficients.

The power sequence for lens elements L1 to L7 is minus-plus-plus-minus-minus-plus-minus. L6 has a deflection point that is not located at the OA, what is beneficial for achieving a lens with low Field curvature. A thickness profile of L6 taken along the y-axis and starting from lens 1802's OA has a local maximum at the OA and a local minimum, wherein the location of the local minimum is not at L6's margin. This is beneficial for achieving low Field curvature. All the surfaces of L1-L5 are convex. The signs of the sequence of fi's for lens elements L1 to L8 is minus-minus-plus-minus-minus-plus-plus-minus.

L1 and L2, L2 and L3 as well as L3 and L4 have a uniform distance to each other. For all values between OA and DA/2 along the y-axis, average distances are $\mu_{dL1-L2}$=0.10 mm, $\mu_{dL2-L3}$=0.17 mm and $\mu_{dL3-L4}$=0.15 mm, the standard deviation of the average being $\sigma_{dL1-L2}$=0.09 mm, $\sigma_{dL2-L3}$=0.07 mm and $\sigma_{dL3-L4}$=0.02 mm. Ratios of the standard deviation and the average distances are $\sigma_{dL1-L2}/\mu_{L1-L2}$=0.88, $\sigma_{dL2-L3}/\mu_{L2-L3}$=0.43 and $\sigma_{dL3-L4}/\mu_{L3-L4}$=0.02 for L1, L2 and L2, L3 and L3, L4 respectively. Ratios of OA distances $d_{L1-L2}$=0.07 mm, $d_{L2-L3}$=0.12 mm and $d_{L3-L4}$=0.12 mm and $T_{Lens}$ are $d_{L1-L2}/T_{Lens}$=0.93%, $d_{L2-L3}/T_{Lens}$=1.56% and $d_{L3-L4}/T_{Lens}$=1.47% respectively.

TABLE 42

Embodiment 1800
EFL = 8.78 mm, F number = 1.67, HFOV = 41.9 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −0.606 | 2.622 | | | | |
| 2 | Lens 1 | QTYP | 3.383 | 0.338 | 2.622 | Plastic | 1.67 | 19.24 | −51.54 |
| 3 | | | 2.960 | 0.074 | 2.616 | | | | |
| 4 | Lens 2 | QTYP | 3.089 | 0.769 | 2.635 | Plastic | 1.54 | 55.93 | −243.32 |
| 5 | | | 2.753 | 0.123 | 2.535 | | | | |
| 6 | Lens 3 | QTYP | 2.946 | 1.177 | 2.406 | Plastic | 1.54 | 55.93 | 6.51 |
| 7 | | | 14.770 | 0.116 | 2.207 | | | | |
| 8 | Lens 4 | QTYP | 5.956 | 0.328 | 2.149 | Plastic | 1.67 | 19.24 | −101.54 |
| 9 | | | 5.359 | 1.004 | 1.982 | | | | |
| 10 | Lens 5 | QTYP | 84.496 | 0.726 | 2.352 | Plastic | 1.59 | 28.30 | −44.77 |
| 11 | | | 20.085 | 0.492 | 2.950 | | | | |
| 12 | Lens 6 | QTYP | −5.776 | 0.738 | 3.203 | Plastic | 1.57 | 37.43 | 36.42 |
| 13 | | | −4.726 | 0.043 | 3.613 | | | | |

TABLE 42-continued

Embodiment 1800
EFL = 8.78 mm, F number = 1.67, HFOV = 41.9 deg.

| Surface # | Comment | Type | Curvature Radius | Thickness | Aperture Radius (D/2) | Material | Index | Abbe # | Focal Length |
|---|---|---|---|---|---|---|---|---|---|
| 14 | Lens 7 | QTYP | 4.275 | 1.041 | 4.052 | Plastic | 1.54 | 55.93 | 9.37 |
| 15 | | | 23.788 | 0.503 | 4.576 | | | | |
| 16 | Lens 8 | QTYP | −6.320 | 0.371 | 5.755 | Plastic | 1.53 | 55.69 | −6.71 |
| 17 | | | 8.540 | 1.981 | 5.899 | | | | |
| 18 | Filter | Plano | Infinity | 0.210 | | Glass | 1.52 | 64.17 | |
| 19 | | | Infinity | 0.350 | | | | | |
| 20 | Image | Plano | Infinity | — | — | | | | |

TABLE 43

| | | | Aspheric Coefficients | | | |
|---|---|---|---|---|---|---|
| Surface # | Conic | NR | A0 | A1 | A2 | A3 |
| 2 | 0 | 2.645E+00 | −5.332E−01 | −9.847E−02 | 1.486E−02 | −5.989E−04 |
| 3 | 0 | 2.645E+00 | −7.497E−01 | −1.451E−01 | 2.252E−02 | −8.303E−03 |
| 4 | 0 | 2.686E+00 | −3.438E−01 | −2.891E−03 | −2.226E−03 | −1.048E−02 |
| 5 | 0 | 2.582E+00 | −9.916E−01 | −1.475E−02 | −5.140E−02 | −6.855E−03 |
| 6 | 0 | 2.490E+00 | −3.264E−01 | 3.682E−02 | −1.668E−02 | −1.569E−03 |
| 7 | 0 | 2.336E+00 | −1.210E−02 | 6.992E−02 | −1.065E−02 | 2.242E−03 |
| 8 | 0 | 2.262E+00 | −3.234E−01 | 5.237E−02 | −1.548E−02 | 3.667E−03 |
| 9 | 0 | 2.281E+00 | −6.626E−02 | 5.126E−02 | −1.442E−03 | 3.867E−03 |
| 10 | 0 | 2.591E+00 | −6.915E−01 | −8.357E−02 | −5.558E−02 | −2.962E−02 |
| 11 | 0 | 2.986E+00 | −9.156E−01 | −2.864E−02 | 4.300E−02 | 6.817E−03 |
| 12 | 0 | 3.208E+00 | 1.640E−01 | −2.832E−01 | 9.804E−02 | 9.750E−03 |
| 13 | 0 | 3.816E+00 | 2.617E−01 | 1.640E−01 | −1.030E−01 | −3.797E−02 |
| 14 | 0 | 4.034E+00 | 4.573E+00 | 7.271E−01 | −8.859E−02 | −7.911E−02 |
| 15 | 0 | 4.375E+00 | −1.991E+00 | 1.117E−01 | 6.020E−02 | −5.128E−02 |
| 16 | 0 | 5.25E+00 | 1.32E+00 | 2.09E−01 | −5.88E−02 | 4.54E−02 |
| 17 | 0 | 5.45E+00 | −3.47E+00 | 5.15E−01 | −1.31E−01 | 9.49E−02 |

| | Aspheric Coefficients (Continued) | | | |
|---|---|---|---|---|
| Surface # | A4 | A5 | A6 | A7 |
| 2 | 6.638E−04 | −7.669E−04 | 1.771E−04 | 0.000E+00 |
| 3 | 7.971E−04 | −1.137E−03 | 1.776E−04 | 0.000E+00 |
| 4 | −2.871E−04 | −7.898E−04 | 5.210E−04 | 0.000E+00 |
| 5 | 2.928E−03 | −1.823E−04 | −7.881E−04 | 0.000E+00 |
| 6 | −1.816E−03 | −9.393E−05 | −2.978E−04 | 0.000E+00 |
| 7 | −1.219E−03 | 4.561E−04 | 2.196E−05 | 0.000E+00 |
| 8 | −4.628E−04 | 3.771E−04 | 4.859E−05 | 0.000E+00 |
| 9 | 9.940E−04 | 4.421E−04 | 1.709E−04 | 0.000E+00 |
| 10 | −1.269E−02 | −4.403E−03 | −8.491E−04 | 0.000E+00 |
| 11 | −3.855E−03 | −4.598E−03 | −1.213E−03 | 0.000E+00 |
| 12 | 5.204E−03 | −5.852E−03 | −1.176E−03 | 0.000E+00 |
| 13 | −2.414E−03 | −5.348E−04 | 1.878E−03 | 0.000E+00 |
| 14 | 1.230E−02 | 2.036E−03 | −2.439E−03 | 3.871E−04 |
| 15 | 3.270E−02 | −9.973E−03 | 3.421E−03 | −3.083E−05 |
| 16 | −3.45E−02 | 1.67E−02 | −3.79E−03 | 3.81E−04 |
| 17 | −4.42E−02 | 1.50E−02 | −7.86E−03 | 2.16E−03 |

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A lens system for a compact digital camera, comprising:
   an image sensor having a sensor diagonal (SD); and
   a lens with a field of view (FOV)>60 deg, a back focal length (BFL), an effective focal length (EFL) and N≥6 lens elements (L1-LN) arranged along a lens optical axis (OA) starting with L1 from an object side toward an image side, the lens having a pop-out total track length (TTL) in the range of 8.5 mm to 12.5 mm in a pop-out state and a collapsed total track length (c-TTL) in a collapsed state, wherein the lens system is configured to switch from a pop-out state to a collapsed state by collapsing the BFL to a collapsed (c-BFL), wherein SD≥15 mm, wherein BFL>0.15×TTL, and wherein a ratio c-TTL/SD<0.65.

2. The lens system of claim 1, wherein N=7.

3. The lens system of claim 1, wherein N=6 or N=8.

4. The lens system of claim 1, wherein c-TTL/SD<0.625.

5. The lens system of claim 1, wherein SD≤17 mm.

6. The lens system of claim 1, wherein TTL/SD≤0.65.

7. The lens system of claim 1, wherein TTL/SD is in the range of 0.59 to 0.65.

8. The lens system of claim 1, wherein BFL/TTL is in the range of 0.17 to 0.28.

9. The lens system of claim 1, wherein TTL/SD is in the range of 0.59 to 0.65.

10. The lens system of claim 1, wherein the lens system has a f number smaller than 2.

11. The lens system of claim 1, wherein the TTL is in the range of 9.4 mm to 10.4 mm.

12. The lens system of claim 1, wherein the lens has a lens thickness $T_{Lens}$ and L1 having a lens element thickness $T_{L1}$ both measured at the OA, and wherein $T_{L1}/T_{Lens}$ is in the range of 0.15 to 0.2.

13. The lens system of claim 1, wherein the lens has a lens thickness $T_{Lens}$ and an air gap between L1 and L2 $G_{L1-L2}$ both measured at the OA, and wherein $G_{L1-L2}/T_{Lens}<0.075$.

14. The lens system of claim 13, wherein $G_{L1-L2}/T_{Lens}<0.05$.

15. The lens system of claim 1, a focal length of L1 being f1, and wherein f1/EFL<1.

16. The lens system of claim 15, wherein f1/EFL<0.85.

17. The lens system of claim 1, wherein a focal length of L3 is marked f3, and wherein f3/EFL>2.

18. The lens system of claim 17, wherein f3/EFL>3.

19. The lens system of claim 1, wherein both L1 and L2 are formed meniscus with respect to the object side.

20. The lens system of claim 1, wherein a rear surface of LN has three deflection points.

21. The lens system of claim 1, wherein lens element LN has a lens element thickness $T_{LN}$, wherein an aperture diameter of the rear surface of LN is $DA_{2N+1}$, and wherein a ratio $T_{LN}/DA_{2N+1}$ is in the range of 0.02 to 0.1.

22. The lens system of claim 21, wherein the ratio $T_{LN}/DA_{2N+1}$ is in the range of 0.035 to 0.8.

23. The lens system of claim 1, wherein the lens system is included in a mobile device.

24. The lens system of claim 23, wherein the mobile device is a smartphone.

* * * * *